(12) United States Patent
Leabman

(10) Patent No.: US 10,516,301 B2
(45) Date of Patent: *Dec. 24, 2019

(54) SYSTEM AND METHODS FOR USING SOUND WAVES TO WIRELESSLY DELIVER POWER TO ELECTRONIC DEVICES

(71) Applicant: Energous Corporation, San Jose, CA (US)

(72) Inventor: Michael A. Leabman, San Ramon, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,682

(22) Filed: Dec. 18, 2018

(65) Prior Publication Data

US 2019/0222070 A1 Jul. 18, 2019

Related U.S. Application Data

(63) Continuation of application No. 15/397,723, filed on Jan. 3, 2017, now Pat. No. 10,158,257, which is a (Continued)

(51) Int. Cl.
*H02J 50/15* (2016.01)
*H02J 50/20* (2016.01)
(Continued)

(52) U.S. Cl.
CPC ............ *H02J 50/15* (2016.02); *H02J 5/005* (2013.01); *H02J 7/025* (2013.01); *H02J 50/20* (2016.02);
(Continued)

(58) Field of Classification Search
CPC combination set(s) only.
See application file for complete search history.

(56) References Cited

U.S. PATENT DOCUMENTS 787,412 A 4/1905 Tesla
3,167,775 A 1/1965 Guertler
(Continued)

FOREIGN PATENT DOCUMENTS

CN 203826555 U 9/2014
CN 104090265 A 10/2014
(Continued)

OTHER PUBLICATIONS

Energous Corp. ISRWO, PCT/US2014/037170, Sep. 15, 2014, 11 pgs.
(Continued)

*Primary Examiner* — Jeffrey M Shin
(74) *Attorney, Agent, or Firm* — Morgan, Lewis & Bockius LLP

(57) ABSTRACT

Wireless charging systems, and methods of use thereof, are disclosed herein. As an example, a method includes: receiving, by a radio of a transmitter, a communication signal from a wireless-power-receiving device, the communication signal containing location data indicating a location of the wireless-power-receiving device. The method further includes, in response determining that the location of the wireless-power-receiving device is within a predetermined range from the transmitter: (i) generating sound waves from a sound wave integrated circuit of the transmitter and (ii) transmitting the sound waves through a plurality of transducer elements to the location of the wireless-power-receiving device, wherein the sound waves are transmitted so that they converge constructively to form a controlled constructive interference pattern in three-dimensional (3-D) space at the location of the wireless-power-receiving device.

20 Claims, 44 Drawing Sheets

Related U.S. Application Data continuation-in-part of application No. 15/237,478, filed on Aug. 15, 2016, now Pat. No. 9,859,758, and a continuation-in-part of application No. 14/622,451, filed on Feb. 13, 2015, now abandoned, and a continuation-in-part of application No. 14/295,032, filed on Jun. 3, 2014, now Pat. No. 9,537,358, and a continuation-in-part of application No. 14/295,003, filed on Jun. 3, 2014, now Pat. No. 9,966,784, and a continuation-in-part of application No. 14/276,811, filed on May 13, 2014, now abandoned, and a continuation-in-part of application No. 14/276,606, filed on May 13, 2014, now abandoned, and a continuation-in-part of application No. 14/276,786, filed on May 13, 2014, now Pat. No. 9,941,705, and a continuation-in-part of application No. 14/273,843, filed on May 9, 2014, now Pat. No. 9,843,229, and a continuation-in-part of application No. 14/273,271, filed on May 8, 2014, now Pat. No. 9,547,357, and a continuation-in-part of application No. 14/273,253, filed on May 8, 2014, now abandoned, and a continuation-in-part of application No. 14/266,991, filed on May 1, 2014, now abandoned.

(51) Int. Cl.

| | | |
|---|---|---|
| *H02J 50/30* | (2016.01) | |
| *H02J 50/40* | (2016.01) | |
| *H02J 50/60* | (2016.01) | |
| *H02J 50/80* | (2016.01) | |
| *H02J 7/02* | (2016.01) | |
| *H02J 5/00* | (2016.01) | |

(52) U.S. Cl.
CPC ............. *H02J 50/30* (2016.02); *H02J 50/40* (2016.02); *H02J 50/60* (2016.02); *H02J 50/80* (2016.02)

(56) References Cited

U.S. PATENT DOCUMENTS

| | | |
|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |

(56) References Cited

U.S. PATENT DOCUMENTS

| | | |
|---|---|---|
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,806,564 B2 | 10/2017 | Leabman |
| 9,819,230 B2 | 11/2017 | Petras et al. |
| 9,843,229 B2 | 12/2017 | Leabman |
| 9,847,669 B2 | 12/2017 | Leabman |
| 9,847,677 B1 | 12/2017 | Leabman |
| 9,853,692 B1 | 12/2017 | Bell et al. |
| 9,859,758 B1 * | 1/2018 | Leabman ............... H02J 50/10 |
| 9,866,279 B2 | 1/2018 | Bell et al. |
| 9,867,032 B2 | 1/2018 | Vermaet et al. |
| 9,871,301 B2 | 1/2018 | Contopanagos |
| 9,876,380 B1 | 1/2018 | Leabman et al. |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,893,564 B2 | 2/2018 | de Rochemont |
| 9,899,844 B1 | 2/2018 | Bell et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,966,784 B2 * | 5/2018 | Leabman ............... H02J 7/345 |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,103,552 B1 | 10/2018 | Leabman et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 * | 12/2018 | Leabman ............... H02J 50/15 |
| 10,158,259 B1 | 12/2018 | Leabman |
| 10,164,478 B2 | 12/2018 | Leabman |
| 10,170,917 B1 | 1/2019 | Bell et al. |
| 10,181,756 B2 | 1/2019 | Bae et al. |
| 10,186,892 B2 | 1/2019 | Hosseini et al. |
| 10,193,396 B1 | 1/2019 | Bell et al. |
| 10,199,835 B2 | 2/2019 | Bell |

(56) References Cited

U.S. PATENT DOCUMENTS

| | | |
|---|---|---|
| 10,199,849 B1 | 2/2019 | Bell |
| 10,205,239 B1 | 2/2019 | Contopanagos et al. |
| 10,211,674 B1 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nage |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |

(56) References Cited

U.S. PATENT DOCUMENTS

| | | |
|---|---|---|
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | SzinI |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |

(56) References Cited

U.S. PATENT DOCUMENTS

| | | |
|---|---|---|
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212071 A1 | 8/2012 | Myabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306433 A1 | 12/2012 | Kim et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |

(56) References Cited

U.S. PATENT DOCUMENTS

| | | |
|---|---|---|
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |

(56) References Cited

U.S. PATENT DOCUMENTS

| | | |
|---|---|---|
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |

(56) References Cited

U.S. PATENT DOCUMENTS

| | | |
|---|---|---|
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0233582 A1 | 8/2016 | Piskun |
| 2016/0238365 A1 | 8/2016 | Wixey et al. |
| 2016/0248276 A1 | 8/2016 | Hong et al. |
| 2016/0299210 A1 | 10/2016 | Zeine |
| 2016/0301240 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077735 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110888 A1 | 4/2017 | Leabman |
| 2017/0110889 A1 | 4/2017 | Bell |
| 2017/0110914 A1 | 4/2017 | Bell |
| 2017/0127196 A1 | 5/2017 | Blum et al. |
| 2017/0134686 A9 | 5/2017 | Leabman |
| 2017/0163076 A1 | 6/2017 | Park et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187228 A1 | 6/2017 | Hosseini |
| 2017/0187248 A1 | 6/2017 | Leabman |
| 2017/0187422 A1 | 6/2017 | Hosseini |
| 2017/0214422 A1 | 7/2017 | Na et al. |
| 2017/0338695 A1 | 11/2017 | Port |
| 2018/0048178 A1 | 2/2018 | Leabman |
| 2018/0123400 A1 | 5/2018 | Leabman |
| 2018/0131238 A1 | 5/2018 | Leabman |
| 2018/0159338 A1 | 6/2018 | Leabman et al. |
| 2018/0159355 A1 | 6/2018 | Leabman |
| 2018/0166924 A1 | 6/2018 | Hosseini |
| 2018/0166925 A1 | 6/2018 | Hosseini |
| 2018/0198199 A1 | 7/2018 | Hosseini |
| 2018/0205232 A1 | 7/2018 | Leabman et al. |
| 2018/0212474 A1 | 7/2018 | Hosseini |
| 2018/0226840 A1 | 8/2018 | Leabman |
| 2018/0241255 A1 | 8/2018 | Leabman |
| 2018/0248409 A1 | 8/2018 | Johnston |
| 2018/0254639 A1 | 9/2018 | Bell |
| 2018/0262014 A1 | 9/2018 | Bell |
| 2018/0262040 A1 | 9/2018 | Contopanagos |
| 2018/0262060 A1 | 9/2018 | Johnston |
| 2018/0269570 A1 | 9/2018 | Hosseini |
| 2018/0287431 A1 | 10/2018 | Liu et al. |
| 2018/0331429 A1 | 11/2018 | Kornaros |
| 2018/0331581 A1 | 11/2018 | Hosseini |
| 2018/0337534 A1 | 11/2018 | Bell et al. |
| 2018/0375340 A1 | 12/2018 | Bell et al. |
| 2018/0375368 A1 | 12/2018 | Leabman |
| 2018/0376235 A1 | 12/2018 | Leabman |
| 2019/0052115 A1 | 2/2019 | Hosseini |
| 2019/0074133 A1 | 3/2019 | Contopanagos |
| 2019/0074728 A1 | 3/2019 | Leabman |
| 2019/0131827 A1 | 5/2019 | Johnston |
| 2019/0173323 A1 | 6/2019 | Hosseini |

FOREIGN PATENT DOCUMENTS

| | | |
|---|---|---|
| DE | 200216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| EP | 3067983 A1 | 9/2016 |
| EP | 3145052 A1 | 3/2017 |
| GB | 2404497 A | 2/2005 |
| JP | 2002319816 A | 10/2002 |
| JP | 2006157586 A | 6/2006 |
| JP | 2007043432 A | 2/2007 |
| JP | 2008167017 A | 7/2008 |
| JP | 2013162624 A | 8/2013 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |

(56) References Cited

FOREIGN PATENT DOCUMENTS

| | | |
|---|---|---|
| WO | WO 2016048512 A1 | 3/2016 |
| WO | WO 2016187357 A1 | 11/2016 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 10, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb.12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP, PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP, PCT/US2014/054953, Mar. 22, 2016, 5 pgs.
Energous Corp., ISRWO , PCT/US2015/067294, Mar. 29, 2016, 7 pgs.
Energous Corp., IPRP , PCT/US2015/067294, Jul. 4, 2017, 6 pgs.
Energous Corp., ISRWO , PCT/US2014/062672 Jan. 26, 2015, 11 pgs.
Energous Corp., IPRP , PCT/US2014/062672 May 10, 2016, 8 pgs.
Energous Corp., ISRWO , PCT/US2014/044810 Oct. 21, 2014, 12 pgs.
Energous Corp., IPRP , PCT/US2014/044810, Jan. 5, 2016, 10 pgs.

(56) References Cited

OTHER PUBLICATIONS

Energous Corp., ISRWO, PCT/US2015/067271, Mar. 11, 2016, 6 pgs.
Energous Corp., IPRP, PCT/US2015/067271, Jul 4, 2017, 5 pgs.
Energous Corp., ISRWO, PCT/US2014/040648, Oct. 10, 2014, 11 pgs.
Energous Corp., IPRP, PCT/US2014/040648, Dec. 8, 2015, 8 pgs.
Energous Corp., ISRWO, PCT/US2014/049673, Nov. 18, 2014, 10 pgs.
Energous Corp., IPRP, PCT/US2014/049673, Feb. 9, 2016, 6 pgs.
Energous Corp., ISRWO, PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., ISRWO, PCT/US2016/068495, Mar. 30, 2017, 9 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., ISRWO, PCT/US2016/068498, May 17, 2017, 8 pgs.
Energous Corp., ISRWO, PCT/US2016/068993, Mar. 13, 2017, 12 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/069316, Mar. 16, 2017, 15 pgs.
Energous Corp., ISRWO, PCT/US2018/012806, Mar. 23, 2018, 9 pgs.
Energous Corp., ISRWO, PCT/US2017/046800, Sep. 11, 2017, 13 pgs.
Energous Corp., IPRP, PCT/US2017/046800, Feb. 12, 2019, 10 pgs.
Energous Corp., ISRWO, PCT/US2017/065886, Apr. 6, 2018, 13 pgs.
Energous Corp., ISRWO, PCT/US2018/031768, Jul. 3, 2018, 9 pgs.
Energous Corp., ISRWO, PCT/US2018/0351082, Dec. 12, 2018, 9 pgs.
Energous Corp., ISRWO, PCT/US2018/064289, Mar. 28, 2019, 14 pgs.
Energous Corp., ISRWO, PCT/US2018/031786, Aug. 8, 2018, 9 pgs.
Energous Corp., ISRWO, PCT/US2019/021817, Apr. 6, 2019, 11 pgs.
Order Granting Reexamination Request Control No. 90/013,793 dated Aug. 31, 2016, 23 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
ReExam Ordered Control No. 90/013,793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application no. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
Extended European Search Report. EP18204043.6, dated Feb. 14, 2019, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antenna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

(56) References Cited

OTHER PUBLICATIONS

Li et al. High-Efficiency Switching-Mode Charger System Design Considerations with Dynamic Power Path Management, Mar./Apr. 2012 Issue, 8 pgs.

* cited by examiner

Figure 2E          Figure 2F

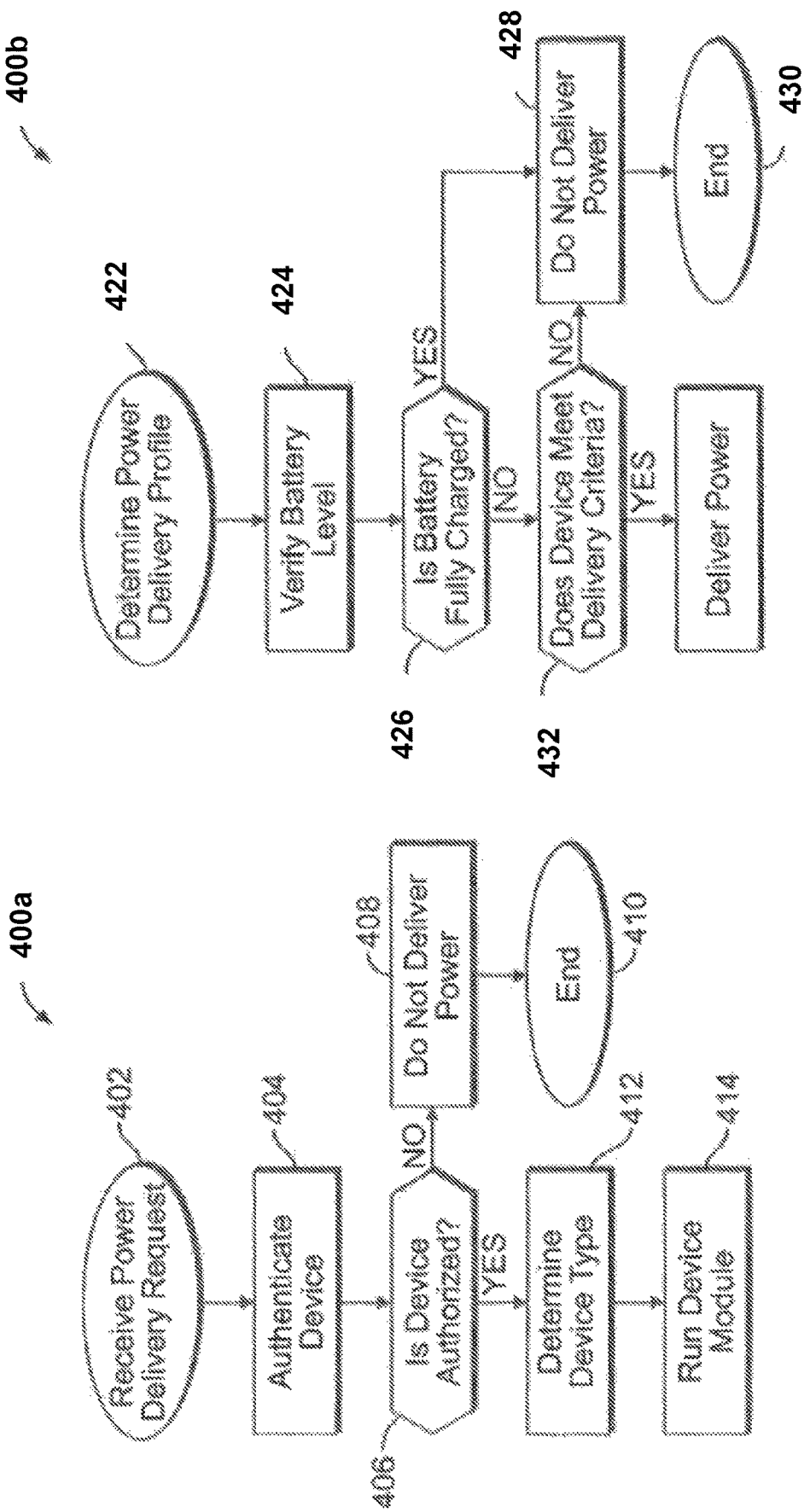

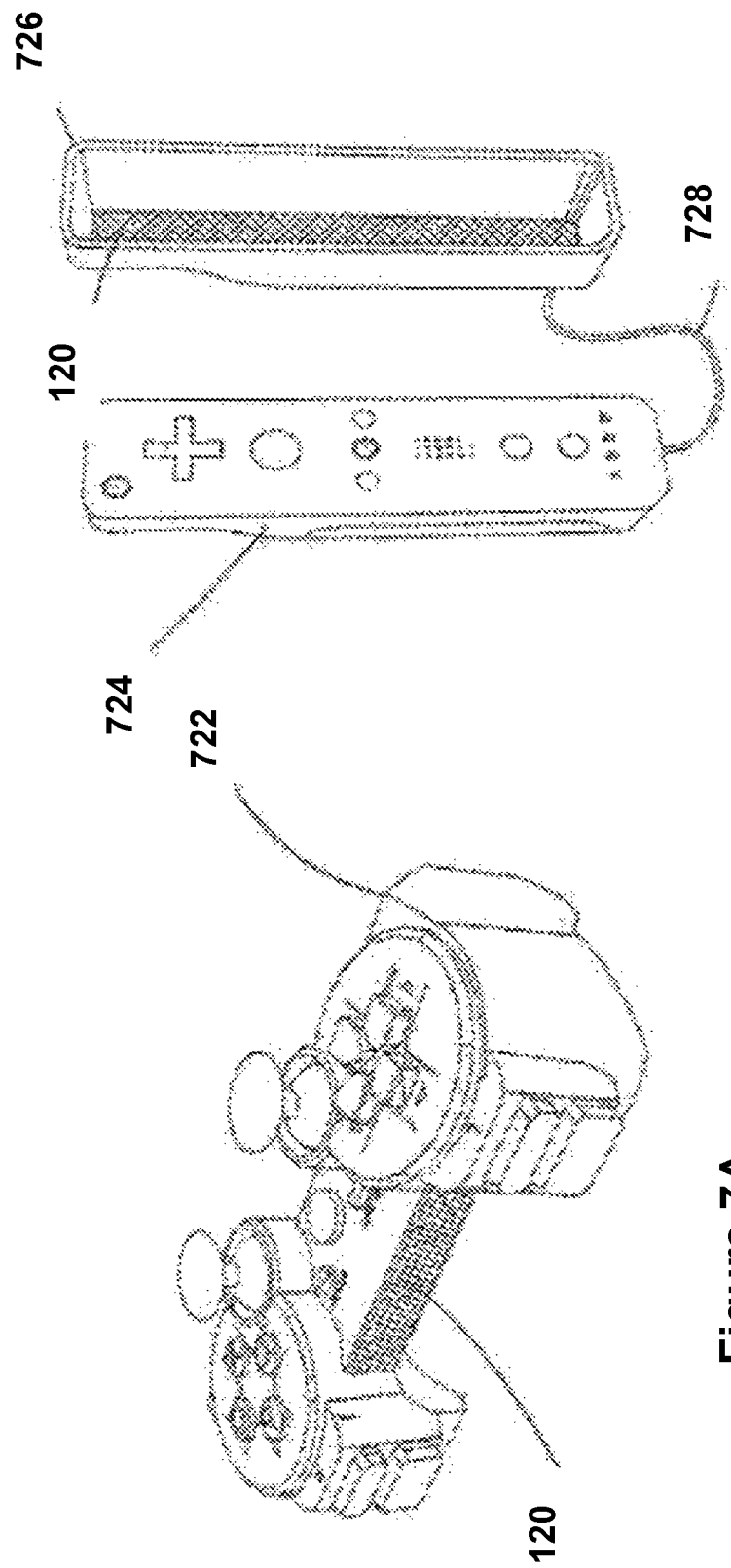

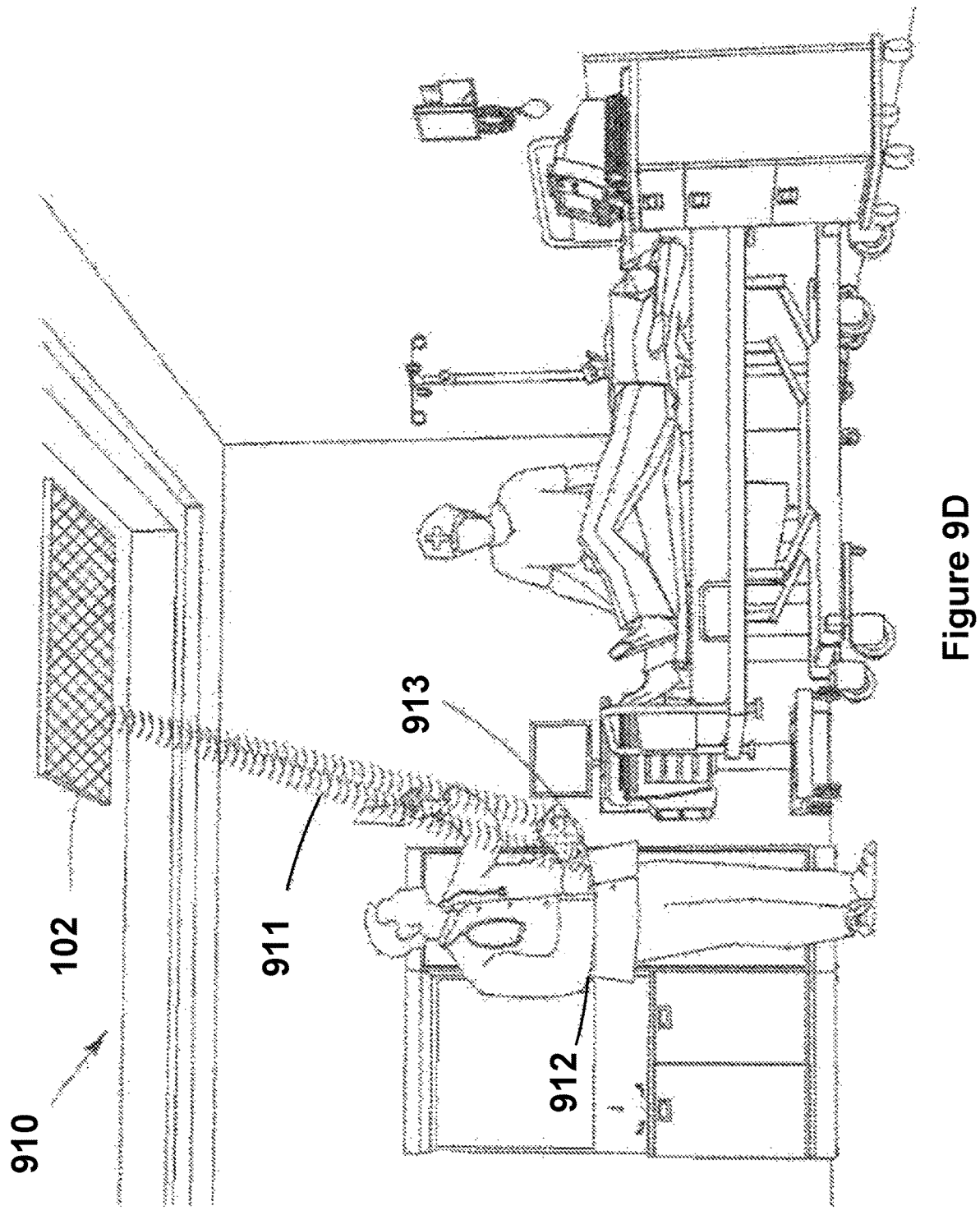

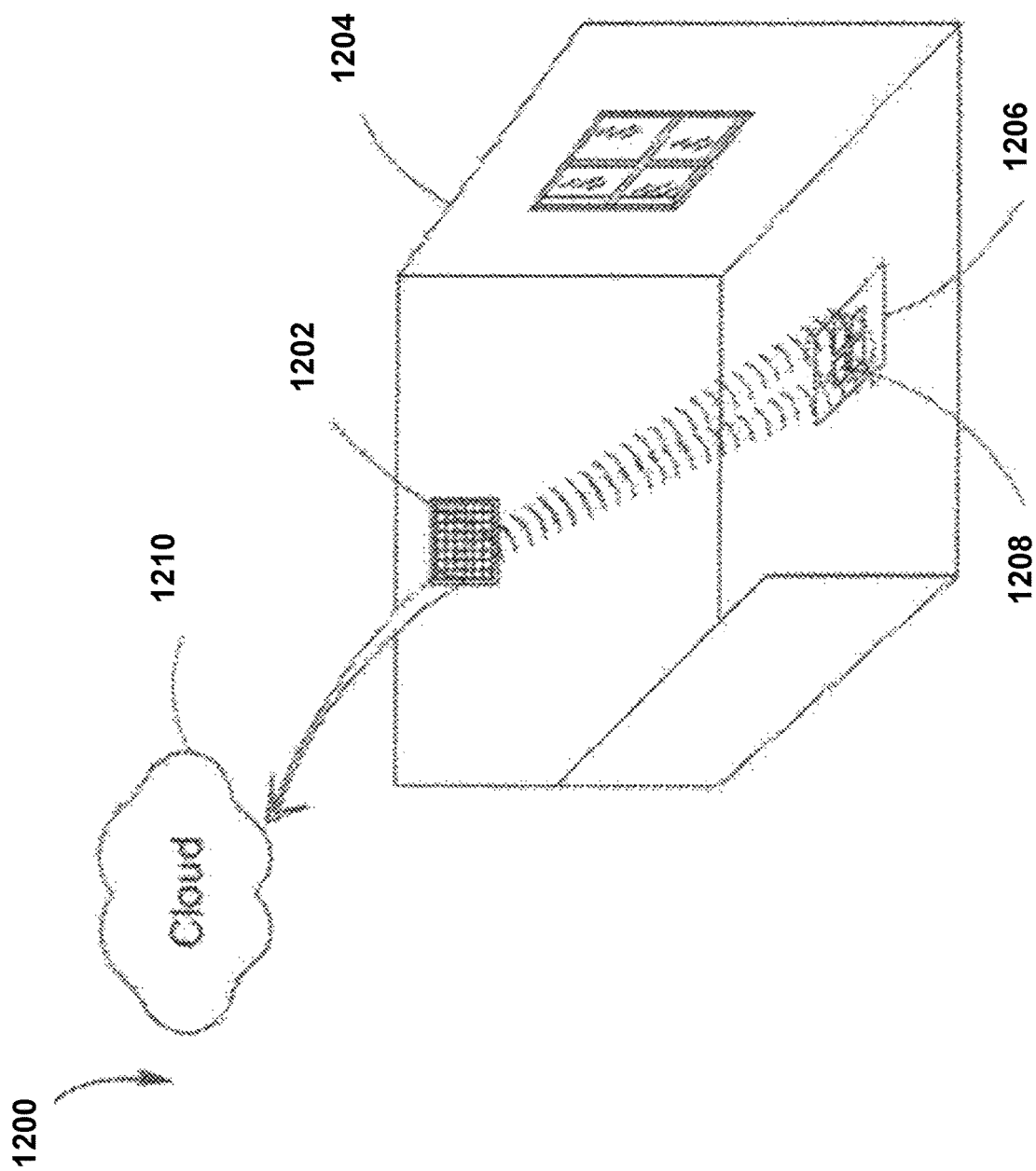

SYSTEM AND METHODS FOR USING SOUND WAVES TO WIRELESSLY DELIVER POWER TO ELECTRONIC DEVICES

RELATED APPLICATIONS

This application is a continuation of U.S. patent application Ser. No. 15/397,723, filed Jan. 3, 2017, which is a continuation-in-part of the following applications: U.S. patent application Ser. No. 14/276,811, filed May 13, 2014; U.S. patent application Ser. No. 14/276,786, filed May 13, 2014 (now U.S. Pat. No. 9,941,705); U.S. patent application Ser. No. 14/276,606, filed May 13, 2014; U.S. patent application Ser. No. 14/273,843, filed May 9, 2014 (now U.S. Pat. No. 9,537,357); U.S. patent application Ser. No. 14/273,271, filed May 8, 2014; U.S. patent application Ser. No. 14/273,253, filed May 8, 2014; U.S. patent application Ser. No. 14/295,003, filed Jun. 3, 2014 (now U.S. Pat. No. 9,966,784); U.S. patent application Ser. No. 14/266,991, filed May 1, 2014; U.S. patent application Ser. No. 14/622,451, filed Feb. 13, 2015; U.S. patent application Ser. No. 15/237,478, filed Aug. 15, 2016 (now U.S. Pat. No. 9,859,758); and U.S. patent application Ser. No. 14/295,032, filed Jun. 3, 2014 (now U.S. Pat. No. 9,537,358). Each of these applications is hereby incorporated by reference in its entirety.

TECHNICAL FIELD

The disclosed embodiments relate generally to wireless power transmission systems and, in particular, to wirelessly transmitting sound waves that are used to provide power to an electronic device.

BACKGROUND

Portable electronic devices, such as laptop computers, mobile phones, tablets, and other electronic devices, require frequent charging of a power-storing component (e.g., a battery) to operate. Many electronic devices require charging one or more times per day. Often, charging an electronic device requires manually connecting an electronic device to an outlet or other power source using a wired charging cable. In some cases, the power-storing component is removed from an electronic device and inserted into charging equipment. Accordingly, charging is time consuming, burdensome, and inefficient because users must carry around multiple charging cables and/or other charging devices, and frequently must locate appropriate power sources to charge their electronic devices. Additionally, conventional charging techniques potentially deprive a user of the ability to use the device while it is charging, and/or require the user to remain next to a wall outlet or other power source to which their electronic device or other charging equipment is connected.

Some other conventional charging systems utilize inductive coils to generate a magnetic field that is used to charge a device. However, such inductive coupling has a limited short range, such as a few inches or less. Users typically must place the device at a specific position on a charging pad and are unable to move the device to different positions on the pad, without interrupting or terminating the charging of the device. This results in a frustrating experience for many users as they may be unable to locate the device at the exact right position on the pad to start charging their device.

SUMMARY

There is a need for systems and methods for wirelessly delivering power to electronic devices using sound waves.

In some embodiments, a method of wirelessly transmitting power using sound waves is provided. The method includes: receiving, at a computer system, information identifying a location of a receiver device that requires charging, wherein the location is within a predetermined range of the computer system; transmitting a first set of sound waves, via one or more transducer elements of a first pocket-forming transmitter that is coupled with the computer system, that converge in three-dimensional space proximate to the predetermined location of the receiver device to form a pocket of energy at the location; while transmitting the first set of sound waves that converge in three-dimensional space proximate to the location of the receiver device to form the pocket of energy at the location: (i) receiving a second set of sound waves from a second pocket-forming transmitter, distinct from the first pocket-forming transmitter; and (ii) charging the computer system by converting energy from the second set of sound waves into usable power.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 2D-2F show arrangements of transducer arrays that may be used in a transmitter, in accordance with some embodiments.

FIG. 4A is a flow diagram of an example routine that may be utilized by a microcontroller of a transmitter to authenticate devices requiring wireless power transmission, in accordance with some embodiments.

FIG. 4B is a flow diagram of an example routine that may be utilized by a microcontroller of a transmitter to deliver power to devices that have been previously authenticated, in accordance with some embodiments.

FIGS. 7A-7B are illustrations of game controllers that are coupled with wireless power receivers, in accordance with some embodiments.

FIGS. 9C-9E are illustrations of wireless power transmission systems for wirelessly delivering power to medical devices, in accordance with some embodiments.

FIGS. 12A-12D illustrate tracking systems that upload to a cloud-based service for use in conjunction with wireless power transmission systems, in accordance with some embodiments.

Figure 1:
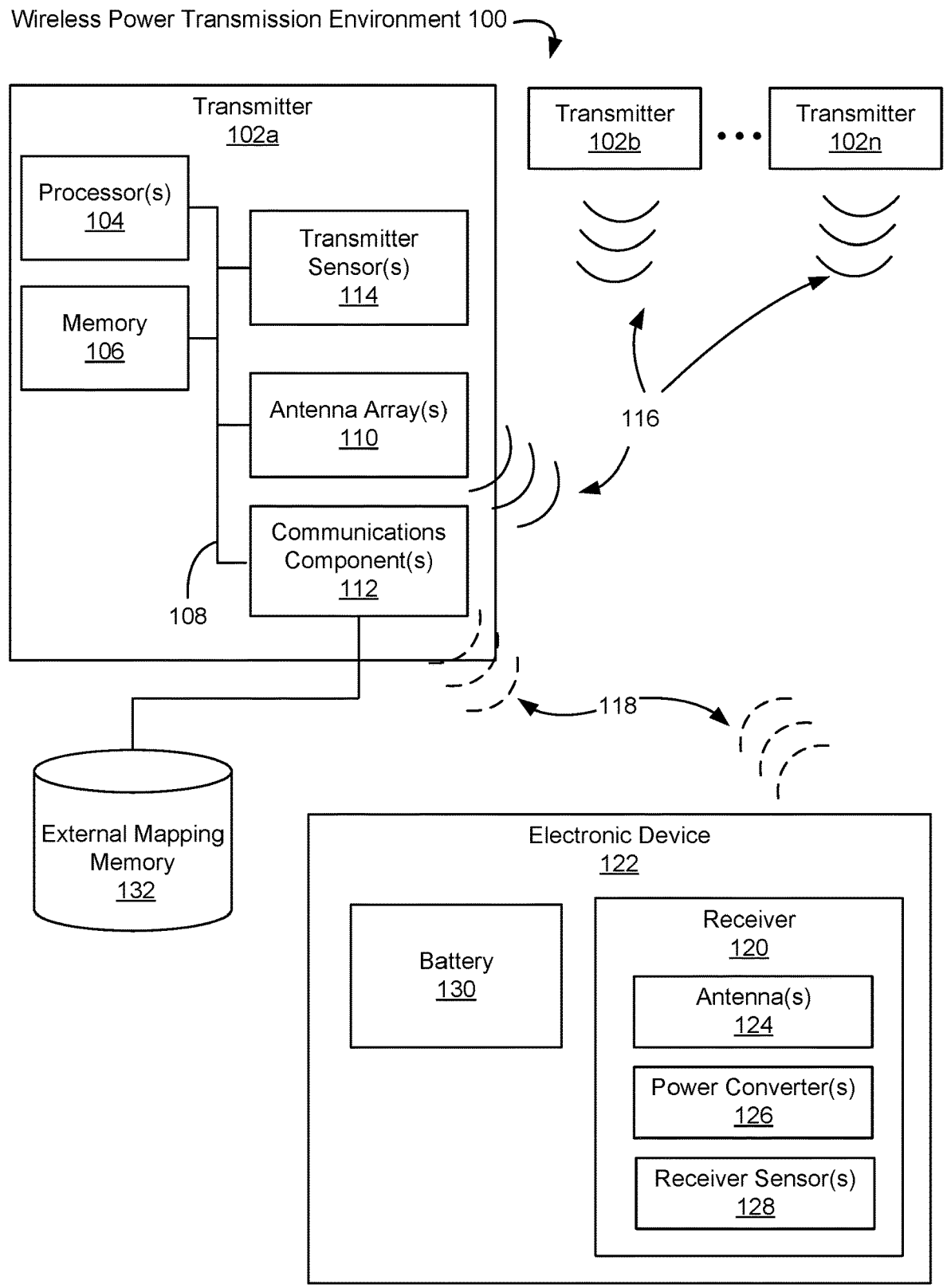
FIG. 1 is a block diagram showing components of a wireless power transmission system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

In some embodiments, one or more transmitters generate power waves to form pockets of energy at target locations and adjust power wave generation based on sensed data to provide safe, reliable, and efficient wirelessly-delivered power to receivers (and devices associated therewith). In some embodiments, the power waves are sound waves that are transmitted in frequencies between 10 kHz and 50 kHz. In some embodiments, a controlled "pocket of energy" (e.g., a region in which available power is high due to constructive interference of power waves) and/or null spaces (e.g., a region in which available power is low or nonexistent due to destructive interference of power waves) may be formed by convergence of the power waves transmitted into a transmission field of the one or more transmitters.

In some embodiments, pockets of energy form at one or more locations in a two- or three-dimensional field due to patterns of constructive interference caused by convergences of transmitted power waves. Energy from the transmitted power waves may be harvested by receivers (i.e., received and converted into usable power) at the one or more locations.

In some embodiments, adaptive pocket-forming is performed, e.g., by adjusting power wave transmission to achieve a target power level for at least some of the power waves transmitted by the one or more transmitters. For example, a system for adaptive pocket-forming includes a sensor. In some embodiments, when the sensor detects an object, such as a sensitive object (e.g., a person, an animal, equipment sensitive to the power waves, and the like) within a predetermined distance (e.g., a distance within a range of 1-5 feet) of a pocket of energy, of one or more of the power waves, or of a transmitter, then a respective transmitter of the one or more transmitters adjusts one or more characteristics of transmitted power waves. Non-limiting examples of the one or more characteristics include: frequency, amplitude, trajectory, phase, and other characteristics used by one or more antennas of the one or more transmitters to transmit the power waves. As one example, in response to receiving information indicating that transmission of power waves by a respective transmitter of the one or more transmitters should be adjusted (e.g., a sensor senses a sensitive object within a predetermined distance of a respective target location), the adaptive pocket-forming process adjusts the one or more characteristics accordingly.

In some embodiments, adjusting the one or more characteristics includes reducing a currently generated power level at a location by adjusting one or more transmitted power waves that converge at the target location. In some embodiments, reducing a currently generated power level includes transmitting a power wave that causes destructive interference with at least one other transmitted power wave. For example, a power wave is transmitted with a first phase that is shifted relative to a second phase of at least one other power wave to destructively interfere with the at least one other power wave in order to diminish or eliminate the currently generated power level at the target location.

In some embodiments, adjusting the one or more characteristics includes increasing a power level for some of the transmitted power waves to ensure that the receiver receives adequate energy sufficient to quickly charge a power-storing component of an electronic device that is associated with the receiver.

In some embodiments, an object is "tagged" (e.g., an identifier of the object is stored in memory in association with a flag) to indicate that the detected object is a sensitive object. In response to detection of a particular object within a predetermined distance of a target location, a determination is made as to whether the particular object is a sensitive object. In some embodiments, this determination includes performing a lookup in the memory to check whether the particular object has been previously tagged and is therefore known as a sensitive object. In response to determining that the particular object is a sensitive object, the one or more characteristics used to transmit the power waves are adjusted accordingly.

In some embodiments, sensing a sensitive object includes using a series of sensor readings from one or more sensors to determine motion of an object within a transmission field of the one or more transmitters. In some embodiments, sensor output from one or more sensors is used to detect motion of the object approaching within a predetermined distance of a pocket of energy or of power waves used to form the pocket of energy. In response to a determination that a sensitive object is approaching (e.g., moving toward and/or within a predefined distance of a pocket of energy), the currently generated power level at the location of the pocket of energy is reduced. In some embodiments, the one or more sensors include sensors that are internal to the one or more transmitters, the receiver, and/or sensors that are external to the one or more transmitters and the receiver and may include thermal imaging, optical, radar, and other types of sensors capable to detecting objects within a transmission field.

Although some embodiments herein include the use of sound-wave-based (or RF-based wave) transmission technologies as a primary example, it should be appreciated that the wireless charging techniques that might be employed are not be limited to such technologies and transmission techniques. Rather, it should be appreciated that additional or alternative wireless charging techniques may be utilized, including any suitable technology and technique for wirelessly transmitting energy so that a receiver is capable of converting the transmitted energy to electrical power. Such technologies or techniques may transmit various forms of wirelessly transmitted energy including the following non-limiting examples: microwave, laser light, infrared, or other forms of electromagnetic energy.

FIG. 1 illustrates components of an example wireless power transmission environment 100, in accordance with some embodiments. Wireless power transmission environment 100 includes, e.g., transmitters 102 (e.g., transmitters 102a, 102b . . . 102n) and a receiver 120. In some embodiments, the wireless power transmission environment 100 includes a number of receivers 120, each of which is associated with a respective electronic device 122.

An example transmitter 102 (e.g., transmitter 102a) includes, e.g., one or more processor(s) 104, a memory 106, one or more antenna arrays 110, one or more communications components 112, and/or one or more transmitter sensors 114. In some embodiments, these components are, interconnected via a communications bus 108. References to these components of transmitters 102 cover embodiments in which one or more than one of each of these components (and combinations thereof) are included.

In some embodiments, memory 106 stores one or more programs (e.g., sets of instructions) and/or data structures, collectively referred to as "modules" herein. In some embodiments, memory 106, or the non-transitory computer readable storage medium of memory 106 stores the following programs, modules, and data structures, or a subset or superset thereof:
- information received from receiver 120 (e.g., generated by receiver sensor 128 and then transmitted to the transmitter 102a);
- information received from transmitter sensor 114;
- an adaptive pocket-forming module that adjusts one or more power waves transmitted by one or more transmitters 102; and/or
- a beacon transmitting module that transmits a communication signal 118 for detecting a receiver 120 (e.g., within a transmission field of the one or more transmitters 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, memory 106 stores a subset of the modules identified above. In some embodiments, an external mapping memory 132 that is communicatively connected to communications component 112 stores one or more modules identified above. Furthermore, the memory 106 and/or external mapping memory 132 may store additional modules not described above. In some embodiments, the modules stored in memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to memory 106 is implemented on memory 104 of a server (not shown) that is communicatively coupled to one or more transmitters 102 and/or by a memory of electronic device 122 and/or receiver 120.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of signals 116 by antenna array 110), one or more communications component processors (configured to, e.g., control communications transmitted by communications component 112 and/or receive communications via communications component 112) and/or one or more sensor processors (configured to, e.g., control operation of transmitter sensor 114 and/or receive output from transmitter sensor 114).

Receiver 120 (e.g., a receiver of electronic device 122) receives power signals 116 and/or communications 118 transmitted by transmitters 102. In some embodiments, receiver 120 includes one or more antennas 124 (e.g., antenna array including multiple antenna elements), power converter 126, receiver sensor 128 and/or other components or circuitry. References to these components of receiver 120 cover embodiments in which one or more than one of each of these components (and combinations thereof) are included. Receiver 120 converts energy from received signals 116 (e.g., power waves) into electrical energy to power and/or charge electronic device 122. For example, receiver 120 uses power converter 126 to convert captured energy from power waves 116 to alternating current (AC) electricity or direct current (DC) electricity usable to power and/or charge electronic device 122. Non-limiting examples of power converter 126 include rectifiers, rectifying circuits, voltage conditioners, among suitable circuitry and devices.

In some embodiments, receiver 120 receives one or more power waves 116 directly from transmitter 102. In some embodiments, receiver 120 harvests power waves from one or more pockets of energy created by one or more power waves 116 transmitted by transmitter 102.

In some embodiments, after the power waves 116 are received and/or energy is harvested from a pocket of energy, circuitry (e.g., integrated circuits, amplifiers, rectifiers, and/or voltage conditioner) of the receiver 120 converts the energy of the power waves (e.g., radio frequency electromagnetic radiation) to usable power (i.e., electricity), which powers electronic device 122 and/or is stored to battery 130 of electronic device 122. In some embodiments, a rectifying circuit of the receiver 120 translates the electrical energy from AC to DC for use by electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, receiver 120 is a component of an electronic device 122. In some embodiments, a receiver 120 is coupled (e.g., detachably coupled) to an electronic device 122. In some embodiments, electronic device 122 is a peripheral device of receiver 120. In some embodiments, electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into usable power for charging the electronic devices 122.

In some embodiments, the one or more transmitters 102 adjust one or more characteristics (e.g., phase, gain, direction, and/or frequency) of power waves 116. For example, a transmitter 102 (e.g., transmitter 102a) selects a subset of one or more antenna elements of antenna array 110 to initiate transmission of power waves 116, cease transmission of power waves 116, and/or adjust one or more characteristics used to transmit power waves 116. In some implementations, the one or more transmitters 102 adjust power waves 116 such that trajectories of power waves 116 converge at a predetermined location within a transmission field (e.g., a location or region in space), resulting in controlled constructive or destructive interference patterns.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit and/or waveform generator, may control the behavior of the antennas. For example, based on the information received from the receiver via the communications signal 118, a controller circuit may determine a set of one or more characteristics or waveform characteristics (e.g., amplitude, frequency, trajectory, phase, among other characteristics) used for transmitting the power waves 116 that would effectively provide power to the receiver 120 and electronic device 122. The controller circuit may also identify a subset of antennas from the antenna arrays 110 that would be effective in transmitting the power waves 116. As another example, a waveform generator circuit of the respective transmitter 102 coupled to the processor 104 may convert energy and generate the power waves 116 having the waveform characteristics identified by the controller, and then provide the power waves to the antenna arrays 110 for transmission.

In some instances, constructive interference of power waves occurs when two or more power waves 116 are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In some instances, destructive interference of power waves occurs when two or more power waves are out of phase and converge into a combined wave such that the amplitude of the combined wave is less than the amplitude of a single one of the power waves. For example, the power waves "cancel each other out," thereby diminishing the amount of energy concentrated at a location in the transmission field. In some embodiments, destructive interference is used to generate a negligible amount of energy or "null" at a location within the transmission field where the power waves converge.

In some embodiments, the one or more transmitters 102 transmit power waves 116 that create two or more discrete transmission fields (e.g., overlapping and/or non-overlapping discrete transmission fields). In some embodiments, a first transmission field is managed by a first processor 104 of a first transmitter (e.g. transmitter 102a) and a second transmission field is managed by a second processor 104 of a second transmitter (e.g., transmitter 102b). In some embodiments, the two or more discrete transmission fields (e.g., overlapping and/or non-overlapping) are managed by the transmitter processors 104 as a single transmission field.

In some embodiments, communications component 112 transmits communication signals 118 via a wired and/or wireless communication connection to receiver 120. In some embodiments, communications component 112 generates communications signals 118 used for triangulation of receiver 120. In some embodiments, communication signals 118 are used to convey information between transmitter 102 and receiver 120 for adjusting one or more characteristics used to transmit the power waves 116. In some embodiments, communications signals 118 include information related to status, efficiency, user data, power consumption, billing, geo-location, and other types of information.

In some embodiments, receiver 120 includes a transmitter (not shown), or is a part of a transceiver, that transmits communications signals 118 to communications component 112 of transmitter 102.

In some embodiments, communications component 112 (e.g., communications component 112 of transmitter 102a) includes a communications component antenna for communicating with receiver 120 and/or other transmitters 102 (e.g., transmitters 102b through 102n). In some embodiments, these communications signals 118 represent a distinct channel of signals transmitted by transmitter 102, independent from a channel of signals used for transmission of the power waves 116.

In some embodiments, the receiver 120 includes a receiver-side communications component (not shown) configured to communicate various types of data with one or more of the transmitters 102, through a respective communications signal 118 generated by the receiver-side communications component. The data may include location indicators for the receiver 120 and/or electronic device 122, a power status of the device 122, status information for the receiver 120, status information for the electronic device 122, status information about the power waves 116, and/or status information for pockets of energy. In other words, the receiver 120 may provide data to the transmitter 101, via the communications signal 118, regarding the current operation of the system 100, including: information identifying a present location of the receiver 120 or the device 122, an amount of energy received by the receiver 120, and an amount of power received and/or used by the electronic device 122, among other possible data points containing other types of information.

In some embodiments, the data contained within communications signals 118 is used by electronic device 122, receiver 120, and/or transmitters 102 for determining adjustments of the one or more characteristics used by the antenna array 110 to transmit the power waves 106. Using a communications signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, receiver 120 uses a communications signal 118 to communicate data for, e.g., alerting transmitters 102 that the receiver 120 has entered or is about to enter a transmission field, provide information about electronic device 122, provide user information that corresponds to electronic device 122, indicate the effectiveness of received power waves 116, and/or provide updated characteristics or transmission parameters that the one or more transmitters 102 use to adjust transmission of the power waves 116.

As an example, the communications component 112 of the transmitter 102 communicates (e.g., transmits and/or receives) one or more types of data (including, e.g., authentication data and/or transmission parameters) including various information such as a beacon message, a transmitter identifier, a device identifier for an electronic device 122, a user identifier, a charge level for electronic device 122, a location of receiver 120 in a transmission field, and/or a location of electronic device 122 in a transmission field.

In some embodiments, transmitter sensor 114 and/or receiver sensor 128 detect and/or identify conditions of electronic device 122, receiver 120, transmitter 102, and/or a transmission field. In some embodiments, data generated by transmitter sensor 114 and/or receiver sensor 128 is used by transmitter 102 to determine appropriate adjustments to the one or more characteristics used to transmit the power waves 106. Data from transmitter sensor 114 and/or receiver sensor 128 received by transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, receiver sensor 128 is a gyroscope that provides raw data such as orientation data (e.g., tri-axial orientation data), and processing this raw data may include determining a location of receiver 120 and/or or a location of receiver antenna 124 using the orientation data.

In some embodiments, receiver sensor 128 includes one or more infrared sensors (e.g., that output thermal imaging information), and processing this infrared sensor data includes identifying a person (e.g., indicating presence of the person and/or indicating an identification of the person) or other sensitive object based upon the thermal imaging information.

In some embodiments, receiver sensor 128 includes a gyroscope and/or an accelerometer that indicates an orientation of receiver 120 and/or electronic device 122. As one example, transmitters 102 receive orientation information from receiver sensor 128 and the transmitters 102 (or a component thereof, such as the processor 104) use the received orientation information to determine whether electronic device 122 is flat on a table, in motion, and/or in use (e.g., next to a user's head).

In some embodiments, receiver sensor 128 is a sensor of electronic device 122 (e.g., an electronic device 122 that is remote from receiver 120). In some embodiments, receiver 120 and/or electronic device 122 includes a communication system for transmitting signals (e.g., sensor signals output by receiver sensor 128) to transmitter 102.

Non-limiting examples of transmitter sensor 114 and/or receiver sensor 128 include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for transmitter sensor 114 and/or receiver sensor 128 include binary sensors that acquire stereoscopic sensor data, such as the location of a human or other sensitive object.

In some embodiments, transmitter sensor 114 and/or receiver sensor 128 is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

In some embodiments, transmitters 102 adjust one or more characteristics used to transmit the power waves 116 to ensure compliance with electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for maximum permissible exposure (MPE), and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$). In some embodiments, output from transmitter sensor 114 and/or receiver sensor 128 is used by transmitter 102 to detect whether a person or other sensitive object enters a power transmission region (e.g., a location within a predetermined distance of a transmitter 102, power waves generated by transmitter 102, and/or a pocket of energy). In some embodiments, in response to detecting that a person or other sensitive object has entered the power transmission region, the transmitter 102 adjusts one or more power waves 116 (e.g., by ceasing power wave transmission, reducing power wave transmission, and/or adjusting the one or more characteristics of the power waves). In some embodiments, in response to detecting that a person or other sensitive object has entered the power transmission region, the transmitter 102 activates an alarm (e.g., by transmitting a signal to a loudspeaker that is a component of transmitter 102 or to an alarm device that is remote from transmitter 102). In some embodiments, in response to detecting that a person or other sensitive object has entered a power transmission region, the transmitter 102 transmits a digital message to a system log or administrative computing device.

In some embodiments, antenna array 110 includes multiple antenna elements (e.g., configurable "tiles") collectively forming an antenna array. Antenna array 110 generates, e.g., RF power waves, ultrasonic power waves, infrared power waves, and/or magnetic resonance power waves. In some embodiments, the antennas of an antenna array 110 (e.g., of a single transmitter, such as transmitter 102a, and/or of multiple transmitters, such as transmitters 102a, 102b, . . . , 102n) transmit two or more power waves that intersect at a defined location (e.g., a location corresponding to a detected location of a receiver 120), thereby forming a pocket of energy at the defined location.

In some embodiments, transmitter 102 assigns a first task to a first subset of antenna elements of antenna array 110, a second task to a second subset of antenna elements of antenna array 110, and so on, such that the constituent antennas of antenna array 110 perform different tasks (e.g., determining locations of previously undetected receivers 120 and/or transmitting power waves 116 to one or more receivers 120). As one example, in an antenna array 110 with ten antennas, nine antennas transmit power waves 116 that form a pocket of energy and the tenth antenna operates in conjunction with communications component 112 to identify new receivers in the transmission field. In another example, an antenna array 110 having ten antenna elements is split into two groups of five antenna elements, each of which transmits power waves 116 to two different receivers 120 in the transmission field.

Figure 2A:
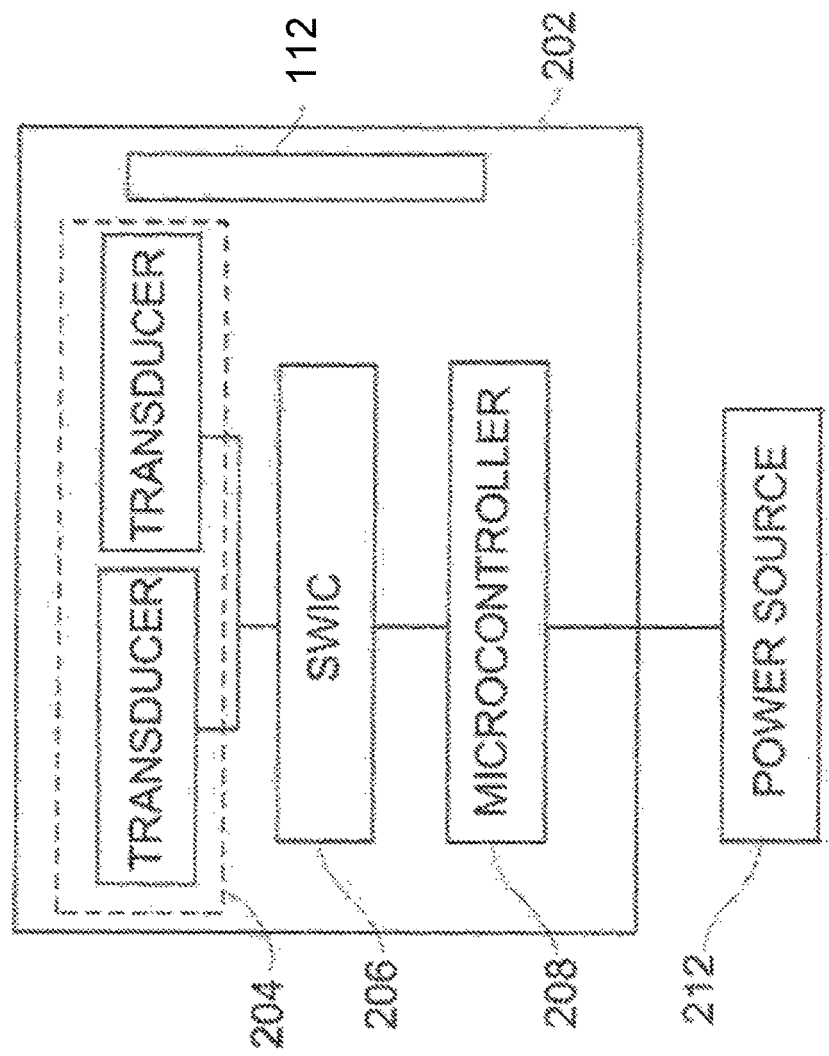
FIG. 2A is a block diagram showing components of a transmitter used in some wireless power transmission systems, in accordance with some embodiments.

Turning now to FIG. 2A, a block diagram is shown that includes certain components of a transmitter used in some wireless power transmission systems, in accordance with some embodiments. As shown in FIG. 2A, in some embodiments, a respective transmitter 200 (e.g., one of the transmitters 102 shown in FIG. 1 and described above) may include a housing 202 with at least two or more transducer elements 204, at least one sound wave integrated circuit (SWIC) 206, at least one microcontroller 208 (e.g., one or the processors 104, FIG. 1), and one or more communications components 112 (also shown in FIG. 1). In some embodiments, housing 202 is made of any suitable material which may allow for signal or wave transmission and/or reception, for example plastic or hard rubber.

In some embodiments, the at least two transducer elements 204 may include suitable transducer types for operating in frequency bands such as 10 KHz to 50 KHz, or other suitable frequency bands for ultrasound waves. In some embodiments, the at least two transducer elements 204 are arranged in suitable combinations to transmit sound waves required to activate a receiver (e.g., receiver 120, FIG. 1), so that the receiver is able to harness energy from the sound waves for powering an electronic device associated with the receiver (e.g., electronic device 122, FIG. 1). Non-limiting examples of transducers include, for example, piezoelectric devices, piezo transducers of ceramic or other suitable materials, among others. In some embodiments, the transducer elements 204 are arranged in a pattern (e.g., as described below in reference to FIG. 2C). In some embodiments, shape and orientation of transducer elements 204 varies to match desired features of a respective transmitter 102, e.g., orientation of transducer elements 204 may be flat in X, Y, and Z axes, or may be otherwise oriented in three-dimensional space. In some embodiments, respective transducer elements 204 of a respective transmitter 102 may operate in independent frequencies, allowing a multichannel operation of transmitting sound waves and producing pockets of energy at desired locations within a transmission field of the transmitter.

In some embodiments, the at least one SWIC 206 includes a proprietary chip for adjusting phases and/or relative magnitudes of sound wave signals which may serve as inputs for the at least two transducer elements 204 for transmitting sound waves that converge constructively to generate pockets of energy at desired locations with a transmission field of the transmitter 102. In some embodiments, these sound wave signals are produced using a power source 212 (e.g., an external or internal power source) and a local oscillator chip (not shown) using a suitable piezoelectric material. In some embodiments, the power source may include a battery of a device in which a transmitter 102 is embedded (e.g., a battery of laptop 602 which may have an embedded transmitter 102, FIG. 6A).

In some embodiments, microcontroller 208 determines optimal times and locations for forming pockets of energy by processor at least in part by processing information sent by a receiver 120 to the communications component 112. In some embodiments, communications component 112 utilizes standard wireless communication protocols to communicate with the receiver, which may include Bluetooth, Wi-Fi or ZigBee communication protocols. In some embodiments, communications component 112 may be used to receive other information from the receiver such as an identifier for the device or user, battery level of an electronic device associated with the receiver, and/or location information about the electronic device. Non-limiting examples of communications components 112 include Bluetooth transceivers, radar, infrared cameras or sound devices for sonic triangulation for determining the device's position.

In some embodiments, the transducer elements 204 are arranged in many different arrays, as shown in FIGS. 2C-2F, and explained in more detail below.

Figure 2B:
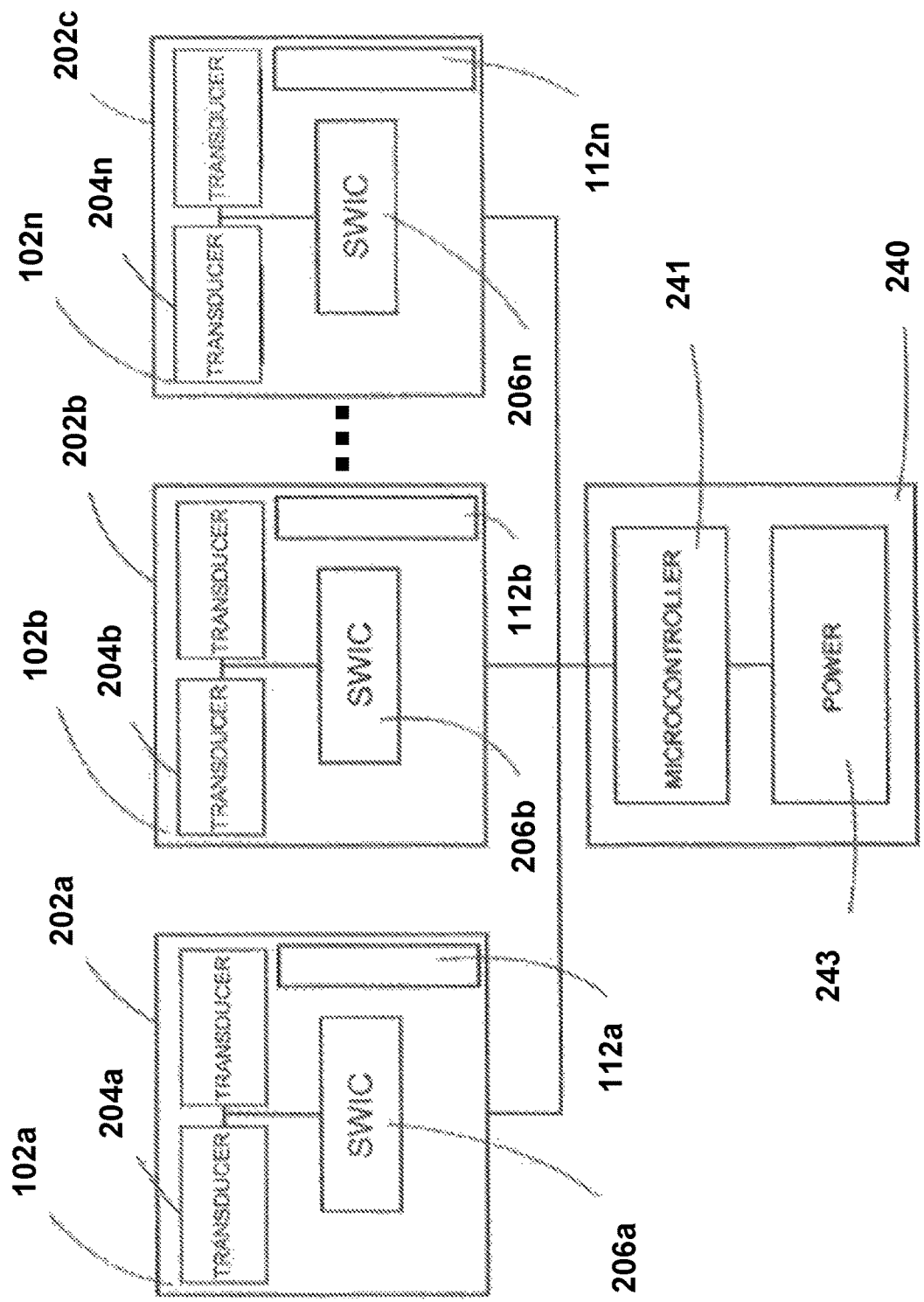
FIG. 2B is a block diagram showing multiple transmitters controlled by a single microcontroller, in accordance with some embodiments.

FIG. 2B is a block diagram showing multiple transmitters controlled by a single microcontroller, in accordance with some embodiments. In some embodiments, a base station 240 may be utilized to help coordinate transmissions of sound waves by a plurality of transmitters 102a through 102n (additional details regarding transmitters 102 are provided above in reference to FIG. 2A).

In some embodiments, the base station 240 may include one or more micro-controller 241, a power source 243, and a housing. In some embodiments, the base station 240 may include connections to each of the transmitters 102. Such connections may include a variety of types of connections, such as coaxial cable, phone cable, LAN cable, wireless connection via Wi-Fi or BLUETOOTH among others. In some embodiments, a respective connection between a transmitter 102 and the base station 240 may be used to link a respective SWIC 206 with the microcontroller 241 and the power source 243, to facilitate controlled transmission of sound waves for wirelessly delivering power to receivers and devices connected therewith.

In some embodiments, the microcontroller 241 may control a variety of features of a respective SWIC 206, including timing for transmitting sound waves, direction of transmitted sound waves, bounce angles for transmitted sound waves, power intensity for transmitted sound waves, and the like, to allow for controlled creation of pockets of energy that form based on constructive interference of sound waves transmitted by the various transmitters 102. In some embodiments, the microcontroller 241 may control multiple transmitters 102 in near simultaneous fashion in order to facilitate creation of multiple pockets of energy. In some embodiments, the microcontroller 241 may also use manage and control communications between respective transmitters and between respective transmitters by controlling respective communication components 112. In this way, the base station 240 is configured to control various features of a single or multiple transmitters.

In some embodiments, base station 240 is coupled with a power source 243, which in turn may be used to provide power to transmitters 102. In some embodiments, power source 243 includes an AC or DC power supply. Voltage, power, and current intensity provided by power source 243 may vary based in dependency with the required sound waves to be transmitted. Use of the power to create sound waves may be managed by microcontroller 241 and carried out by SWIC 206, which may utilize a plurality of methods and components to produce sound wave signals in a wide variety of frequencies, wavelengths, intensities, and other features. As an example, oscillators and piezoelectric crystals may be used to create and change sound frequencies in different transducer elements 204. In some embodiments, a variety of filters may be used for smoothing signals as well as amplifiers for increasing power to be transmitted.

In some embodiments, having the base station 240 manage operations of one or many transmitters 102 allows a single point of control for transmitters located in various rooms or locations within a physical building (e.g., a user's house, as discussed below in reference to FIG. 10). In some embodiments, each respective transmitter 102 transmits sound waves at different or at the same frequencies, power intensities, amplitudes, etc.

Figure 2C:
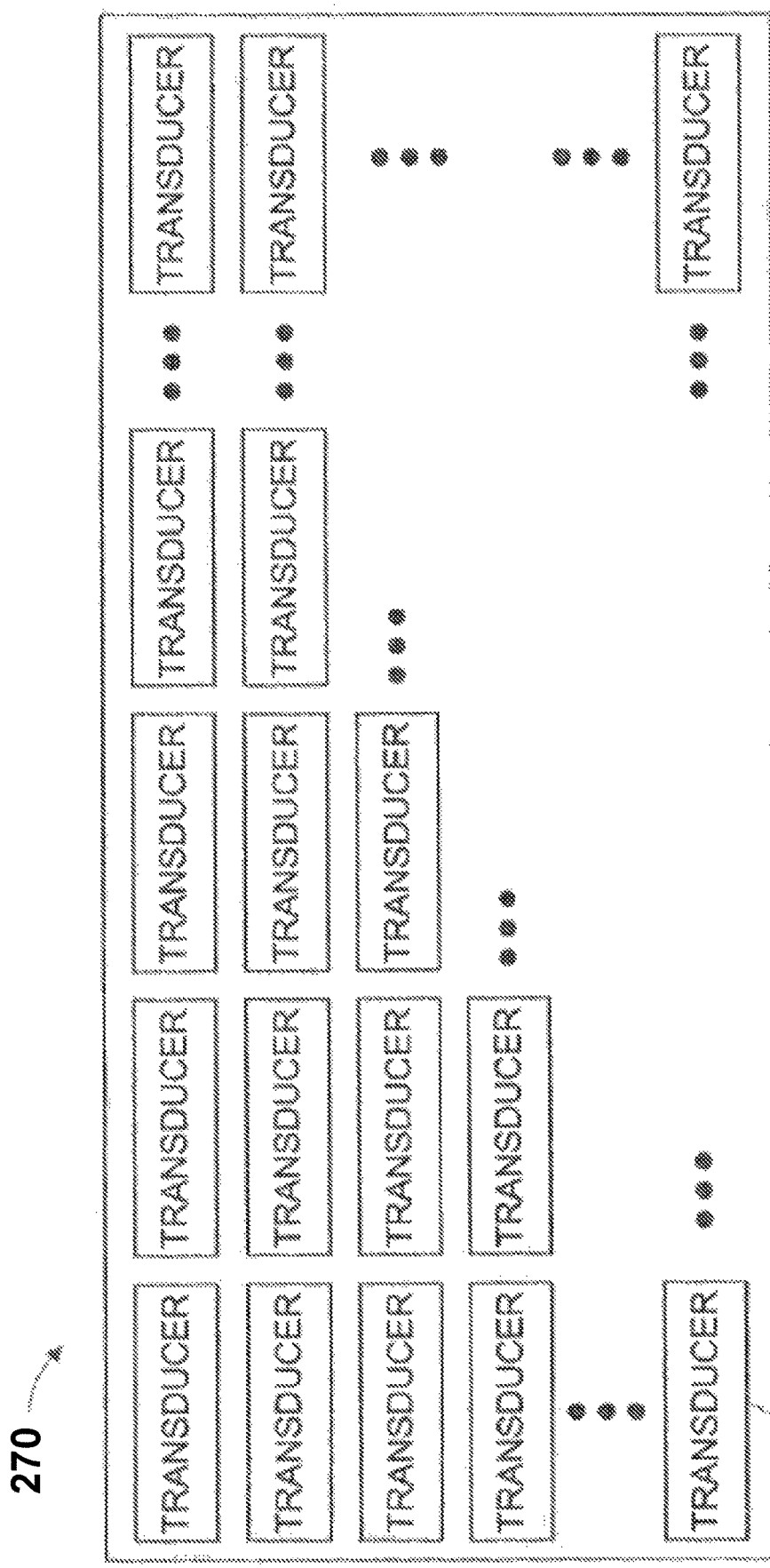
FIG. 2C is a block diagram of a flat panel transducer array that may be used in a transmitter, in accordance with some embodiments.

FIG. 2C is a block diagram of a flat panel transducer array 300 that may be used in a transmitter (e.g., a transmitter 102, such as those discussed above in reference to FIGS. 1, 2A, and 2B), in accordance with some embodiments.

In some embodiments, the flat panel transducer array 300 includes N number of transducer elements 204, where gain requirements for transmitting sound waves are distributed across the N number of transducer elements 204. In some embodiments, the transducer elements 204 are distributed in an equally spaced grid (e.g., an 8×8 grid with a total of 64 transducer elements 204 or a 16×16 grid with a total of 256 transducer elements 204). The number of transducer elements 204 in a particular transducer array may vary in relation with desired range and power transmission capabilities for a respective transmitter 102 (i.e., the more transducer elements 204, the wider range and higher power transmission capability available for the respective transmitter 102). In some embodiments, the transducer array 300 may have a circular pattern or polygon arrangement of transducer elements 204. In some embodiments, the array 300 may also be divided into sets of transducer elements, and each set may then be distributed across multiple surfaces (multi-faceted).

In some embodiments, a transducer array may operate as a single array, a pair array, a quad array, or any other suitable arrangement (as described below in reference to FIGS. 2D-2F), which may be designed to create a transmitter with desired sound wave transmission capabilities.

Figure 2D:
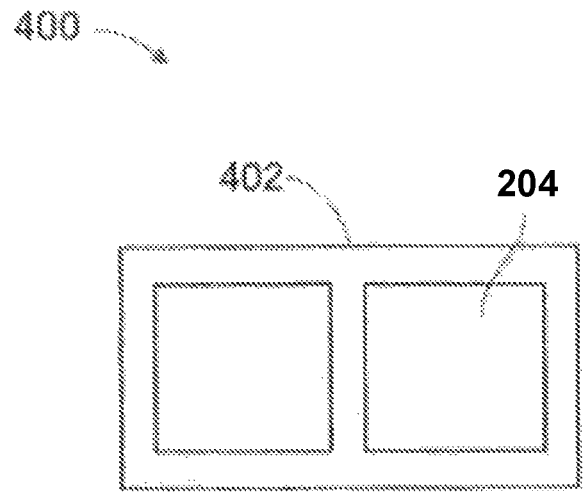
Figure 2D:
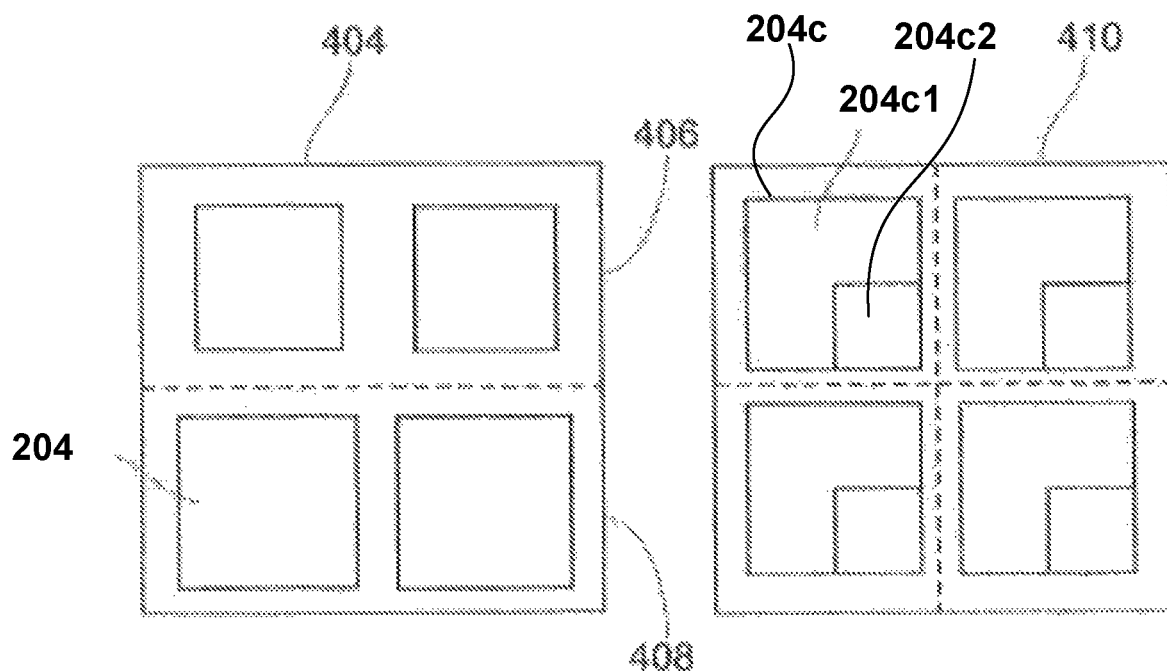

FIGS. 2D-2F show arrangements of example transducer arrays 400a that may be used in a respective transmitter 102, in accordance with some embodiments. In particular, FIG. 2D shows a single array 402 where all transducer elements 204 may operate at 50 KHz. In some embodiments, the single array 402 may be used for transmitting sound waves to a single receiver for charging or powering a single electronic device.

FIG. 2E shows an example pair array 404, including a top half 406 of transducer elements 204, and a bottom half 408 of transducer elements 204. In some embodiments, portions of the example pair array 404 may operate at different frequencies (e.g., each transducer element within the top half 406 may operate at 10 kHz and each transducer element in the bottom half 408 may operate at a frequency of 20 kHz). In some embodiments, transducer elements in each half of the example pair array 404 may vary in size (e.g., those in the top half are slightly smaller than those in the bottom half).

FIG. 2F shows an example quad array 410 where one or more transducer elements 204 may be virtually divided to avoid power losses during wireless power transmission. In some embodiments, a respective transducer element 204c may be virtually divided into two transducer elements, transducer element 204c1 and transducer element 204c2. Transducer element 204c1 may be used for transmitting at a frequency of 50 kHz and transducer element 204c2 may be used for transmitting at a frequency of 10 kHz. In some embodiments, the quad array 410 arrangement of transducer elements may be used in situations where multiple receivers 120 operating at different frequency bands require power.

Figure 3A:
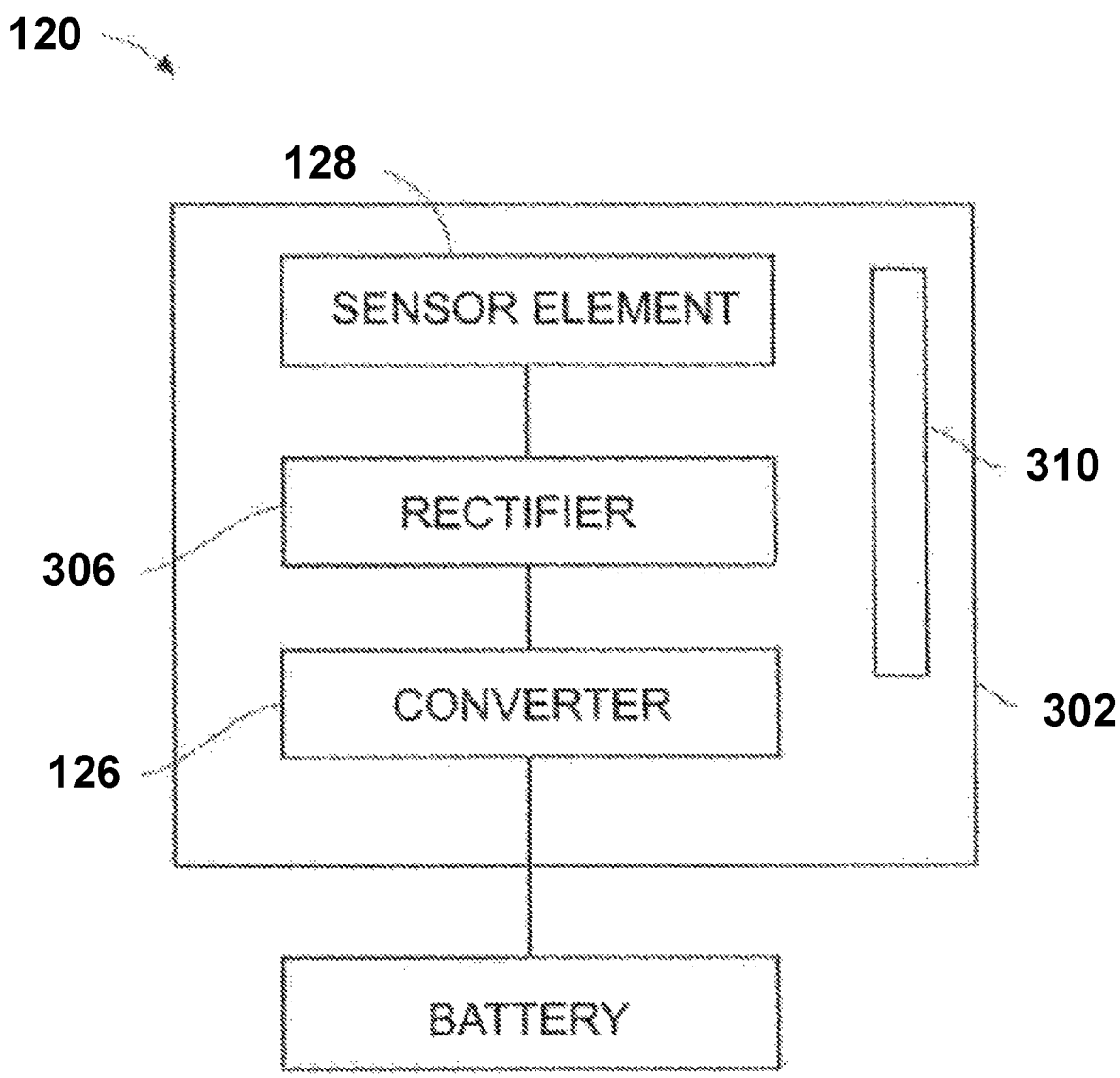
FIG. 3A is a block diagram showing components of a receiver used in some wireless power transmission systems, in accordance with some embodiments.

FIG. 3A is a block diagram showing components of a receiver (e.g., receiver 120, FIG. 1) used in some wireless power transmission systems, in accordance with some embodiments.

In some embodiments, receiver 120 includes a housing 302 with at least one sensor element 128 (also shown in FIG. 1), at least one rectifier 306, at least one power converter 308, and an optional communications component 310. In some embodiments, housing 302 is made of any suitable material which may allow for signal or wave transmission and/or reception, e.g., plastic or hard rubber. In some embodiments, housing 302 may be light, resistant to heat, water, corrosion resistant, durable, and adaptable to different types of environments (e.g., resistant to climate changes). In some embodiments, housing 302 may be part of an external hardware component that is added to different electronic equipment, e.g., in the form of a case, or may be embedded within electronic equipment. In some embodiments, housing 302 provides isolation for components of the receiver 120 to protect it from external factors, such as water and sweat (e.g., for embodiments in which a receiver is embedded in an article of clothing, such as those discussed below).

In some embodiments, sensor element 128 may include suitable sensor types for operating in frequency bands similar to the bands described for transmitter 102 with reference to FIGS. 1 and 2A-2F. In some embodiments, sensor element 128 is any device capable of receiving sound waves or any combination of sounds or signals from a respective transmitter 102. Suitable sensor elements 128 include various types of microphones. In some embodiments, the sensor element 128 is a sound transducer (i.e., a sound sensor) that produces an electrical analog output signal which is proportional to an acoustic sound wave acting upon its flexible diaphragm. In some embodiments, this electrical analog output signal is an electrical image representing characteristics of a waveform representing the acoustic sound wave. In some embodiments, the output signal from a microphone produces an analog signal either in the form of a voltage or current which is proportional to the actual sound wave. Non-limiting examples of types of microphones available as sound transducers include dynamic, electret condenser, ribbon, and piezo-electric crystal types.

In some embodiments, the sensor element 128 is a dynamic moving-coil microphone sound transducer that is configured to optimize wireless power reception from sound waves transmitted by a transmitter 102. In some embodiments, multiple different types of sensor elements 128 are included in a single receiver 120. Using multiple sensor elements 128 may be beneficial for a respective receiver 120 that is coupled with an electronic device that does not have a preferred orientation during usage or whose orientation may vary continuously through time, e.g., a smartphone or portable gaming system. In some embodiments, flexible, piezo transducers, distributed in specific patterns, may be used as the sensor elements 128. Different sensor, rectifier, or power converter arrangements are possible for a receiver 120, as will be evident to one skilled in the art.

In some embodiments, rectifier 306 may be configured to convert the signal (e.g., a sound signal) received by sensor element 128 into a voltage (e.g., DC). Rectifier 306 may include diodes or resistors, inductors or capacitors to rectify alternating current (AC) voltage generated by sensor element 304 to direct current (DC) voltage. In some embodiments, rectifier 306 is placed close to sensor element 128 to minimize any potential loss of energy. In some embodiments, after rectifying AC voltage, DC voltage may be regulated using power converter 126.

In some embodiments, power converter 126 is used for regulating voltage obtained from rectifier 306 to obtain an appropriate output voltage for charging or powering an electronic device. In some embodiments, power converter 126 is a DC-DC converter which may help provide a constant voltage output, regardless of input, to an electronic device, or as in the embodiment to a battery that may be associated with an electronic device. Typical voltage outputs may be from about 5 volts to about 10 volts. In some embodiments in which the receiver 120 is coupled with an article of clothing or blanket (as described below), initial high currents which may break-down operation of an electronic switched mode DC-DC converter may be required. In such a case, a capacitor (not shown) may be added at the output of receiver 300 to provide the extra energy required. Afterwards, lower power may be provided, e.g., 1/80th of the total initial power while having the clothing or blanket (or circuits associated therewith which are powered by the receiver 120) still build up charge.

In some embodiments, communications component 310, which may be a similar device to the communications component 112 of transmitter 112 (FIGS. 1 and 2A), may be included in receiver 120 to communicate with a transmitter or with other equipment. Such a communications component 310 may communicate using standard wireless communication protocols, including Bluetooth, Wi-Fi, or ZigBee communications protocols.

In some embodiments, an embedded receiver 120 may be used to power up one or more capacitors within a given electronic device, e.g. a smartphone, which upon discharging may provide sufficient power to the smartphone. Such a configuration may diminish the size and power capabilities of batteries required for these electronic devices. In some embodiments, depending on the capacitors' size and efficiency, batteries may not even be required in these electronic devices at all.

In some embodiments, a respective receiver 120 may be used in conjunction with tracking systems for observing, following, and recording movements of people, animals, or objects during certain periods of time. In some embodiments, the respective receiver 120 may be coupled with any of a number of devices, e.g., bracelets, necklaces, belts, rings, ear chips, and watches, among others. In some embodiments, a transmitter 102 may be employed for locating the respective receiver 120 through sound wave transmissions (and/or communications between respective communications components of the receiver and the transmitter) between the respective receiver 120 and the transmitter 102. In some instances, such a setup helps to ensure continuous monitoring/tracking, as the respective receiver 120 is constantly charged by the transmitter 102, thus helping to avoid interruptions such as when the respective receiver 120 runs out of power. In some embodiments, this tracking setup also uses data from global positioning systems, real-time location systems, or other tracking systems to help find and monitor the location of living beings such as animals or humans, and/or the location of objects such as cars, electronic devices, and commodities, among others.

Figure 3B:
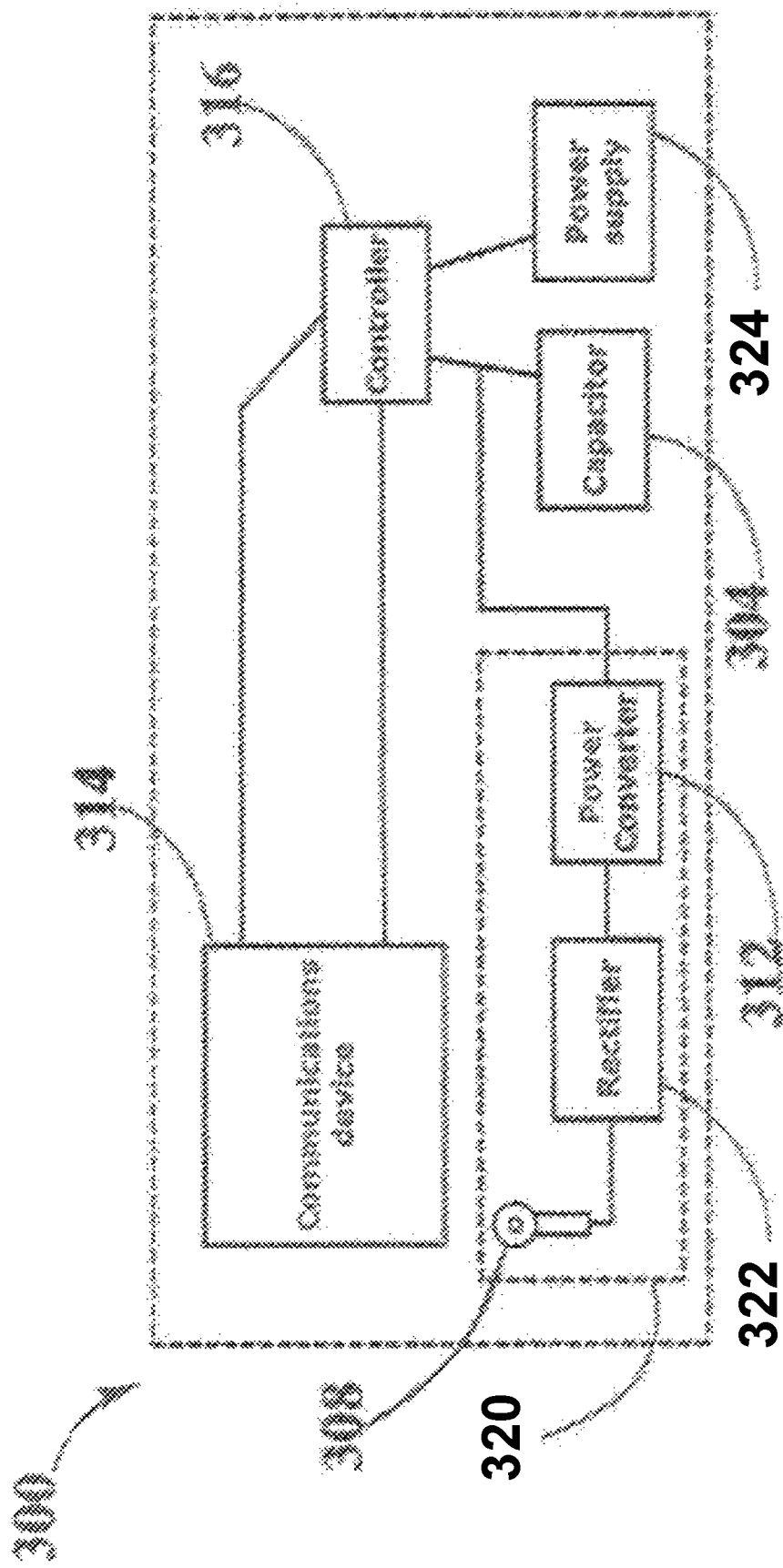
FIG. 3B is a block diagram of an electronic device including at least one embedded receiver and at least one auxiliary power supply for improving the life of the electronic device's main power supply, in accordance with some embodiments.

FIG. 3B is a block diagram of an electronic device 300 including at least one embedded receiver 320 (which may be an instance of the receiver 120 described above) and at least one auxiliary power supply 304 for improving the life of the electronic device's main power supply 324, in accordance with some embodiments.

In some embodiments, the embedded receiver 320, as described above in reference to FIG. 3A, may include at least one sensor element 308 that is configured to convert accumulated energy from sound waves in pockets of energy, produced through pocket-forming transmissions by one or more transmitters 102, into AC voltage. In some embodiments, the embedded receiver 320 also includes at least one rectifier 322 where AC voltage may be converted to direct current (DC) voltage. In some embodiments, the embedded receiver 320 also includes at least one power converter 312 for providing constant DC voltage output to auxiliary power supply 304. In some embodiments, auxiliary power supply 304 is a suitable charge storing device, e.g., a capacitor (which may easily and cheaply be manufactured to have a small size).

Auxiliary power supply 304 may fully or partially power electronic device 300, and thus may fully or partially decrease the power demand on power supply 324 to satisfy the power requirements of electronic device 300. In this way, the life of the main power supply 324 may be extended. In some embodiments, the electronic device 300 may include an existing microcontroller or microprocessor 316 that is configured to manage power loads on auxiliary power supply 304 and/or power supply 324. In some embodiments, the microcontroller 316 is a part of the embedded receiver 320, and is separate and distinct from a microcontroller or processor of the device 300.

FIG. 4A is a flow diagram of an example routine/method 400a that may be utilized by a microcontroller of a transmitter (e.g., microcontroller 208 of transmitter 102, FIG. 2A) to authenticate devices requiring wireless power transmissions, in accordance with some embodiments. The method 400a may begin when transmitter 102 receives a power delivery request 402 from a respective receiver (e.g., receiver 120, FIGS. 1 and 3A). At power delivery request step 402, the receiver may send a signature signal which may be coded using suitable techniques such as delay encoding, orthogonal frequency-division multiplexing (OFDM), code division multiplexing (UM), or other suitable binary coding for identifying a given electronic device that includes the receiver.

In some embodiments, microcontroller 208 may proceed to authentication step 404 where it may evaluate the signature signal sent by the receiver. The microcontroller 208 may then proceed to a determination step 406, at which it is determined whether the electronic device associated with the receiver 120 is authorized to receive wireless power transmissions from the transmitter. If the receiver is not authorized, microcontroller 208 may decide, at decision 406, not to deliver power at step 408, and thus may end routine 400a at end 410 (in some embodiments, the method 400a loops back to step 402 to continue receiving additional power delivery requests). On the other hand, if the receiver is authorized, the microcontroller 208 may then proceed to determine a type of electronic device that is associated with the receiver, at step 412.

At step 412, the microcontroller 208 may obtain information from the receiver that identifies the type of electronic device that is associated with the microcontroller 208, including information identifying a manufacturer, a serial number, total power required, battery level among other such information (in some embodiments, this information is included with the initial power delivery request, while, in other embodiments, this information is sent via a separate communication). Afterwards, the microcontroller 208 may proceed to run a device module at step 414, in which a routine suited to the authenticated device is executed (e.g., a routine that causes the transmitter to transmit sound waves towards the receiver and with a desired frequency, so that the transmitted sound waves form a constructive interference pattern proximate to the receiver). In some embodiments, method 400b (FIG. 4B) is executed at step 414 (method 400b is described in more detail below).

In some embodiments, if multiple receivers require power, the microcontroller 208 may deliver power to each authorized receiver (i.e., as determined after executing the method 400a) or may utilize a priority status for each respective receiver to determine which receiver should receive the wireless power transmissions in which order. In some embodiments, the priority status may be a predefined priority status that is provided by a user. For example, the user may choose to prioritize wireless power transmissions to its smartphone, rather than to its gaming device, and/or may choose to deliver more wireless power transmissions to its smartphone rather than the gaming device. In some embodiments, devices such as smoke detectors, digital door locks, and CCTV cameras may also have a high priority order for receipt of wirelessly delivered powered (as discussed below in reference to FIG. 10).

FIG. 4B is a flow diagram of an example routine/method 400b that may be utilized by a microcontroller of a transmitter (e.g., microcontroller 208 of transmitter 102, FIG. 2A) to wirelessly deliver power to devices that have been previously authenticated, in accordance with some embodiments. In some embodiments, the method 400b is executed in conjunction with step 414 of method 400a, to determine how to wirelessly deliver power to an authenticated device.

In some embodiments, the method 400b starts at determine power delivery profile step 422, in which the microcontroller 208 decides to wirelessly transmit power using either a default power profile or a user-customized profile. When the microcontroller 208 determines that the default power profile will be utilized, the microcontroller 208 then proceeds to verify a battery level of the electronic device, at step 424. At step 424, the microcontroller 208 determines power needs of the electronic device that is coupled with the receiver. Afterwards, microcontroller 208 may proceed to a decision at step 426 regarding whether a battery of the electronic device is fully charged or not. If the battery is fully charged, then the microcontroller 208 proceeds to not deliver power to the device at step 428, and may also end method 400b at step 430 (in other embodiments, the method 400b may return to either step 402 of method 400a). If it is determined that the battery of the electronic device is not fully charged, then the microcontroller 208 proceeds to verify if the electronic device meets specific wireless power delivery criteria at decision step 432. These criteria may depend on characteristics of the electronic device that has been authenticated to receiver power. For example, the criteria may include that smartphones may only receive power if they are not currently being used, or during usage but only if the user is not currently using the device for certain purposes (such as placing a phone call or video call), or maybe during usage as long as a Wi-Fi signal is not interrupted during the transmission of the wireless power signals, among other such criteria.

If it is determined at step 422 that a user-customized profile will be utilized, the user may then specify a minimum battery level for the electronic device to have before it should receive wirelessly delivered power, or the user may specify the power delivery criteria (used in conjunction with step 432), among other customizable options associated with the delivery of wireless power. In some embodiments, the method 400b causes the customizable options to be presented to the user on a graphical user interface of the user's electronic device and the user interacts with that graphical user interface to input their selections.

In some embodiments, microcontroller 208 may also record data on a memory that is in communication with the microcontroller 208. Such data may include powering statistics related to how frequently particular devices require wireless power transmissions, at what times respective electronic devices are requesting power, how long it takes to wirelessly deliver enough power to fully charge respective electronic devices, how much power was delivered to a respective device at a particular point in time, a priority status or order that is used to determine how and when to wirelessly deliver power to various electronic devices, a location at which respective electronic devices are located while they are receiving wirelessly delivered power (for example at home or in the workplace). In some embodiments, these statistics may be uploaded to a cloud-based server or other suitable centralized storage location, so that the user may review the statistics. In some embodiments, stores, coffee shops and the like providing wireless power as a secondary service may use the aforementioned statistics for allocating monetary charges to a user based on how much total power they have received/consumed via their respective devices. In some cases, users may buy powering time, for example, a user may pay for an hour of wirelessly delivered power. Thus, the aforementioned statistics may also be used to help the microcontroller 108 decide when to stop delivering power to devices associated with such a user (e.g., after the purchased hour expires).

Figure 4C:
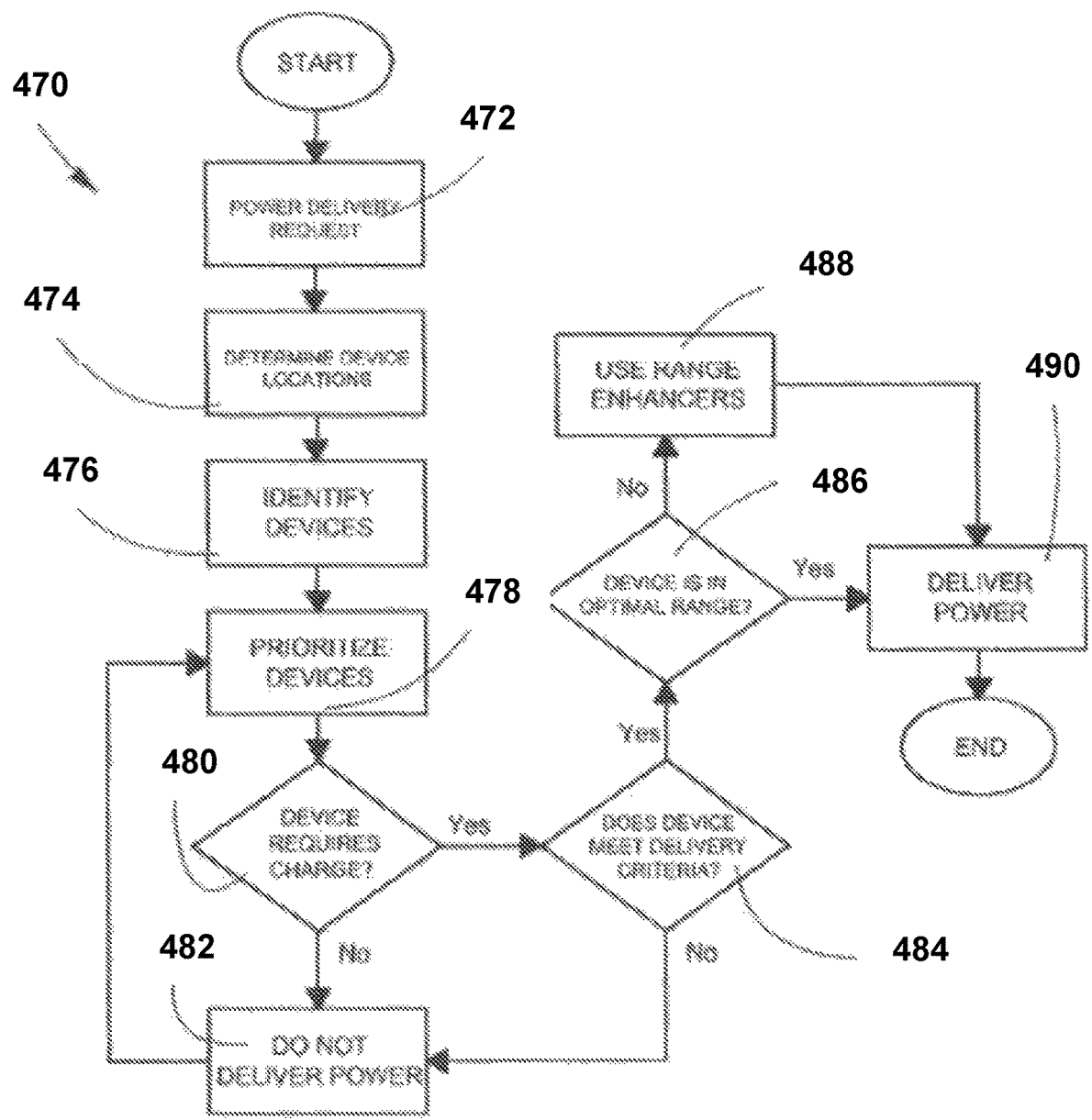
FIG. 4C is a flow diagram of an example routine that may be utilized by a microcontroller of a transmitter (e.g., a transmitter that is associated with a base station, such as that described below in reference to FIG. 10) to deliver power to a receiver, in accordance with some embodiments.
Figure 10:
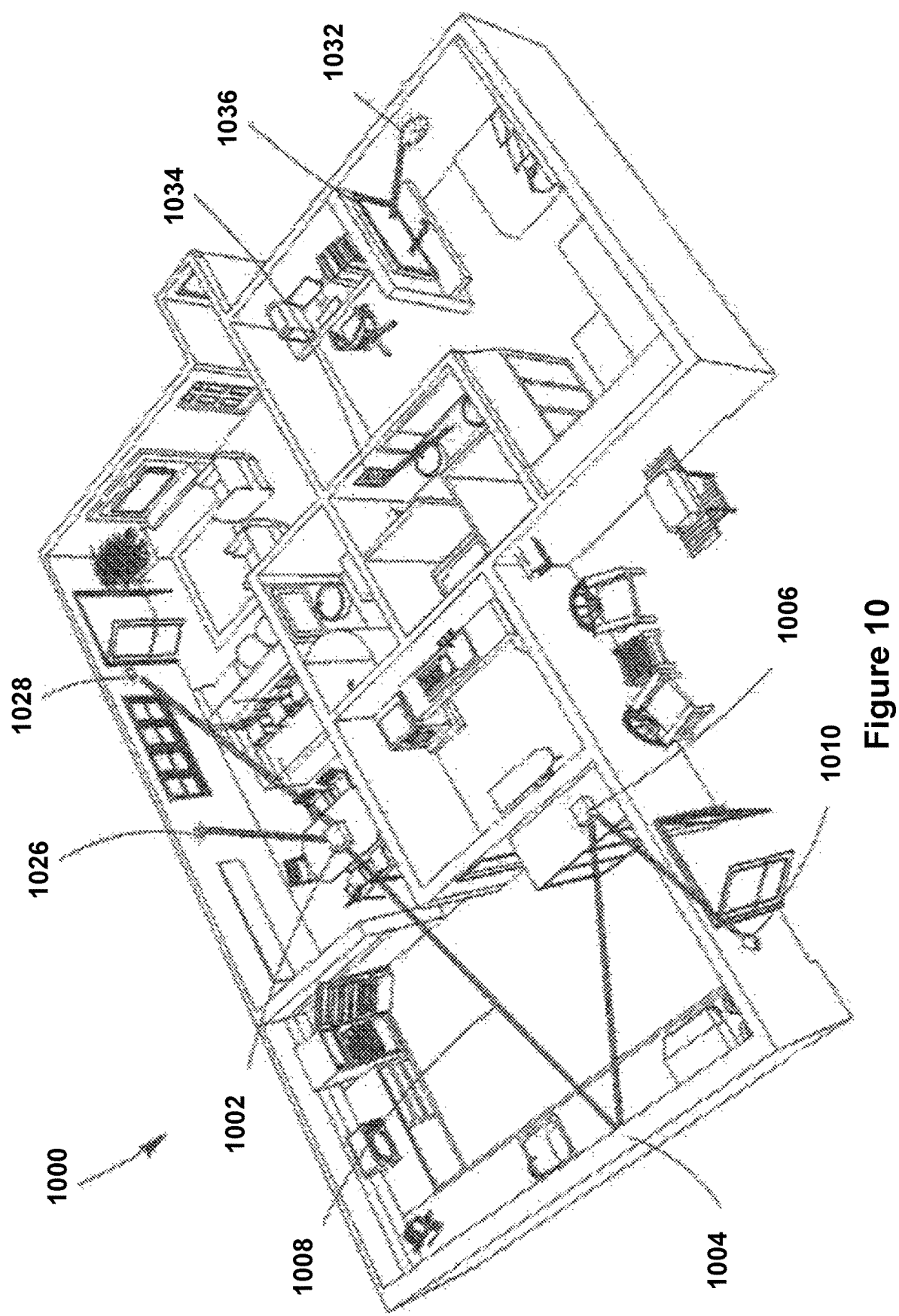
FIG. 10 is an illustration of a house configured with a number of wireless power transmitters and receivers, in accordance with some embodiments.

FIG. 4C is a flow diagram of an example routine/method 470 that may be utilized by a microcontroller of a transmitter (e.g., microcontroller 208 of transmitter 102, FIG. 2A) (e.g., a transmitter that is associated with a base station, such as that described in reference to FIGS. 2B and 10) to deliver power to a receiver, in accordance with some embodiments. In some embodiments, some of the operations of the method 470 may be interchanged with the operations described above in reference to FIGS. 4A-4B.

In some embodiments, the method 470 begins when any transmitter 102 in a wireless powered house (e.g., such as that discussed below in reference to FIG. 10) receives a power delivery request at step 472 from a respective receiver (e.g., receiver 120, FIG. 1). Subsequently, the microcontroller 208 determines device locations at step 474 based on information received from the respective receiver, such as information included in a signal sent via Bluetooth, sound waves, infrared, among others.

At step 476, devices are identified and based on the information sent by the respective receiver (in some embodiments, this information is sent with the information used to determine device locations but, in other embodiments, the respective receiver sends a signature signal to the closest transmitter 102, and such signal may be coded using suitable techniques such as delay encoding, orthogonal frequency-division multiplexing (OFDM), code division multiplexing (CDM) or other suitable binary coding for identifying a given electronic device). At step 476, the microcontroller 208 obtains information (from the signals discussed above) such as type of device, manufacturer, serial number, and/or total power required. Then, microcontroller 208 may proceed to authenticate whether a device associated with the respective receiver is authorized to receive power (as explained above in conjunction with methods 400a and 400b). In some embodiments, authorized devices may receive wirelessly delivered power from the transmitter in accordance with an assigned priority order, as determined at a step 478 (priority order is also discussed above in reference to methods 400a and 400b). In some embodiments, the microcontroller 208 also determines whether a device associated with the respective receiver requires charge 480 (e.g., is a battery of the device below a threshold charge level). If the device does not require charge, the transmitter may not charge it at do not deliver power step 482 (and the method 470 may then return to step 478).

In some embodiments, the microcontroller 208 then determines whether a device meets certain delivery criteria 484. Examples of delivery criteria are provided above in reference to methods 400a and 400b. In some embodiments, the criteria may also include that certain devices may only receive power when located in specific rooms. Such certain devices may include drillers, electric knives, lighters, electric screwdrivers, saws, among other to which operational restrictions may be desirable for safety reasons. In some embodiments the delivery criteria may also include requiring user authentication (e.g., via password verification or biometric authentication) to wirelessly deliver power to these certain devices. In some embodiments, the criteria of limiting certain devices to a particular operational area and requiring user authentication may both be utilized for the certain devices.

In some embodiments, certain data and statistics are collected, as discussed above in reference to FIGS. 4A-4B.

In some embodiments, after step 484, the microcontroller 208 may determine (at step 486) if the respective receiver is within an optimal range (e.g., 5-10 feet) from a closest transmitter 102. If the respective receiver is within the optimal range, then transmitter 102 may start to wirelessly deliver power at step 490. If the respective receiver is outside of the optimal range, then the microcontroller 208 may use reflectors and wireless repeaters (e.g., described below in reference to FIG. 10) for increasing the optimal range, and such operation may be performed at a wireless power delivery range-enhancing step 488.

Figure 5A:
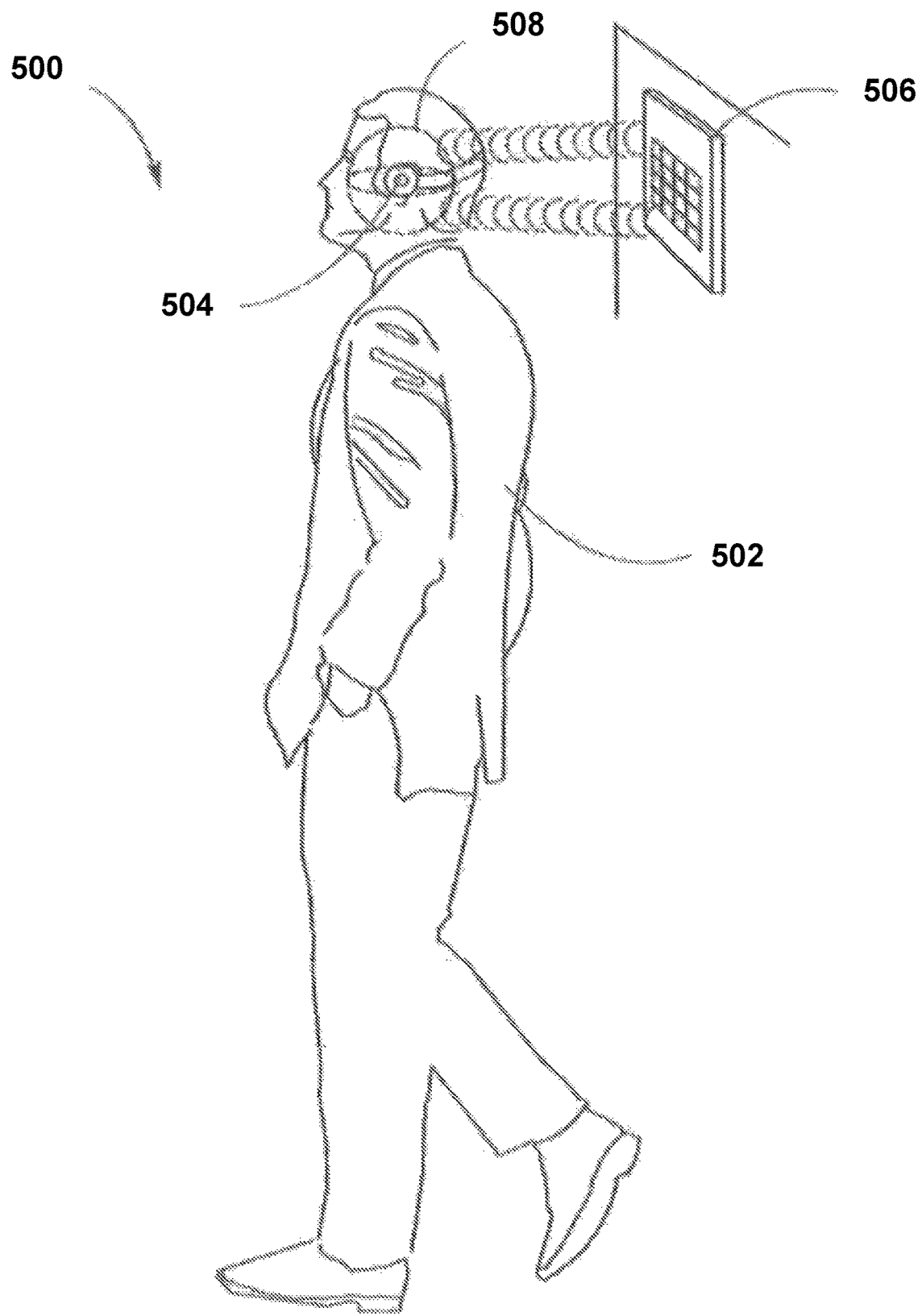
FIG. 5A is an illustration including an electronic device associated with a user, in the form of a Bluetooth headset worn by the user, including at least one embedded receiver for receiving wireless power transmissions from a transmitter, in accordance with some embodiments.
Figure 5B:
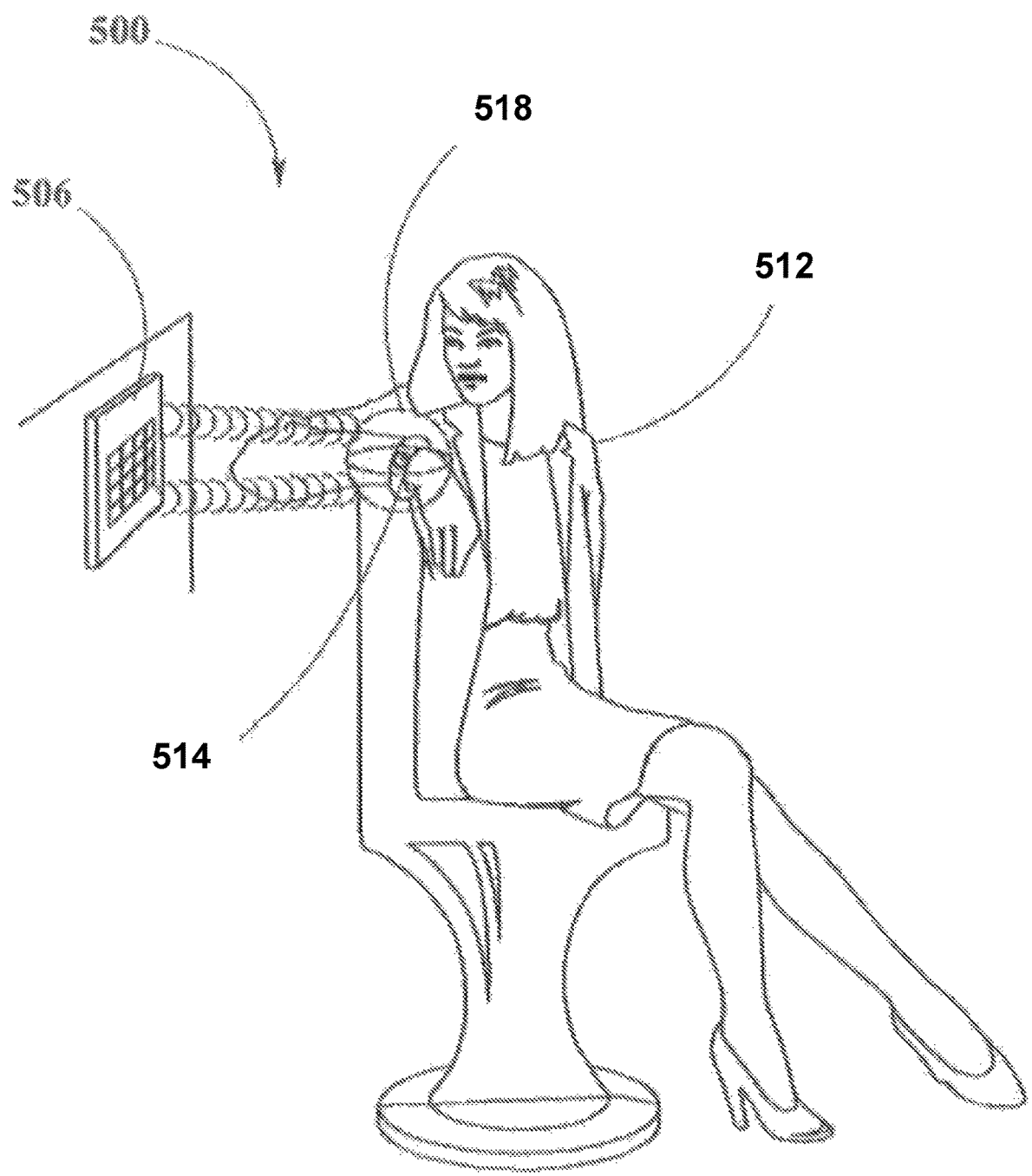
FIG. 5B is an illustration including an electronic device, in the form of a wearable computing device such as a wristwatch, including at least one embedded receiver, for receiving wireless power transmissions from a transmitter, in accordance with some embodiments.

FIGS. 5A-5B illustrate devices that are coupled with receivers (e.g., a respective receiver 120, FIG. 1), so that respective devices are able to wirelessly receive sound wave transmissions from a transmitter (e.g., transmitter 102, or an instance thereof such as transmitter 506) and then convert energy from those transmission into usable power.

In particular, FIG. 5A shows a wireless power delivery system 500 that includes an electronic device associated with a user, in the form of a Bluetooth headset worn by the user, including at least one embedded receiver (e.g., a receiver 120, FIG. 1) for receiving wireless power transmissions from a transmitter as the user moves around, in accordance with some embodiments. As shown in FIG. 5A an individual 502 wearing a Bluetooth-enabled headset 504 that is wirelessly receiving power through pocket-forming techniques (e.g., from sound waves that have accumulated in the form of a pocket of energy 508 near the headset and energy from the sound waves is converted to usable power at the headset using the receiver 120). In some embodiments, transmitter 506 may be located within a house or on other such buildings that individual 502 may frequent. In other embodiments, transmitter 506 may be placed inside the car of individual 502 for wirelessly delivering power to the headset 504 while the user is driving.

FIG. 5B is an illustration of wireless power delivery system 500 including an electronic device, in the form of a wearable computing device such as a wristwatch 514 worn by a user 512, including at least one embedded receiver (e.g., receiver 120, FIG. 1), for receiving wireless power transmissions from a transmitter (e.g., transmitter 102, or an instance thereof such as transmitter 506), in accordance with some embodiments. In some embodiments, because the wristwatch does not include a Bluetooth chip or a microcontroller, the embedded receiver includes these components to allow communications with the transmitter and to have the microcontroller perform certain power management functions (as described above). As shown in FIG. 5B, an individual 512 is wearing a wristwatch 514 that is wirelessly receiving power through pocket-forming techniques (e.g., from sound waves that have accumulated in the form of a pocket of energy 518 near the wristwatch 514 and energy from the sound waves is converted to usable power at the wristwatch 514 using the receiver 120).

Figure 5C:
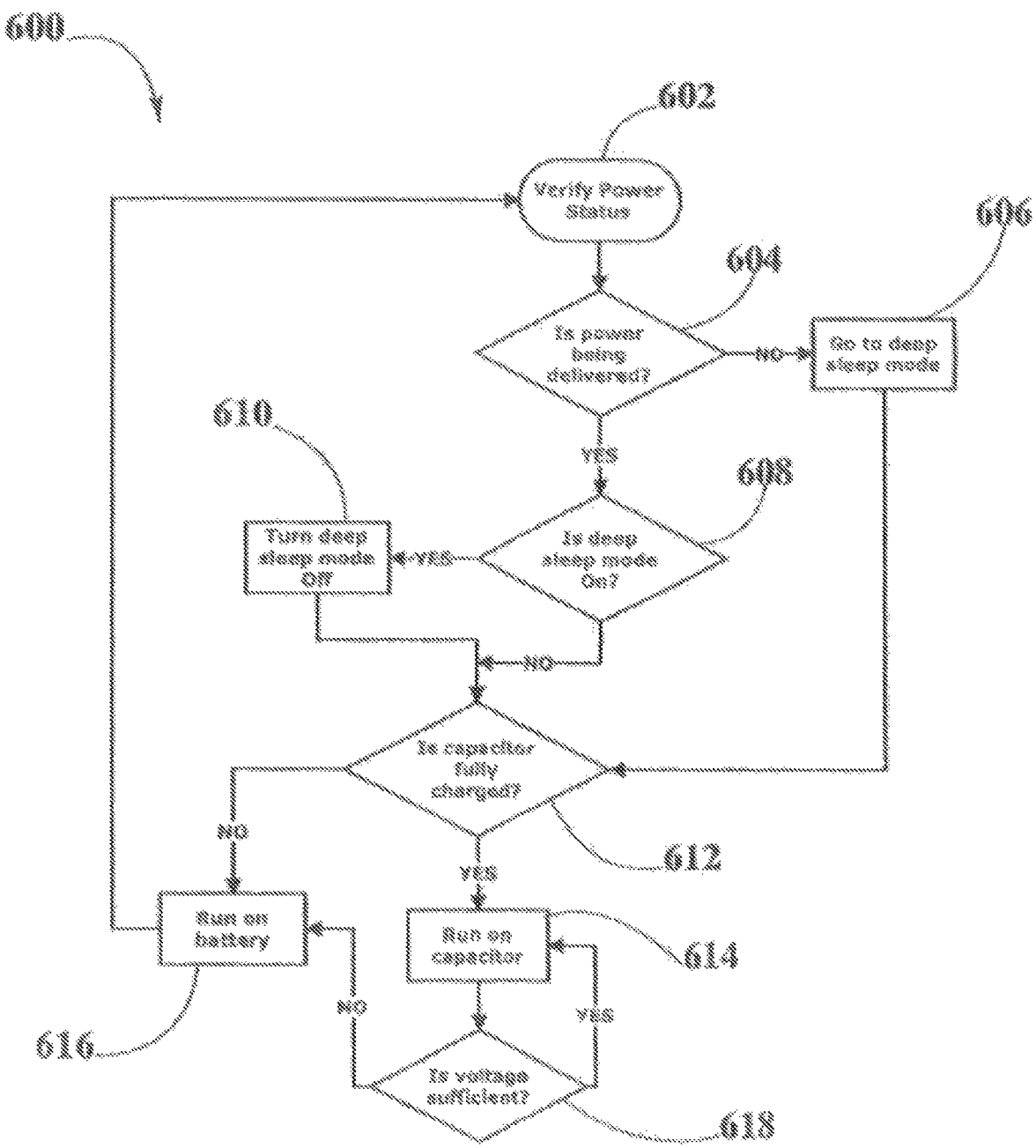
FIG. 5C is a flow diagram of an algorithm that may be used to manage power loads on an electronic device, in accordance with some embodiments.

FIG. 5C is a flow diagram of an algorithm/method 600 that may be used to manage power loads on an electronic device (such as the electronic devices of FIGS. 5A-5B), in accordance with some embodiments.

In some embodiments, the method 600 may be used by a controller, for example a microcontroller of a receiver, for managing power loads on an auxiliary power supply, of an electronic device that is coupled with the receiver, in the form of a capacitor and/or power supply 306 in the form of battery. The method 600 may begin at a verify power step 602 where the microcontroller may determine whether power is being delivered to the receiver. Afterwards, the micro-controller may continue to a power decision step 604 where it may determine whether to proceed either to a deep sleep mode at step 606 or to a deep sleep mode decision step 608 depending on the power delivery status. For example, if power is not being delivered, the microcontroller may proceed to deep sleep mode at step 606 where power saving may be prioritized for the electronic device and the receiver. On the other hand, if power is being delivered, the microcontroller may proceed to a deep sleep mode decision at step 608, where it may determine whether the electronic device is in a deep sleep mode or not. If the electronic device is in the deep sleep mode, then the microcontroller may proceed to turn deep sleep mode off at step 610. Afterwards, the microcontroller may proceed to conduct a determination as to whether a capacitor (or other auxiliary power supply of the electronic device) is fully charged or not at step 612.

On the other hand, if the electronic device is not in the deep sleep mode, the microcontroller may proceed directly to the determination at step 612. At step 612, the microcontroller may determine whether to proceed either to a run on capacitor step 614 or run on battery step 616. If the auxiliary power supply in the form of a capacitor is fully charged, then the microcontroller may proceed to run on capacitor step 614 where the capacitor may be used to provide power to the electronic device. On the other hand, if the capacitor is not fully charged, then the microcontroller may proceed to run on the electronic device's battery at step 616.

Referring back to run on capacitor step 614, a sub-routine may be added where the microcontroller may proceed to a voltage verification step 618, where it may, continuously or on predefined time intervals, verify the voltage across the capacitor to ensure that the electronic device may not turn off. If the voltage level across the capacitor is not sufficient for powering the electronic device, then the microcontroller may proceed to run on the battery at step 616. Otherwise, it may remain at run on capacitor step 614. In any circumstance where the micro-controller reaches run on battery step 616, the method 600 may begin again to verify power delivery status at step 602 and thereby minimize the power load on the main power supply (e.g., the electronic device's battery).

In some embodiments, when deep sleep mode is entered at step 606, the microcontroller may also proceed to capacitor charge decision step 612 to decide whether to run deep sleep mode using either the power supply or the capacitor.

In other embodiments of the method 600, the microcontroller may decide to provide power to the electronic device using the main power supply and the capacitor at the same time. In some embodiments, a plurality of capacitors may all be used as the auxiliary power supply to compensate for power surges or high power demands.

Figure 6A:
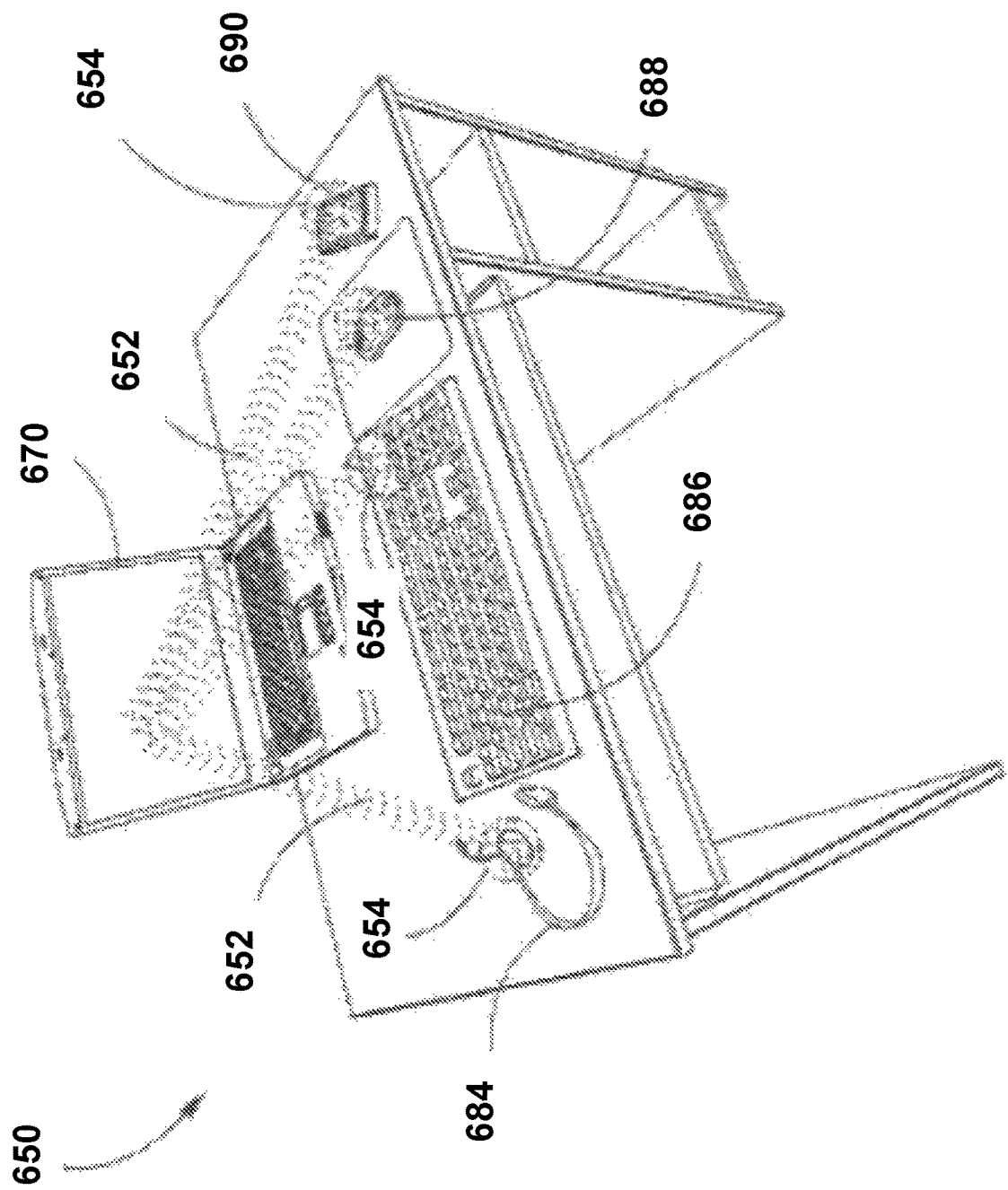
FIG. 6A is an illustration showing a wireless power transmission system used for charging one or more peripheral devices via a transmitter associated with a laptop computer, in accordance with some embodiments.

FIG. 6A is an illustration showing a wireless power transmission system 650 used for charging one or more peripheral devices via a transmitter (e.g., a transmitter 102, FIG. 1) associated with a laptop computer (e.g., a laptop with an embedded transmitter and which may also include an embedded receiver 120), in accordance with some embodiments. The peripheral devices may include a headset 684, a keyboard 686, a mouse 688, and a smartphone 690, among others. In some embodiments, these peripheral devices may operate wirelessly with laptop computer 102 through Bluetooth communication, and may include rechargeable batteries that are charged using wirelessly delivery power, as described below.

A transmitter (which may be embedded within the laptop 670) may transmit controlled sound waves 652 which may converge in 3-D space to form a pocket of energy near one or more of the peripheral devices. These sound waves 652 may be controlled through phase and/or relative amplitude adjustments to form constructive and destructive interference patterns (pocket-forming). Pockets of energy 654 may be formed as constructive interference patterns and may be 3-dimensional in shape, while null-spaces may be generated using destructive interference of sound waves. As explained above, respective receivers 120 embedded in the peripheral devices convert energy from the sound waves that have accumulated in the pockets of energy 654 to usable power for charging or powering batteries in the peripheral devices.

In some embodiments, the laptop computer 670 may be connected to a conventional wall outlet for charging its battery to suitable levels, while providing wireless power transmission to the peripheral devices.

Figure 6B:
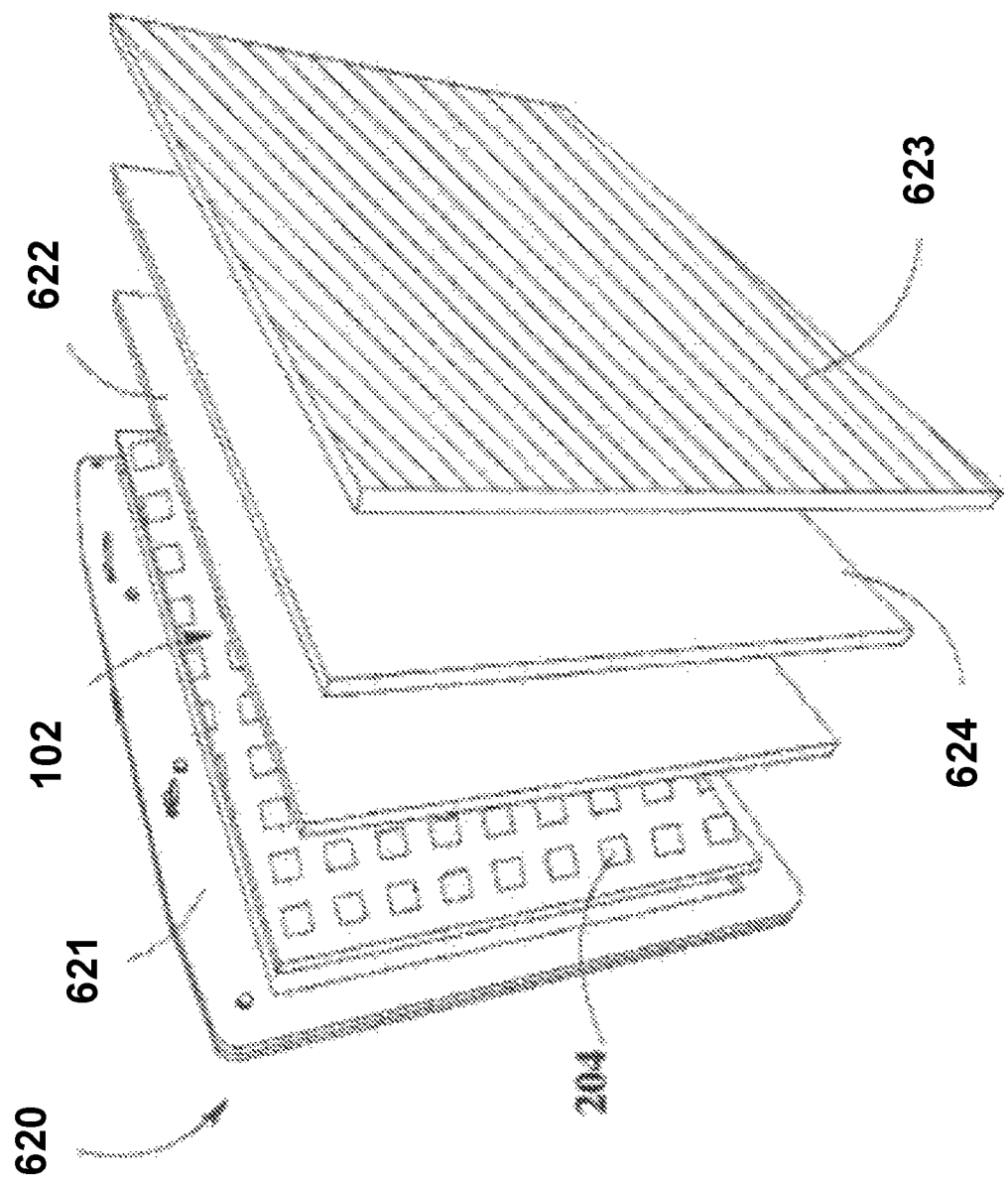
FIG. 6B is an exploded view of a laptop screen, showing components including an embedded wireless power transmitter, in accordance with some embodiments.

FIG. 6B is an exploded view of a laptop screen 620, showing components including an embedded wireless power transmitter 102 with transducer elements 204, in accordance with some embodiments. In some embodiments, the laptop screen 620 may be formed of different layers, including a front transparent screen layer 623, a polarized film layer 624, a LED/LCD back-light layer 622, and a frame 621. In some embodiments, transmitter 102 may be integrated in the screen, specifically between LED/LCD back-light layer 622 and frame 621. As shown in FIG. 6B, the transmitter 102 may include a plurality of transducer elements 204 facing out of the screen. This configuration of transducer elements 204 may allow suitable transmission of sound waves towards the peripheral devices discussed above in reference to FIG. 6A. In other embodiments, the transmitter 102 may be embedded in circuitry elements or metal mesh (touchscreen versions) of the screen.

Figure 6C:
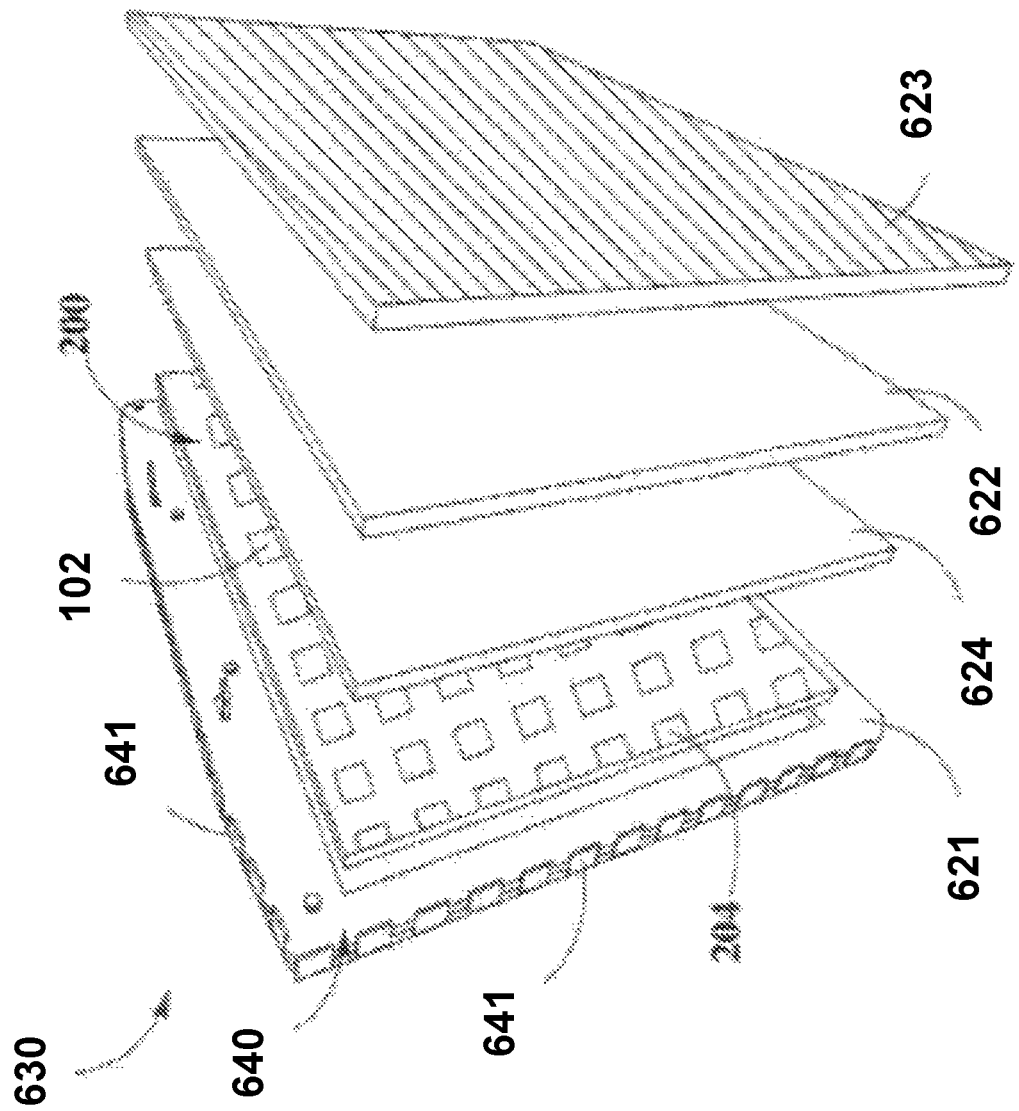
FIG. 6C is an exploded view of a laptop screen, showing components including an embedded wireless power transmitter and an embedded wireless power receiver, in accordance with some embodiments.

FIG. 6C is an exploded view of a laptop screen 630, showing components including an embedded wireless power transmitter 102 with transducer elements 204 and an embedded wireless power receiver 640 (e.g., an instance of receiver 120, FIG. 1), in accordance with some embodiments. The laptop screen 630 may be formed of different layers, as described above in reference to FIG. 6B. In some embodiments, the transmitter 102 may be integrated between LED/LCD back-light layer 624 and frame 621, while receiver 640 may be integrated along frame 621. As shown in FIG. 6C, in some embodiments, transducer elements 204 of transmitter 102 may pointing out of the screen 630, while sensor elements 641 of receiver 640 may be embedded around the edges of frame 621 for allowing reception of sound waves from sources or transmitters at different locations.

The location and configuration of transmitter 102 and receiver 640 in laptop computer screen 630 may vary according to the application. In some embodiments, the receiver 640 may be configured in a middle of the back of frame 621 and may include high directional sensor elements 641 that can be oriented towards a transmitter in proximity to the laptop computer 670 for receiving suitable wirelessly power transmission that may be used to power the laptop 670. In other embodiments, laptop computer screen 630 may include a single transmitter 102 that may also operate as a receiver 640, in which case, transmitter 102 may use same transducer elements 204 for transmitting and receiving sound waves. That is, the transmitter embedded in laptop computer screen 630 may switch between those transducer elements 204 receiving sound waves for charging a battery of the laptop or transmitting sound waves for charging batteries in peripheral devices. An algorithm executed by a microcontroller of the laptop may be used to control the switching between transmitting and receiving sound waves.

Figure 6D:
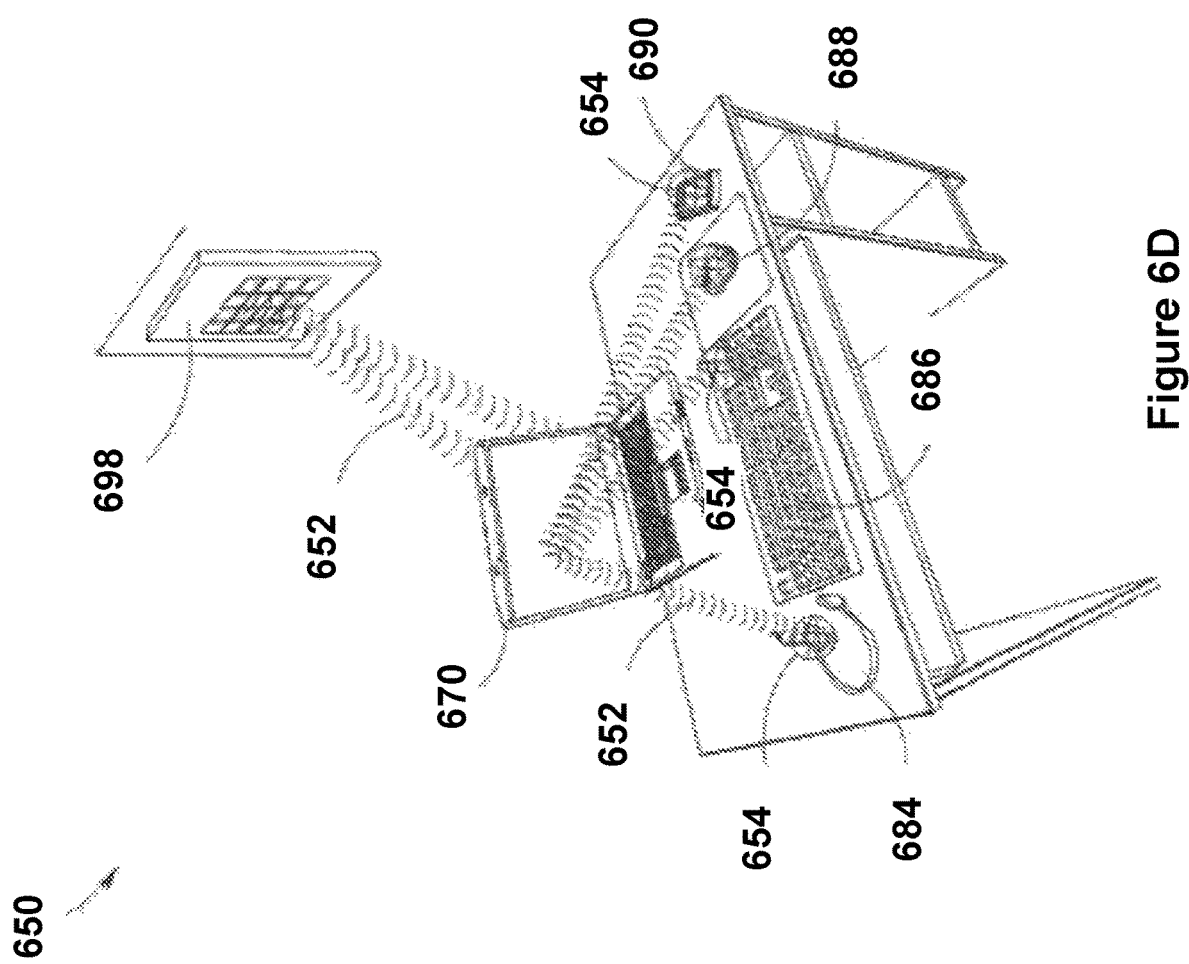
FIG. 6D is an illustration showing a wireless power transmission system in which a laptop computer may receive and transmit sound waves in a substantially simultaneous fashion, in accordance with some embodiments.

FIG. 6D is an illustration showing the wireless power transmission system 650 of FIG. 6A, in which the laptop computer 670 is also configured with an embedded receiver 120, so that the laptop 670 may receive and transmit sound waves in a substantially simultaneous fashion, in accordance with some embodiments. In some embodiments, one or more separate transmitters 698 may direct sound waves 652 towards edges of the laptop computer's screen where sensor elements of the embedded receiver may be integrated (not shown). In this way, pockets of energy may be captured by the sensor elements and utilized by the embedded receiver to charge a battery of the laptop 670. Simultaneously, an embedded transmitter 102 (not shown), may direct sound waves towards one or more peripheral devices.

In some embodiments, transmitter 698 may include a higher amperage power source such as a standard 120/220 volts AC house connection compared to transmitter 102 embedded in the laptop, which may obtain power from only from a battery of the laptop. This may allow the transmitter 698 to have a wider wireless charging range as compared to the embedded transmitter of the laptop. In some embodiments, the various peripheral devices 684, 686, 688, and 690 may receive wirelessly delivered power from either or both of the transmitter 698 and the embedded transmitter of the laptop. In some embodiments, an algorithm processed by a microcontroller of the laptop and/or the transmitter 698 may coordinate wirelessly power delivery operations between the transmitters. For example, this algorithm may decide which transmitter should send sound waves to wirelessly charge peripheral devices, depending on proximity and/or energy levels of a battery in the laptop computer.

Figure 6E:
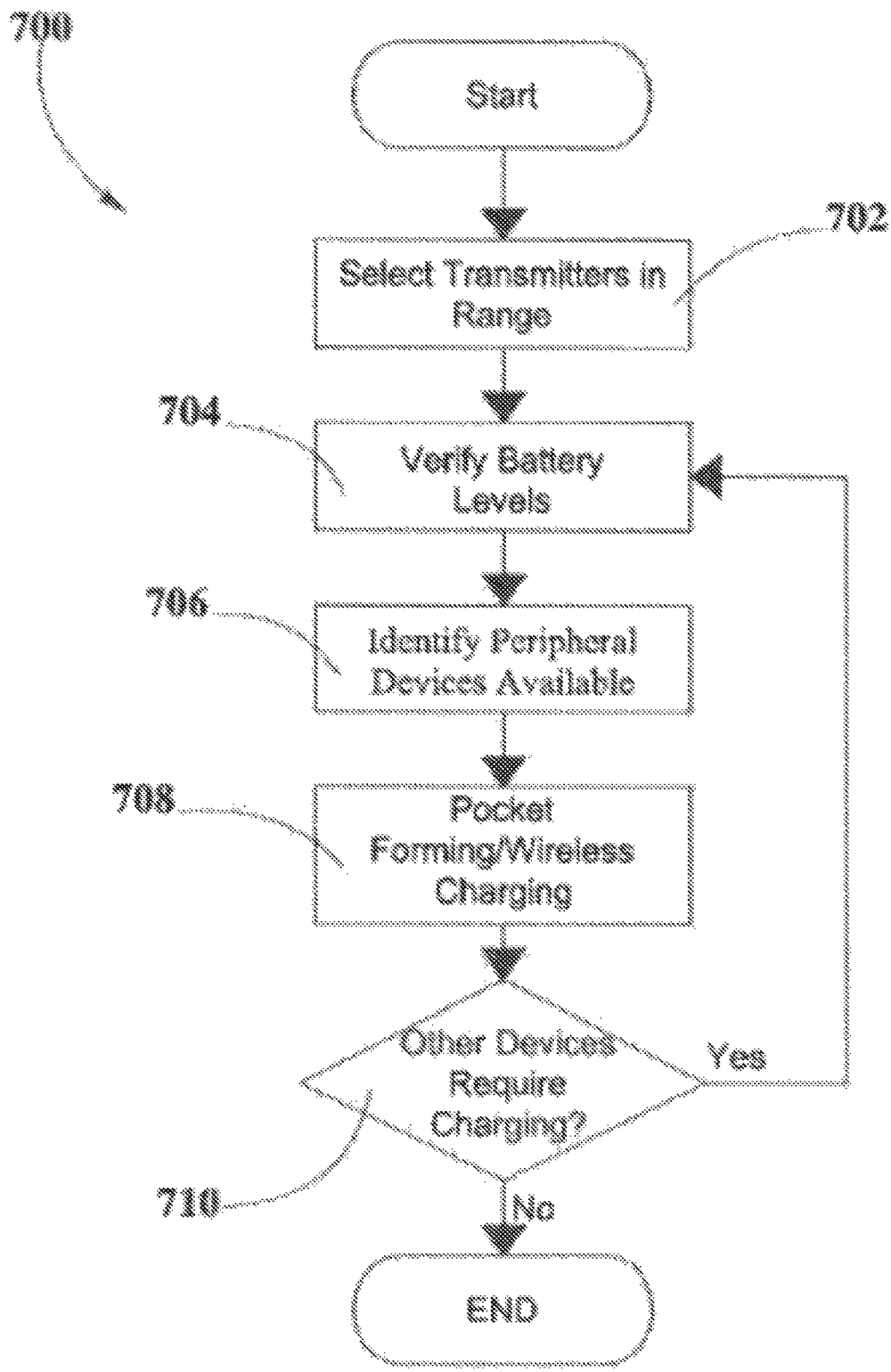
FIG. 6E is a flow diagram of a wireless power transmission process that may be implemented for charging one or more peripheral devices using a laptop computer, in accordance with some embodiments.

FIG. 6E is a flow diagram of a method of wireless power transmission that may be implemented for charging one or more peripheral devices using a laptop computer (e.g., the laptop discussed above in reference to FIGS. 6A-6D), in accordance with some embodiments.

Wireless power transmission process 700 may begin by selecting one or more transmitters in range, at block 702. One or more peripheral devices may require wireless charging, in which case, one or more transmitters in a room, or an embedded transmitter 102 of the laptop may be selected if they are within a suitable range. For example, if a smartphone is not within a suitable charging distance from the laptop (e.g., not in the table, or within 3-4 feet of the laptop), then a higher power transmitter 698 may be selected for delivering wireless power. In some embodiments, a wireless charging distance for the embedded transmitter of the laptop may be within a range of about 1 to 3 meters, and if peripheral devices are outside this range, then they instead will be wirelessly charged by transmitter 698.

The laptop may also include a software application that may provide information about distance, charging levels, efficiency, location, and optimum positioning of the laptop computer with respect to peripheral devices and transmitter 698.

After selecting the transmitter within the optimal charging range, wireless power transmission process 700 may continue by checking charge levels of the battery in the laptop, at block 704. This check may be performed by a control module included in the laptop (not shown) or by a microcontroller included with the transmitted embedded in the laptop. In some embodiments, a charge level of the laptop must be above a certain threshold to allow the laptop to transmit wireless power. For example, minimum and maximum charging thresholds may be established at about 25% and 99% of total charge, respectively. That is, if battery charge is below the minimum threshold or 25%, then the laptop must be connected to a power outlet or it may receive wireless charging from transmitter 698. When battery charge is at 99% or at least above 25%, the laptop 102 may transmit sound waves for charging peripheral devices that are within range.

Wireless power transmission process 700 may continue at block 706, where a communications component of the embedded transmitter or transmitter 698 may identify one or more peripheral devices that may require wireless charging. In some embodiments, priority charging orders are established and utilized to ensure that the one or more peripheral devices are charged in a particular order.

After the one or more peripheral devices are identified and charging priorities/parameters in the embedded transmitter or transmitter 698 are set, transmission of sound waves towards designated peripheral devices can begin, at block 708, where these sound waves may constructively interfere to generate pockets of energy proximate to the peripheral devices, which pockets of energy may be converted by respective embedded receivers to usable power for powering or charging the one or more peripheral devices, sequentially or simultaneously.

Using a communications component, the embedded transmitter of the laptop or transmitter 698 on the wall may continuously check if there are other peripheral devices that may require wireless charging or powering, at block 710. If new or additional peripheral devices are identified, then either transmitter may wirelessly charge the newly identified peripheral devices according to the established charging priorities, optimum ranges, battery levels and/or other parameters. If no further peripheral devices are recognized or need wireless charging, then wireless power transmission process 700 may end.

FIGS. 7A-7B are illustrations of game controllers 720 and 722 that are coupled with wireless power receivers 120, in accordance with some embodiments. As shown in FIG. 7A, a receiver 120 may be integrated on a front side of the game controller 720, and the receiver 120 may include an array of sensor elements strategically distributed to match the game controller's design.

In FIG. 7B, another game controller 722 is shown and that controller includes a receiver 120 that is integrated with an additional case 726 to provide wireless power receiver capabilities to the game controller 724. Case 726 may be made out of plastic rubber or any other suitable material for cases, and it may include an array of sensor elements located on the back side of the case, which number and type may be calculated according to the game controller design. Case may also be connected to game controller 724 through a cable 728, or in other embodiments, the case 726 may be attached to a surface of the game controller 726.

FIGS. 7C-7G illustrate various wireless power transmission systems in which power is wirelessly delivered to electronic devices using sound waves, in accordance with some embodiments.

Figure 7C:
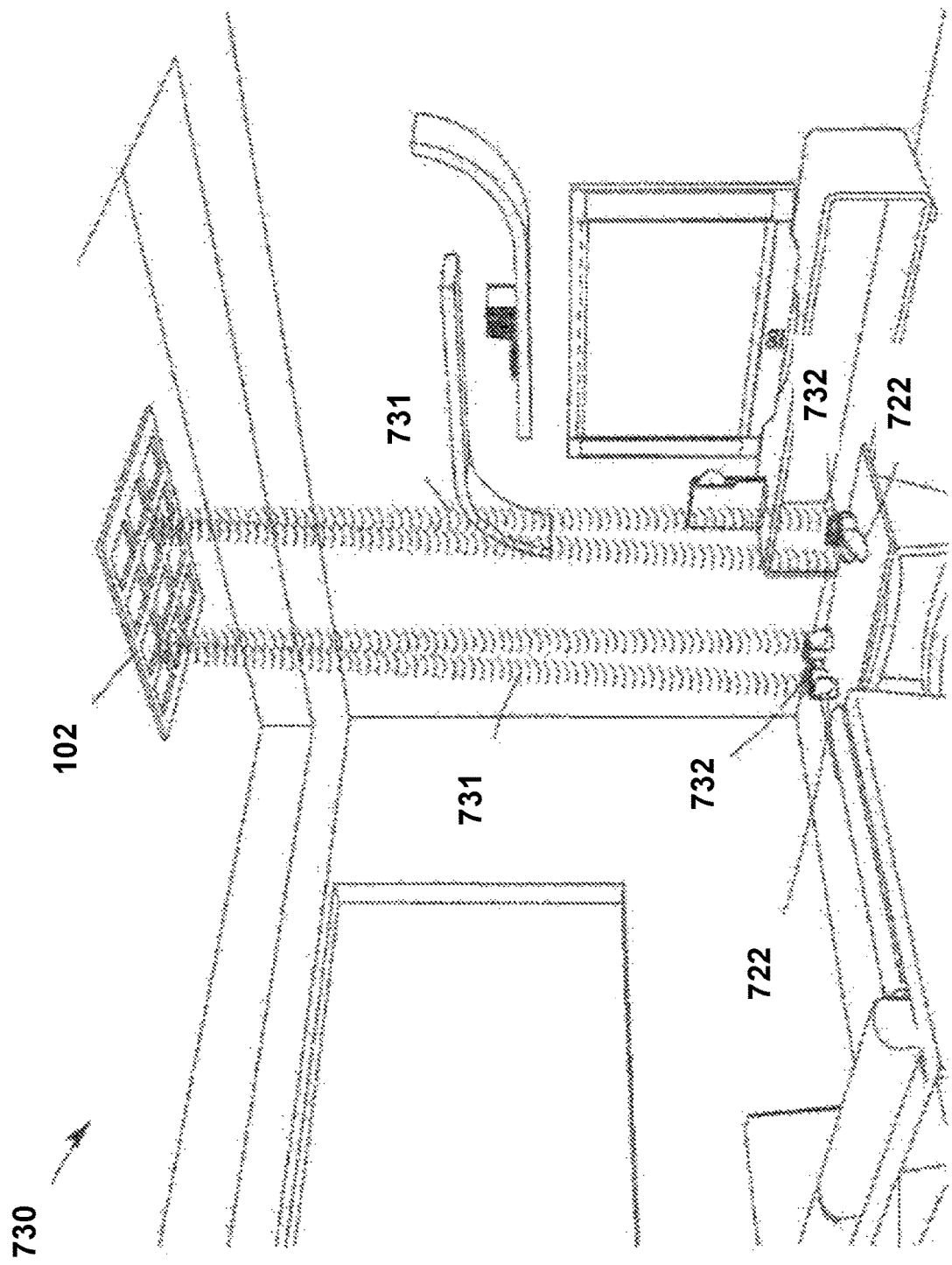
FIGS. 7C-7G illustrate various wireless power transmission systems in which power is wirelessly delivered to electronic devices using sound waves, in accordance with some embodiments.

FIG. 7C illustrates a wireless power delivery system 730 that wirelessly transmits power to game controllers 722, using pocket-forming. In some embodiments, transmitter 102 may be located at the ceiling of a living room pointing downwards, and may transmit controlled sound waves 731 which may converge in 3-D space. The amplitude of the sound waves 731 may be controlled through phase and/or relative amplitude adjustments to form constructive and destructive interference patterns (pocket-forming), and produce controlled pockets of energy 732. Receiver 120, embedded or attached to game controllers 722, may then utilize energy from the pockets of energy for charging or powering an electronic device.

Figure 7D:
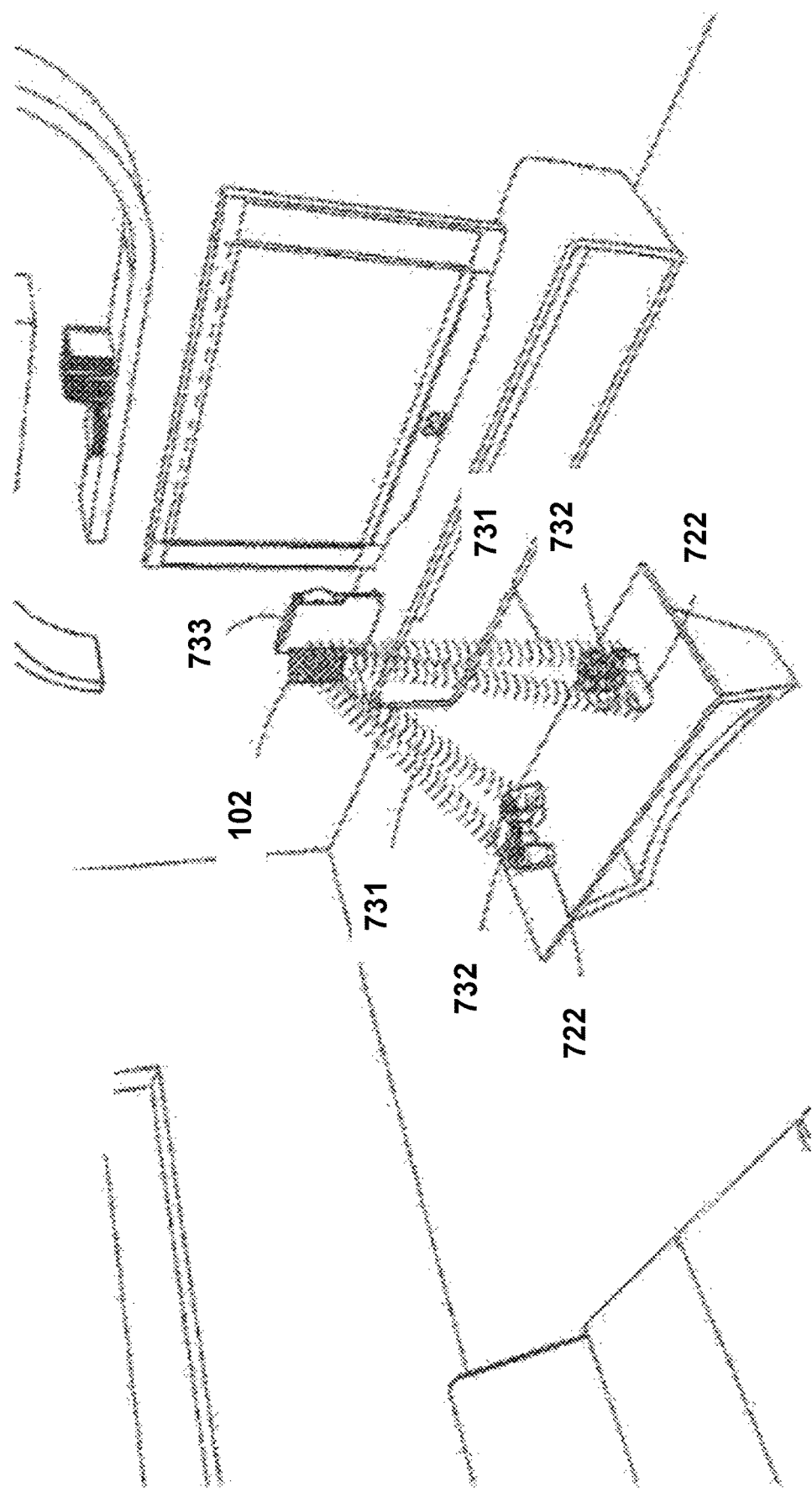

In FIG. 7D, the transmitter 102 is coupled with a game console 733, and the receivers embedded within respective game controllers 732 wirelessly receive sound waves from the transmitter 102 and then convert energy from the sound waves that has accumulated in pockets of energy 732 into usable power.

Figure 7E:
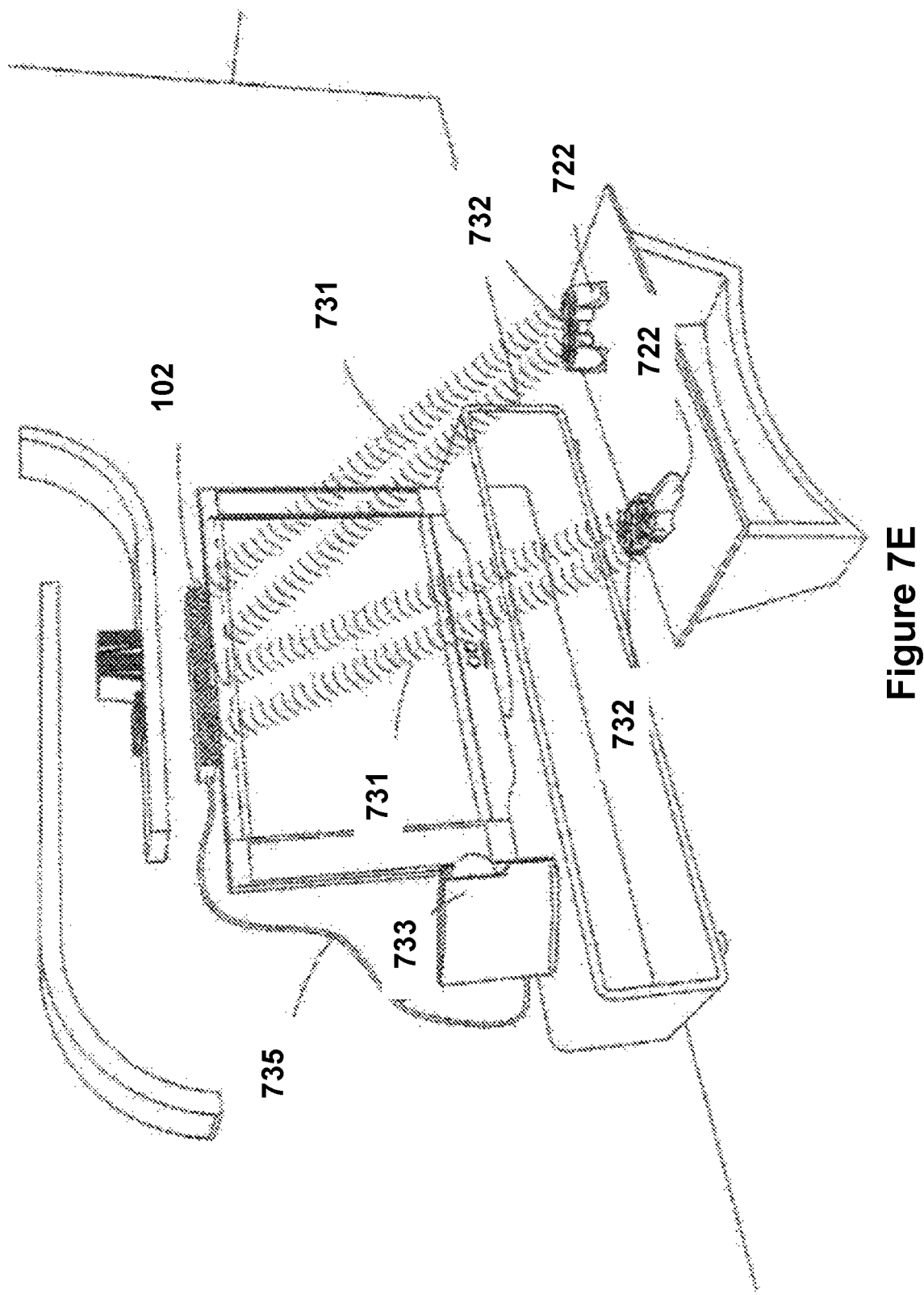

In FIG. 7E, the transmitter 102 is coupled with a game console 733 via a cable 735 (such as a USB cable), and the receivers embedded within respective game controllers 732 wirelessly receive sound waves from the transmitter 102 and then convert energy from the sound waves that has accumulated in pockets of energy 732 into usable power. In some embodiments, the game console 733 produces power along the cable 735, and the transmitter uses that power to generate sound waves that are then transmitted to the game controllers 722 for charging and powering purposes, as described above.

Figure 7F:
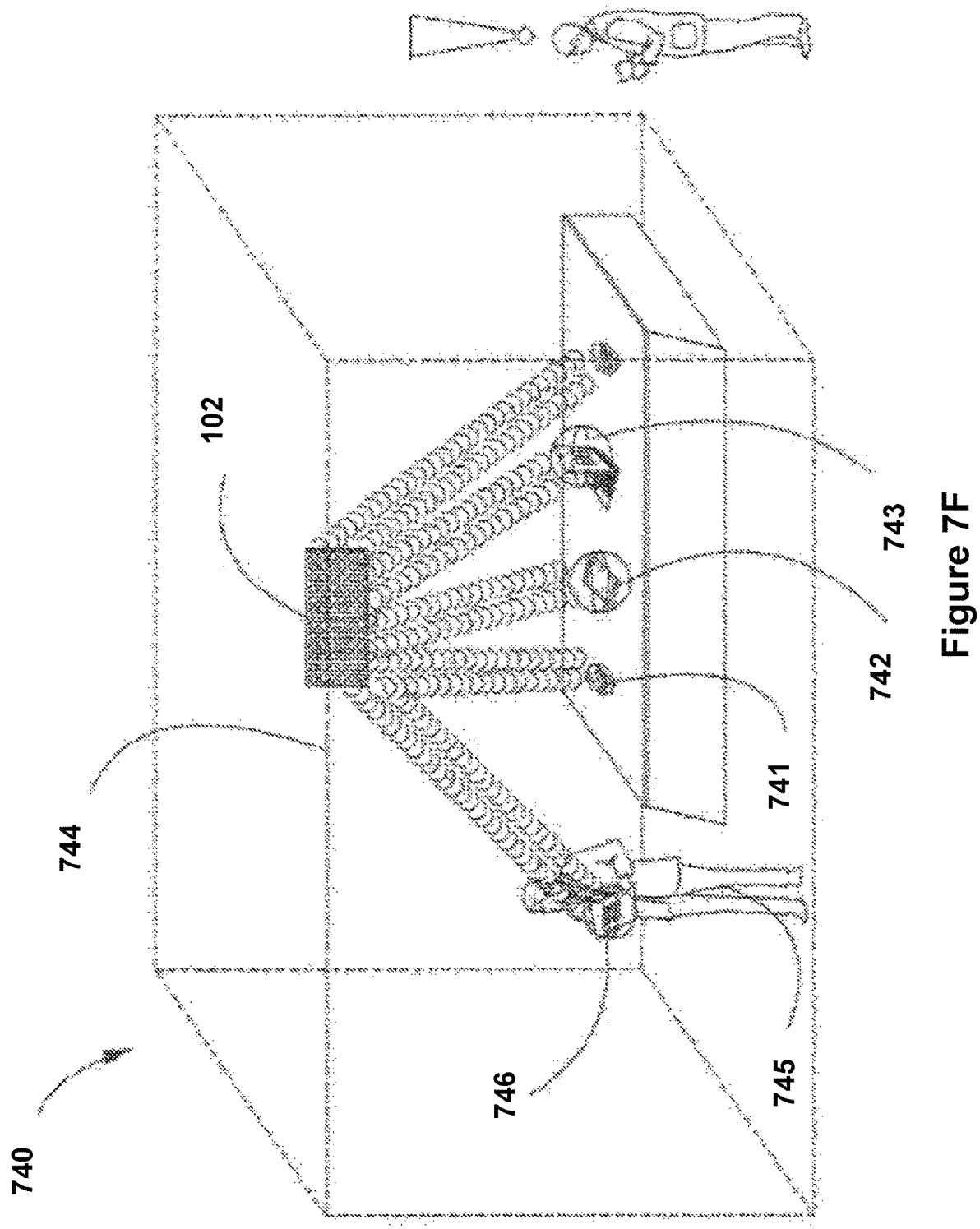

FIG. 7F illustrates a wireless power delivery system 740 where various electronic devices, for example a smartphone 741, a tablet 742, and a laptop 743 may receive power, through pocket-forming techniques (as described throughout this detailed description), utilizing a transmitter 102 at a predefined range 744. In some embodiments, these devices may include embedded receivers 120 (or be otherwise operatively coupled to receivers) and capacitors for obtaining necessary power for performing their intended functions. In some embodiments the system 740 may be utilized in retail stores where interaction between electronic devices (used for showcase) and potential buyers may be limited due to the presence of wired connections. A potential buyer 745 may be interested in acquiring a tablet 746 and, because the system 740 has been implemented, the buyer 745 may interact freely with the tablet 746 before purchasing, but subject to certain restrictions. For example, were buyer 745 to step out of the range at which transmitter 102 wirelessly delivers power, tablet 746 may no longer operate (as can be seen in the rightmost part of FIG. 7F for another buyer). In some embodiments, the transmitter 102 may also detect when a tablet or other device travels outside of its range, and may then issue an alarm.

Figure 7G:
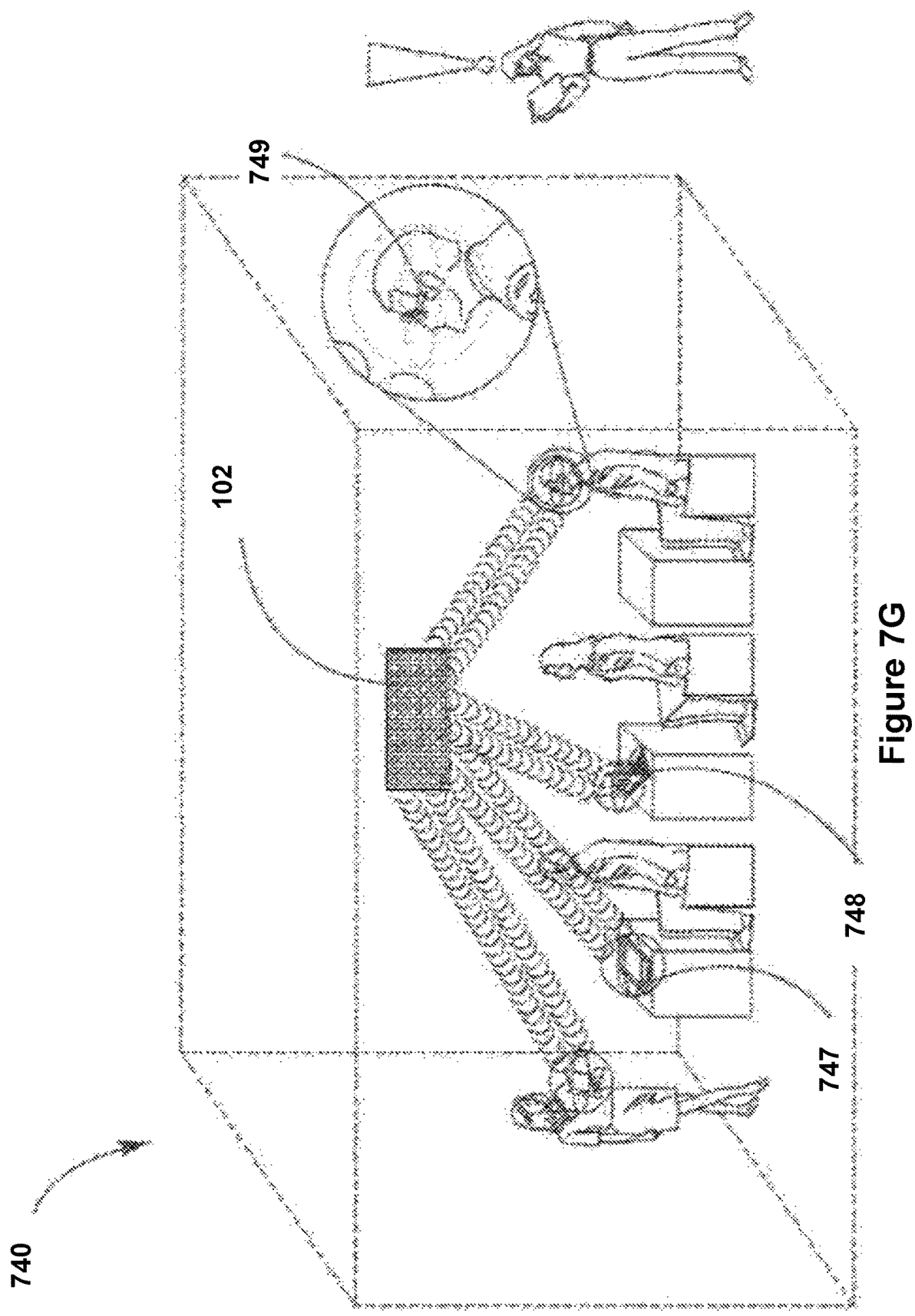

The wireless power delivery system of FIG. 7F may be applied to other settings, such as educational environments, as shown in FIG. 7G. For example, in educational programs for developing or unprivileged cities, regions and countries, teachers and students may be provided with tablets, electronic readers, laptops or even virtual glasses for imparting and. taking notes during lectures. However, such equipment may be expensive. Therefore, measures for preventing unauthorized usage of such devices may be employed. For example, devices may be wired to school chairs so that they may not be taken outside classrooms. However, utilizing electronic devices with embedded wireless power receivers may improve the foregoing situation. In some embodiments, a transmitter 102 inside a classroom may provide wireless power, through pocket-forming techniques, to various electronic devices with embedded receivers and capacitors (not shown), for example an e-reader 747, a laptop 748, and virtual glasses 749 which may be used by different users in the educational setting. The foregoing electronic devices may become inoperable outside the range of transmitter 102, as can be seen in the rightmost part of FIG. 7G.

Figure 7H:
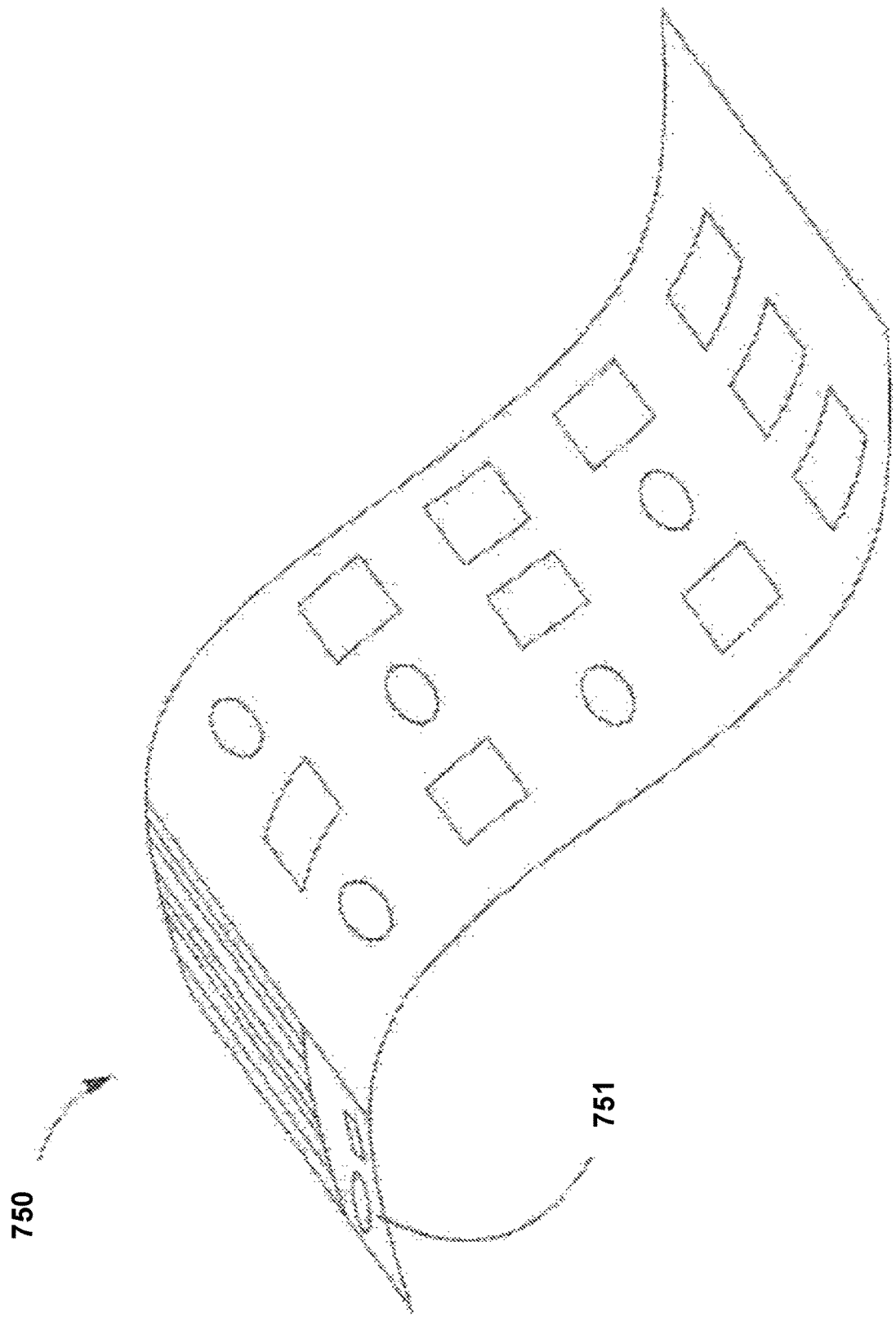
FIG. 7H illustrates an improved rollable electronic paper display used to explain certain advantages of wireless power transmission systems, in accordance with some embodiments.

FIG. 7H illustrates an improved rollable electronic paper display 750 used to explain certain advantages of wireless power transmission systems, in accordance with some embodiments. In some embodiments, the display 750 is produced using flexible organic light emitting diodes (FOLED). In some embodiments, the display 750 may include at least one embedded receiver 751 (e.g., an instance of the receiver 120 described herein) with a capacitor in one of its corners. Thus, the circuitry for providing power to rollable electronic paper display 750 may be confined to only a fraction of its surface area, This may improve transparency of the rollable electronic paper display 750. In other embodiments, an e-reader including the aforementioned receivers and capacitors, may diminish its weight considerably, as well as improve its display brightness. Currently, the weight of e-readers may be driven by their batteries, e.g. up to about 60% to about 80% of the total weight. However, by utilizing the structured described here, batteries may not be required to be as powerful, thereby reducing overall size and weight of the batteries, and in turn diminishing weight of e-readers. Moreover, by diminishing such weight considerably, e-readers can be made thinner. In some embodiments, previous volume used up for battery allocation, can be distributed to increase display capacity.

Figure 8A:
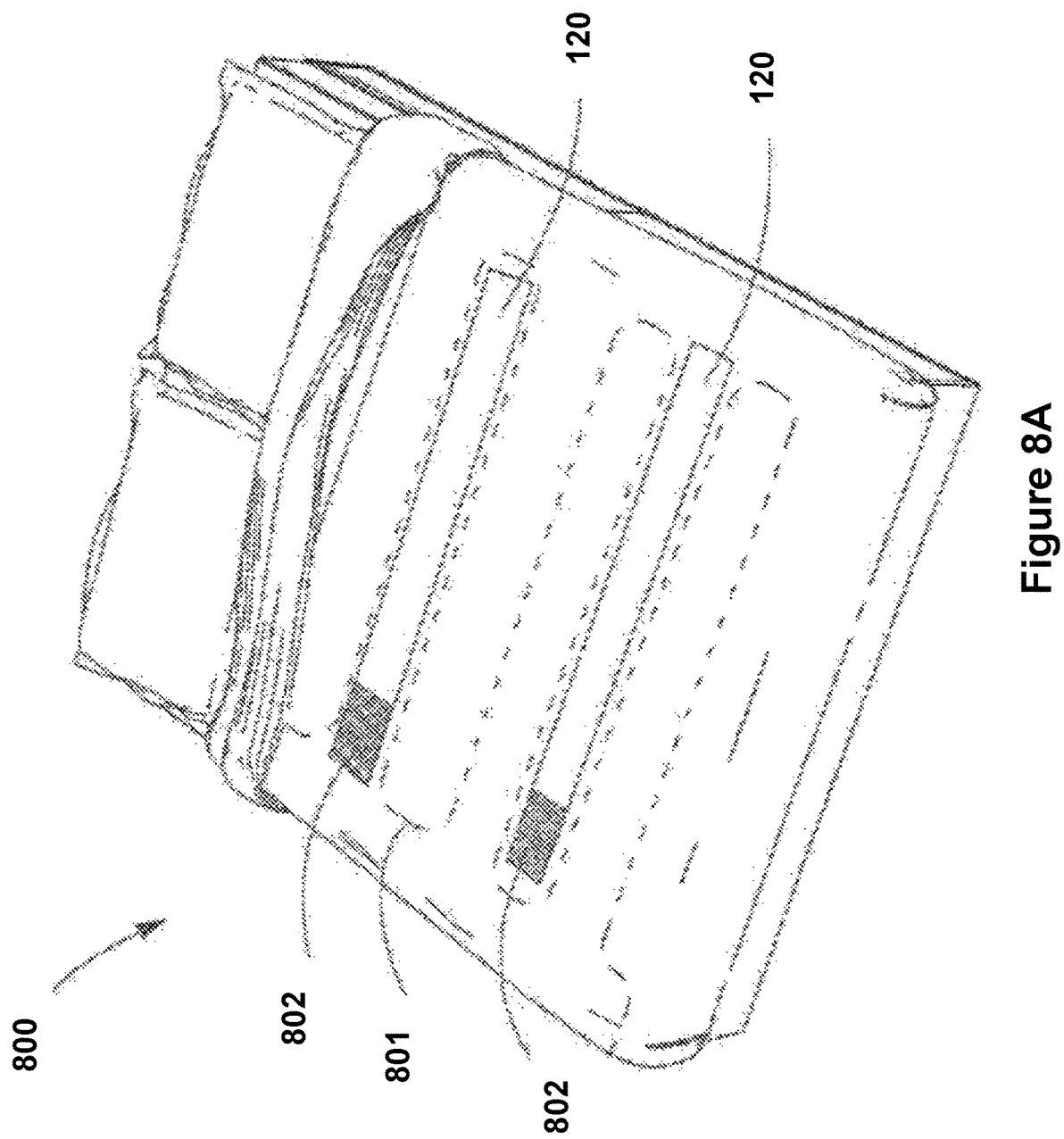
FIGS. 8A-8G illustrate various articles (e.g., heating blanket, heating sock, heating glove, warming jacket, shirt, cap, and cooling shirt) with embedded wireless power receivers, in accordance with some embodiments.
Figure 8B:
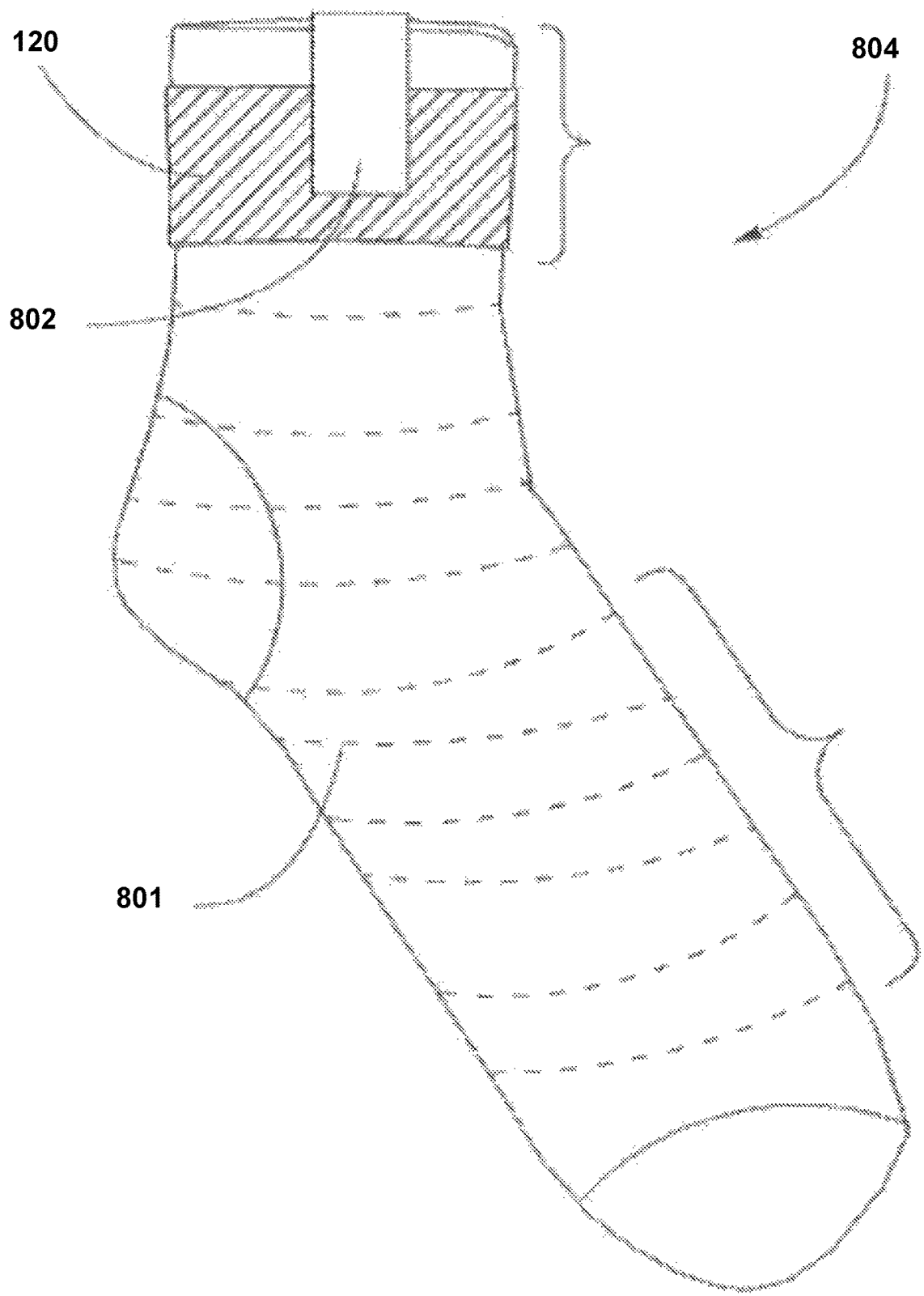
Figure 8C:
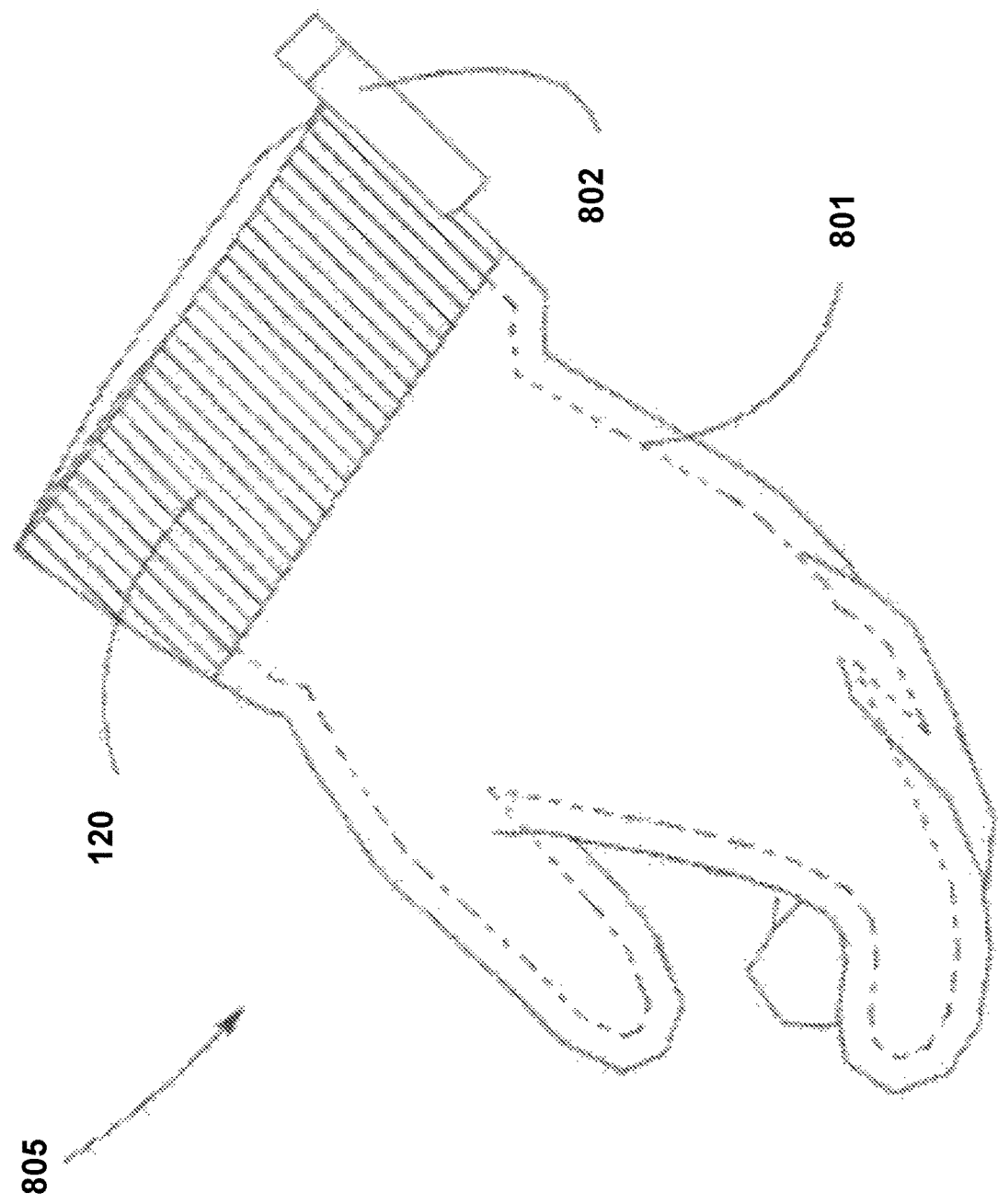
Figure 8D:
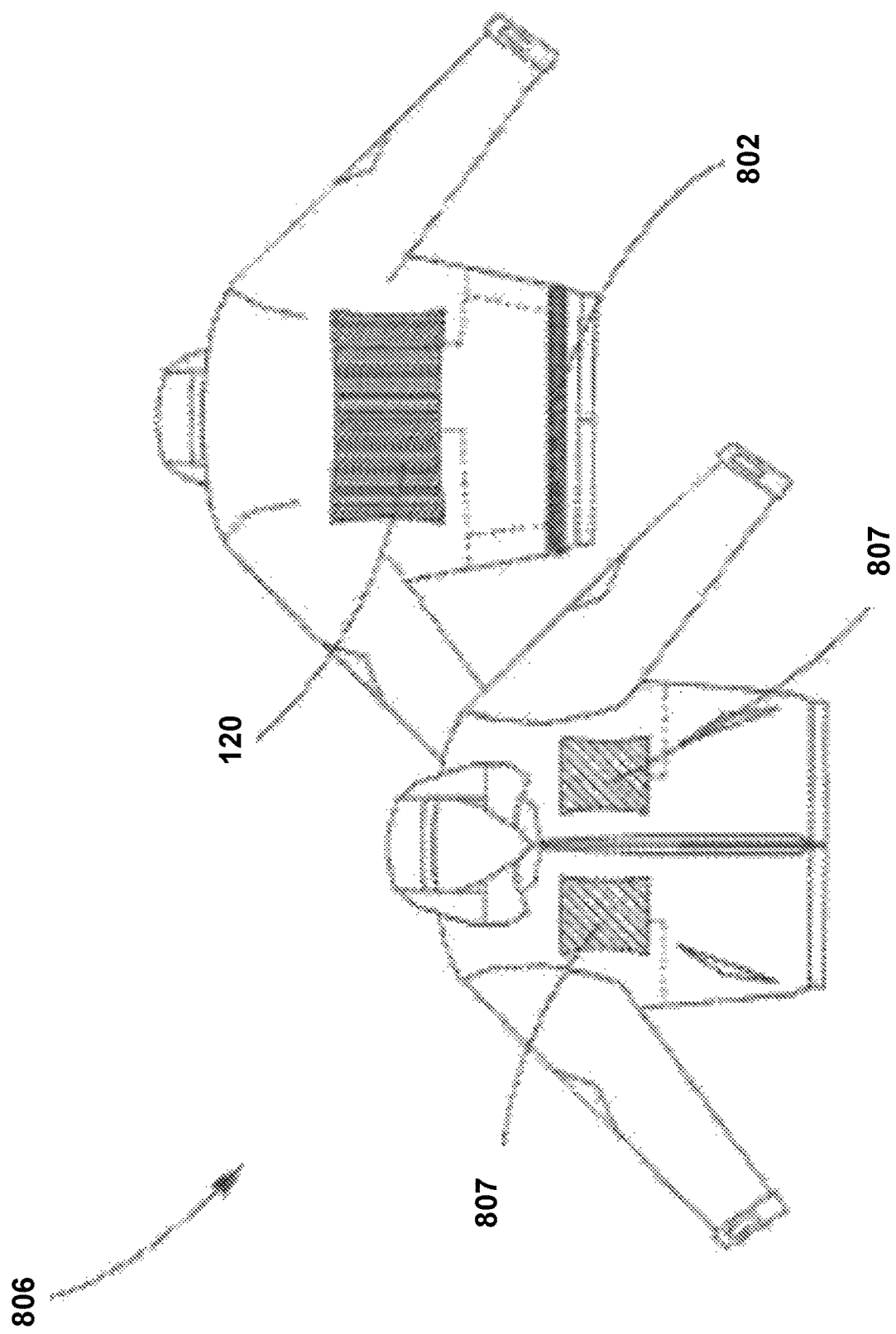
Figure 8E:
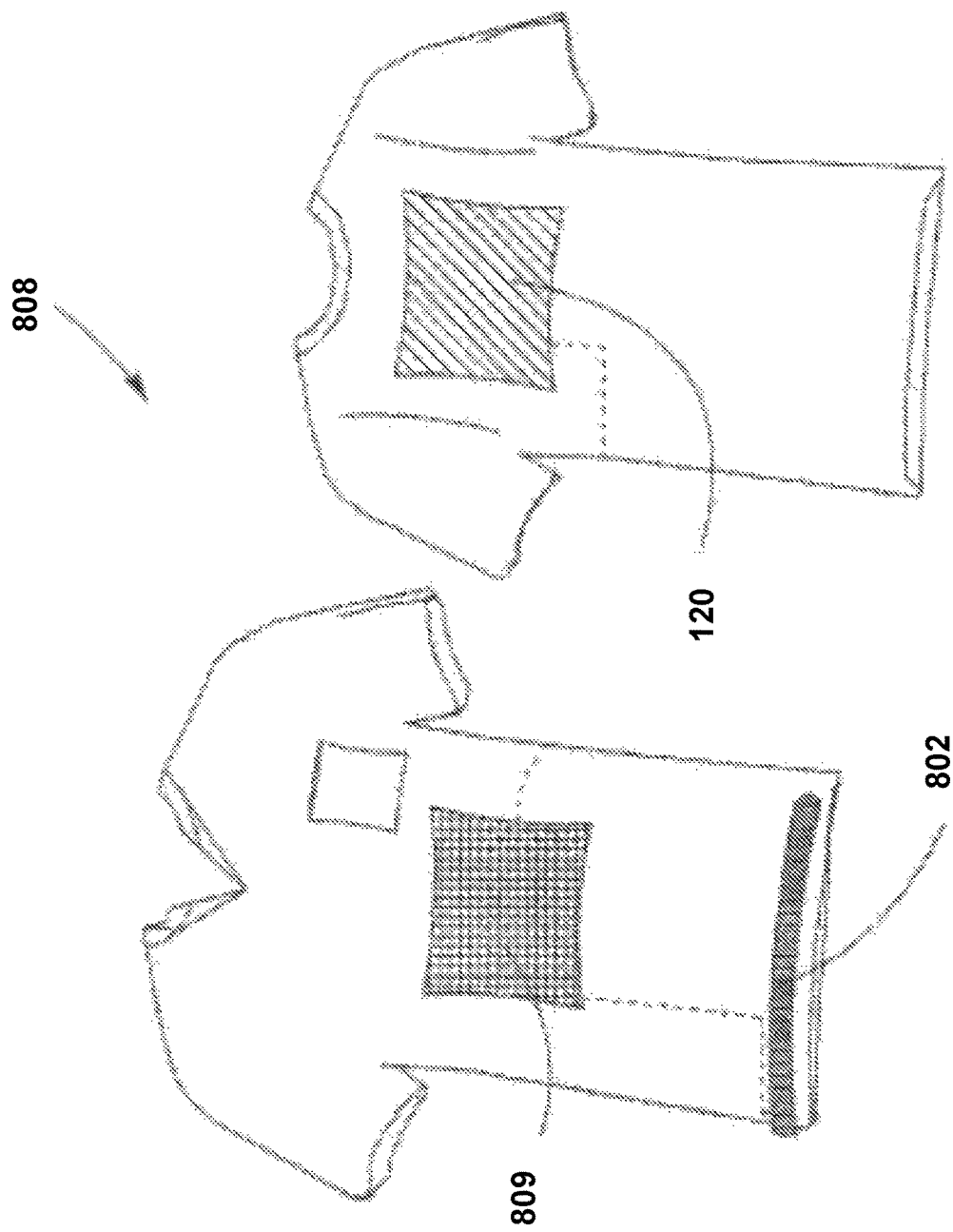
Figure 8F:
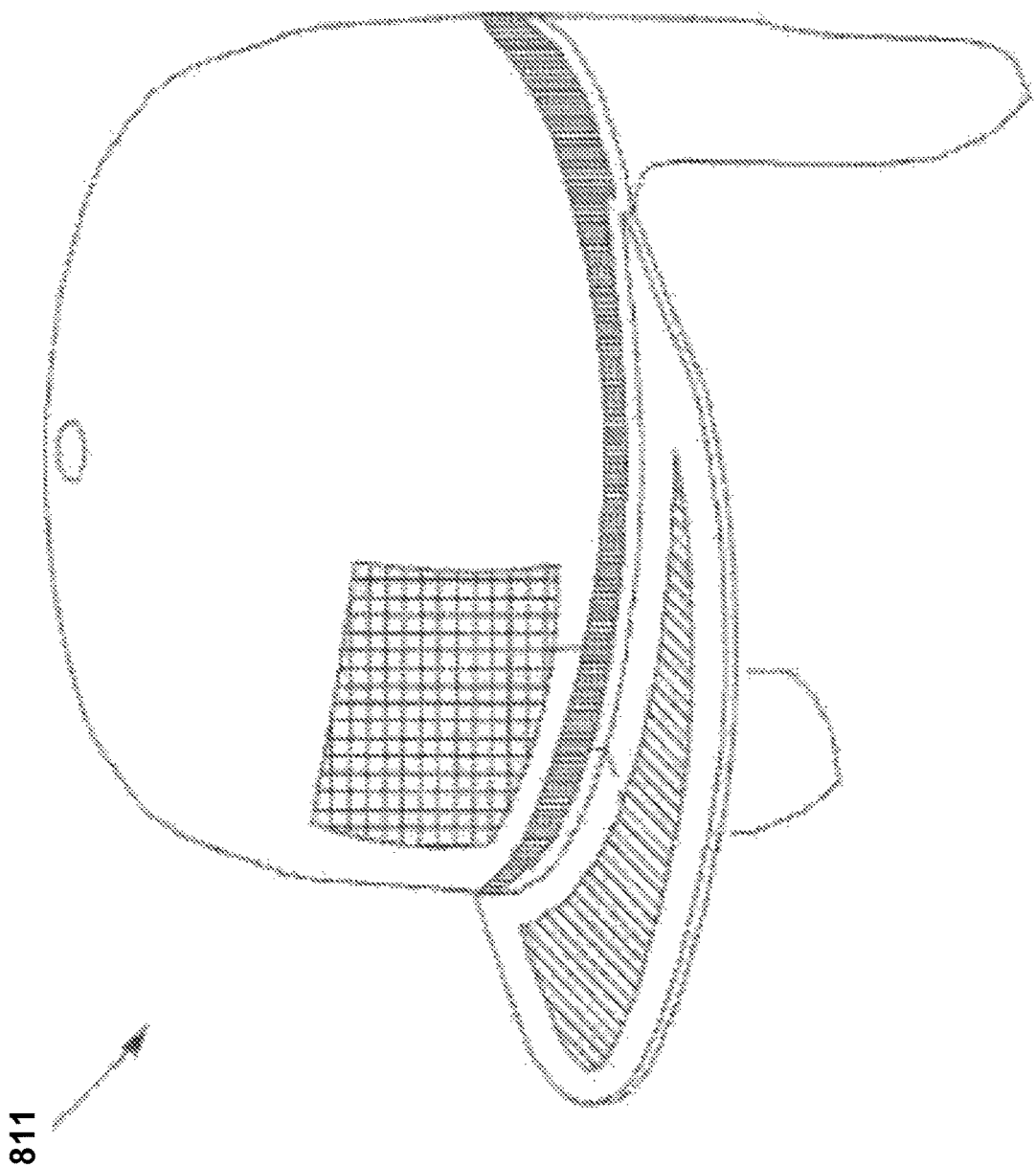
Figure 8G:
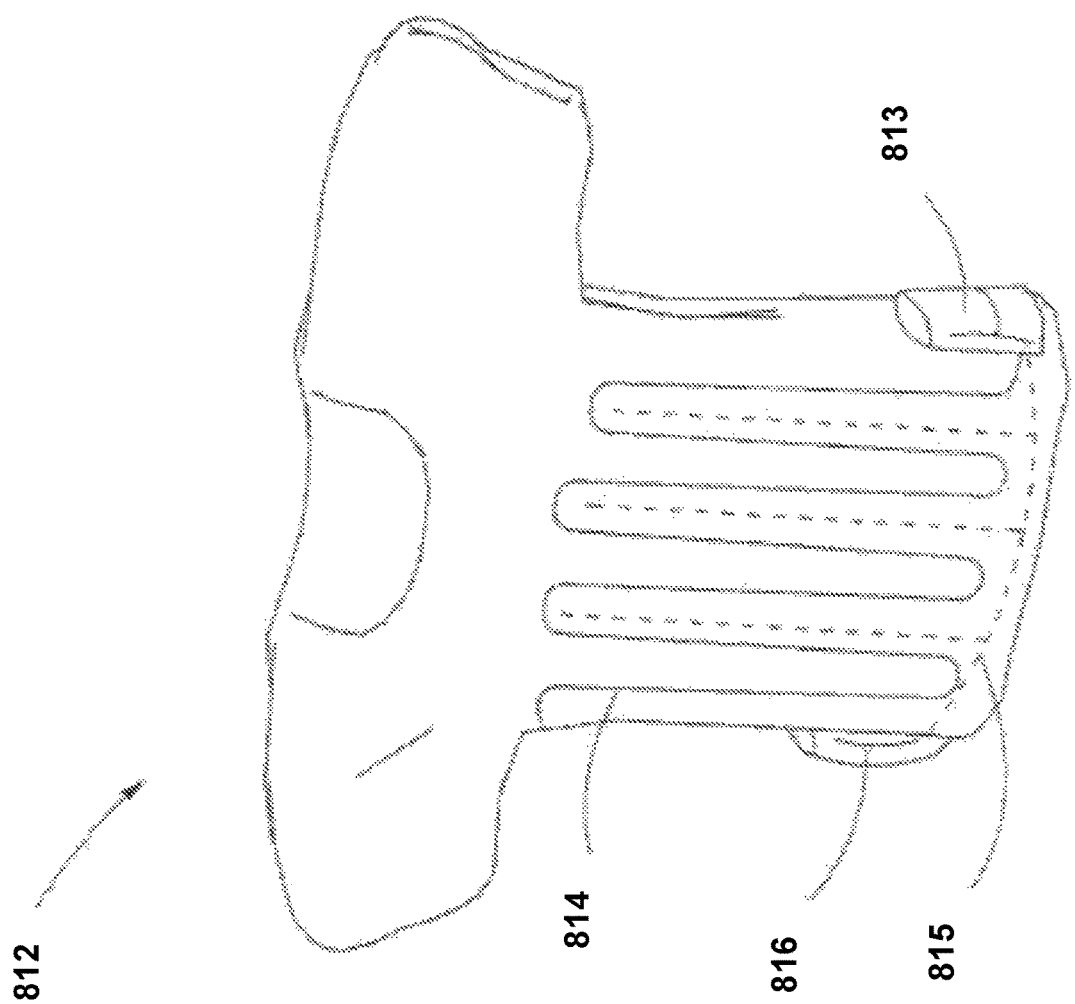

FIGS. 8A-8G illustrate various articles (e.g., heating blanket, heating sock, heating glove, warming jacket, shirt, cap, and cooling shirt) with embedded wireless power receivers, in accordance with some embodiments. In particular, FIG. 8A shows a heating blanket 800, according to an embodiment, which includes a heating circuit 801, receivers 120 and flexible batteries 802; FIG. 8B illustrates a heating sock 804 with a heating circuit 801, a receiver 120 and flexible rechargeable batteries 802; FIG. 8C shows a heating glove 805 with a heating circuit 801, a receiver 120 and batteries 802; FIG. 8D illustrates a heating jacket 806 that includes heating patches 807, a receiver 120 and flexible batteries 802; FIG. 8E shows a shirt 808 with a display 802 a receiver 120 and flexible batteries 802; FIG. 8F illustrates a cap 811 with a display a receiver and flexible batteries; and FIG. 8G shows a cooling shirt 812 with a cooling liquid reservoir 813, cooling tubes 814, sensor wiring 815 and case 816 (in some embodiments, case 816 may include a battery, a receiver and a pump for controlling the flow of cooling liquid through cooling tubes 814).

In some embodiments the articles of clothing with embedded receivers may operate at 7.4V and may be powered or charged wirelessly (as described herein).

Figure 9B:
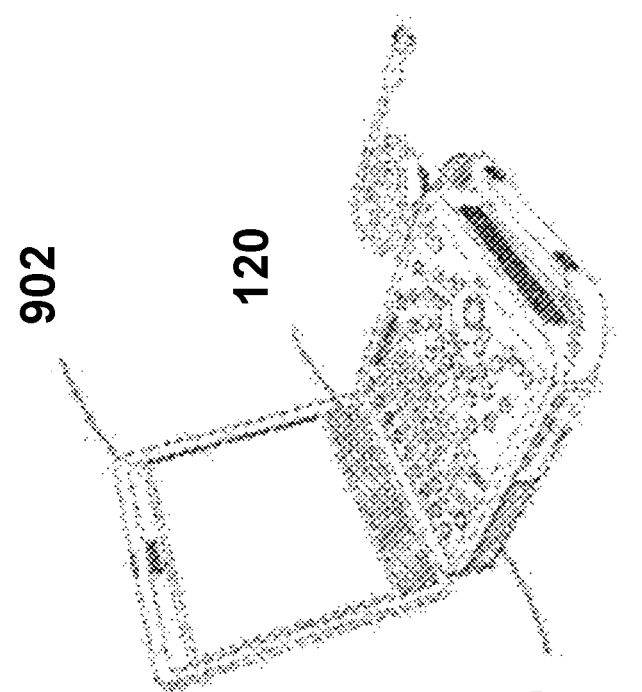
FIGS. 9A-9B are illustrations of medical devices with wireless power receivers coupled thereto, in accordance with some embodiments.
Figure 9A:
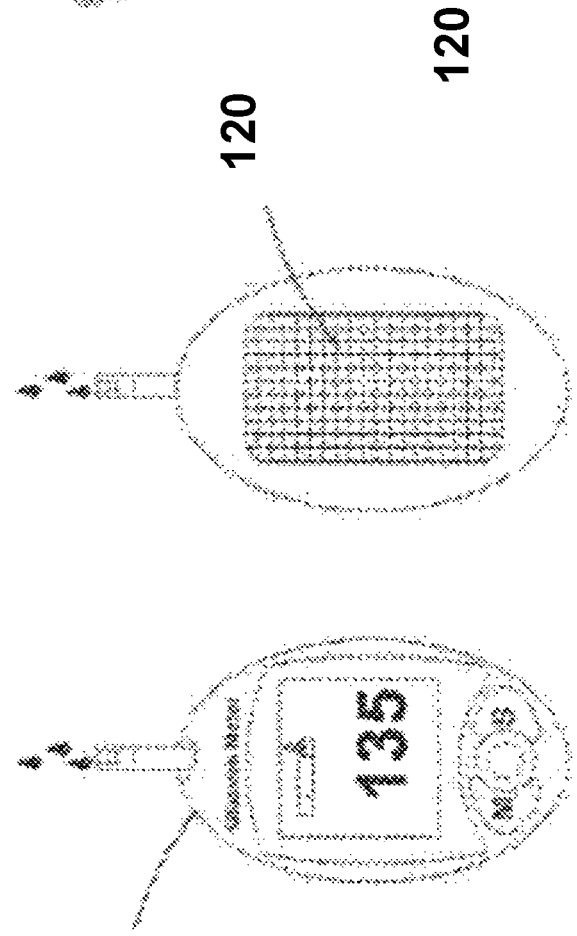

FIGS. 9A-9B are illustrations of medical devices with wireless power receivers coupled thereto, in accordance with some embodiments. For example, FIG. 9A shows a blood glucose meter 901 that includes a receiver 120. FIG. 9B shows a portable medical electronic device such as a portable ultrasound machine 902 that includes multiple receivers 120, coupled to both a front and side portion of the device 902.

The above described may not be limited to portable electronic medical devices shown in FIGS. 9A-9B. Receiver 120 may also be included in a plurality of medical electronic devices such as infrared electronic thermometer, electronic pads like tablets, blood pressure monitor, blood glucose meter, pulse oximeter, and ECG among others. The number and type of sensor elements are calculated according the medical electronic device's design.

Figure 9C:
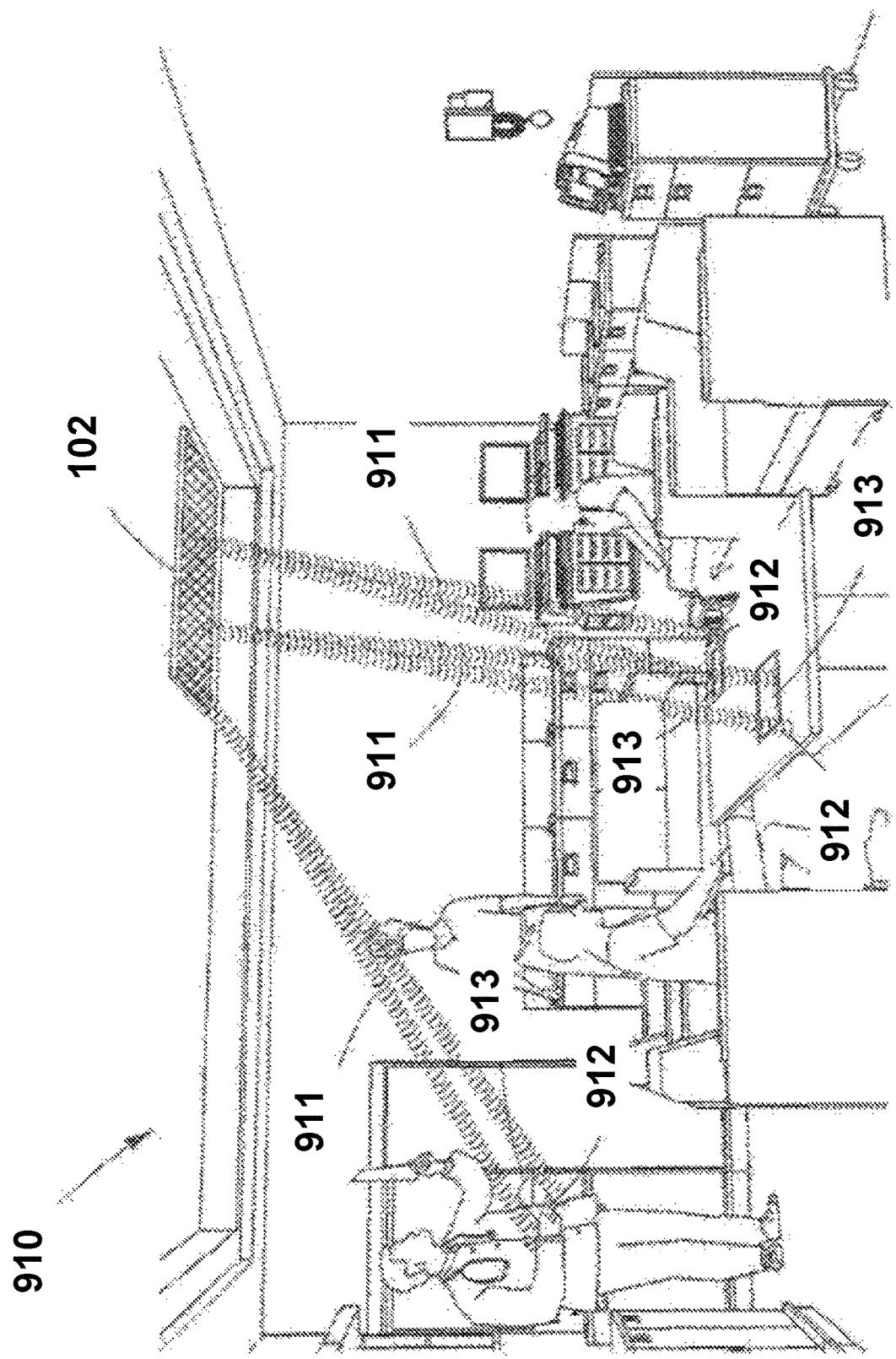
Figure 9E:
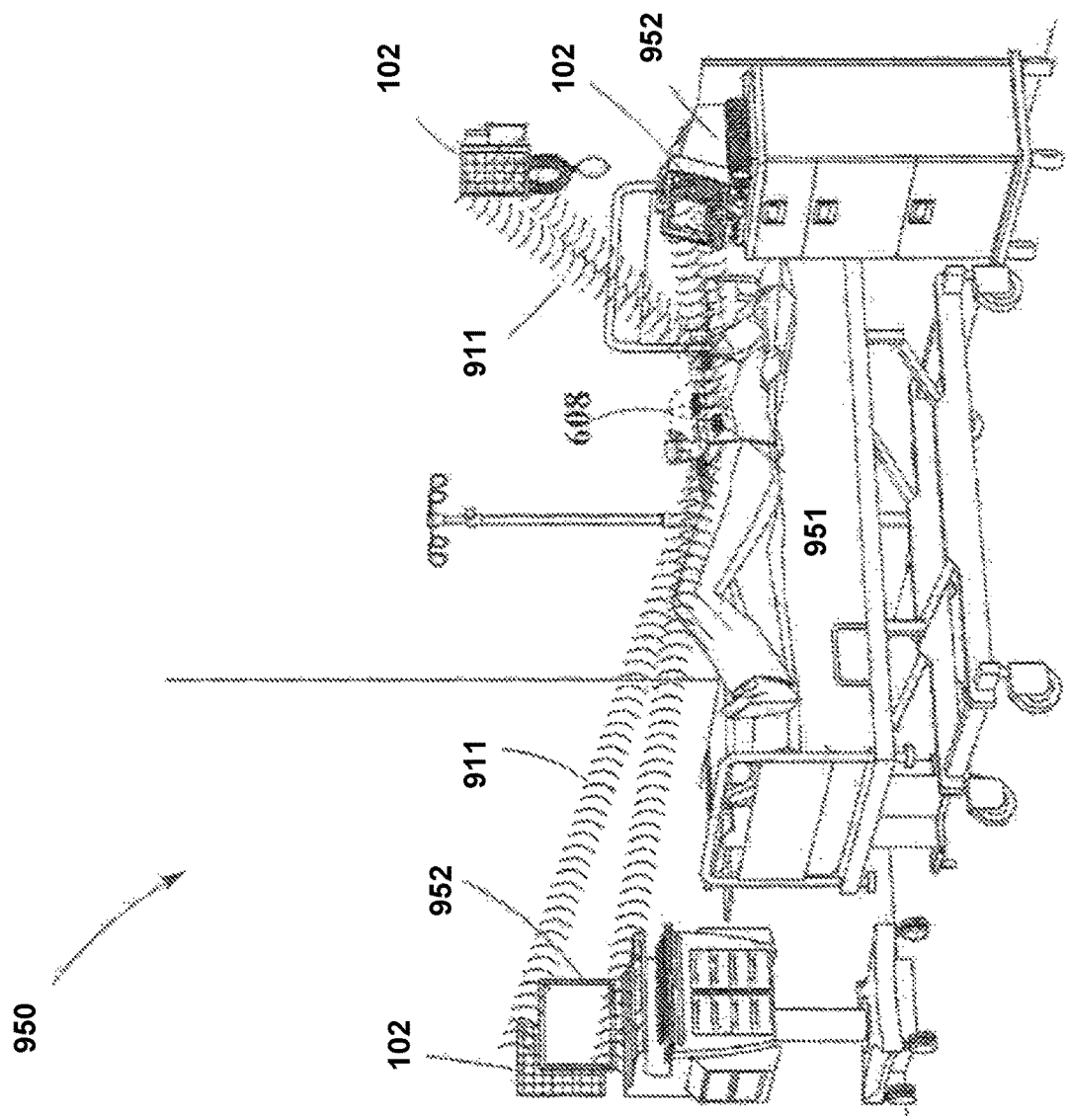

FIGS. 9C-9E are illustrations of wireless power transmission systems for wirelessly delivering power to medical devices, in accordance with some embodiments.

FIGS. 9C-9D show wireless power delivery system 910, in accordance with some embodiments. Transmitter 102 may be located at the ceiling of a room pointing downwards, and may transmit controlled sound waves 911 which may converge in 3-D space to form pockets of energy. A receiver 120, embedded or attached to portable electronic medical device 913, may then convert energy that has accumulated by constructively interfering sound waves at pockets of energy 912 for charging or powering these devices.

FIG. 9E illustrates a wireless power delivery system 950 for wirelessly providing power to wireless sensors 951, which may be used for measuring physiological parameters of a patient. In some embodiments, multiple transmitters 102 attached or embedded to medical devices 952 may provide controlled sound waves 911 to wireless sensors 951.

In some embodiments, the wireless power delivery techniques for health care environments may even be utilized in rooms in which a patient has a pacemaker, as the sound waves will not interfere or damage functioning of those types of devices because electromagnetic fields are not generated when using sound waves to wirelessly deliver power.

FIG. 10 is an illustration of a house configured with a number of wireless power transmitters and receivers, in accordance with some embodiments.

FIG. 10 depicts a wireless powered house 1000, which may include a plurality of transmitters 102 connected to a single base station 1002, which may also include a main transmitter. In some embodiments, base station 1002 manages wireless power delivery to mobile and non-mobile devices in wireless powered house 1000 (additional details regarding base stations are provided above). Additionally, transmitters 102 may be embedded into a plurality of electronic devices and objects in wireless powered house 1000.

Base station 1002 may enable communication between every transmitter 102 and receivers 120 in wireless powered house 1000. Furthermore, wireless powered house 1000 may include a variety of range enhancers, which may increase range of wireless power transmission, such range enhancers may include: reflectors 1004 and wireless repeaters 1006, Reflectors 1004 may be included in several places of the wireless powered house 1000, such as curtains, walls, floor, and ceiling among others. Wireless repeaters 1006 may include a receiver 120 and a transmitter 102 for re-transmitting power. FIG. 10 illustrates an example for using reflectors 1004 and wireless repeaters 1006, where a CCTV camera 1010 requires charge, but it is too far for receiving power at an optimal efficiency. However, base station 1002 may trace a trajectory for SW waves 1008 which may imply less loses and includes the use of reflectors 1004 that may be embedded in the walls and a wireless repeater 1006, which may receive the reflected sound waves 1008 and re-transmits these to the CCTV camera 1010 with higher power than the received.

In some embodiments, base station 1002 may send sound waves 1008 to any device in wireless powered house 1000, these devices may include static devices such as: Smoke detectors 1026, digital door locks 1028, CCTV cameras 1010, wall clocks 1032 among others devices that requires wired powered connections. The lack of cables for powering such devices may reduce work time for installing and maintaining those devices. Furthermore, walls, ceilings and floors need not be drilled for installing cables.

Device locations may be updated automatically by base station 1002, which may set a communication channel between each device, regardless if it is a mobile or non-mobile device. Some devices such as mirrors 1034 may allow a transmitter 102 to be embedded therein in order to charge small devices and disposable devices in the bathroom and/or in the bedroom. Such devices may include: Electric razors, electric toothbrushes, lamps, massagers, UV-Sterilizers among others. Therefore, mirror 1034 may significantly reduce wired chargers for each electric device in bathrooms and bedrooms.

Similarly to mirror 1034, televisions 1036 may include transmitters 102 for powering and charging mobile and non-mobile devices.

Base station 1002 may establish areas where wireless power transmission may have specialized protocols, these areas may include infirmary, children rooms, room for pregnant and other regions where devices may be sensitive to radio frequency waves but not to sound waves 1008. Some areas may represent a permanent null space, where no pockets of energy are generated. Furthermore, some receivers 120 may possess the same specialized protocols regardless their location in wireless powered house 1000. Such devices may include electric knives, drills, and lighters among others. Therefore, each device may be restricted to a specific area and to a specific user, thus, safety in wireless powered house 1000 may be higher. Hence, children may not be exposed or in proximity to harmful hardware and thieves may not be able to use stolen equipment outside the wireless powered house 1000.

Figure 11A:
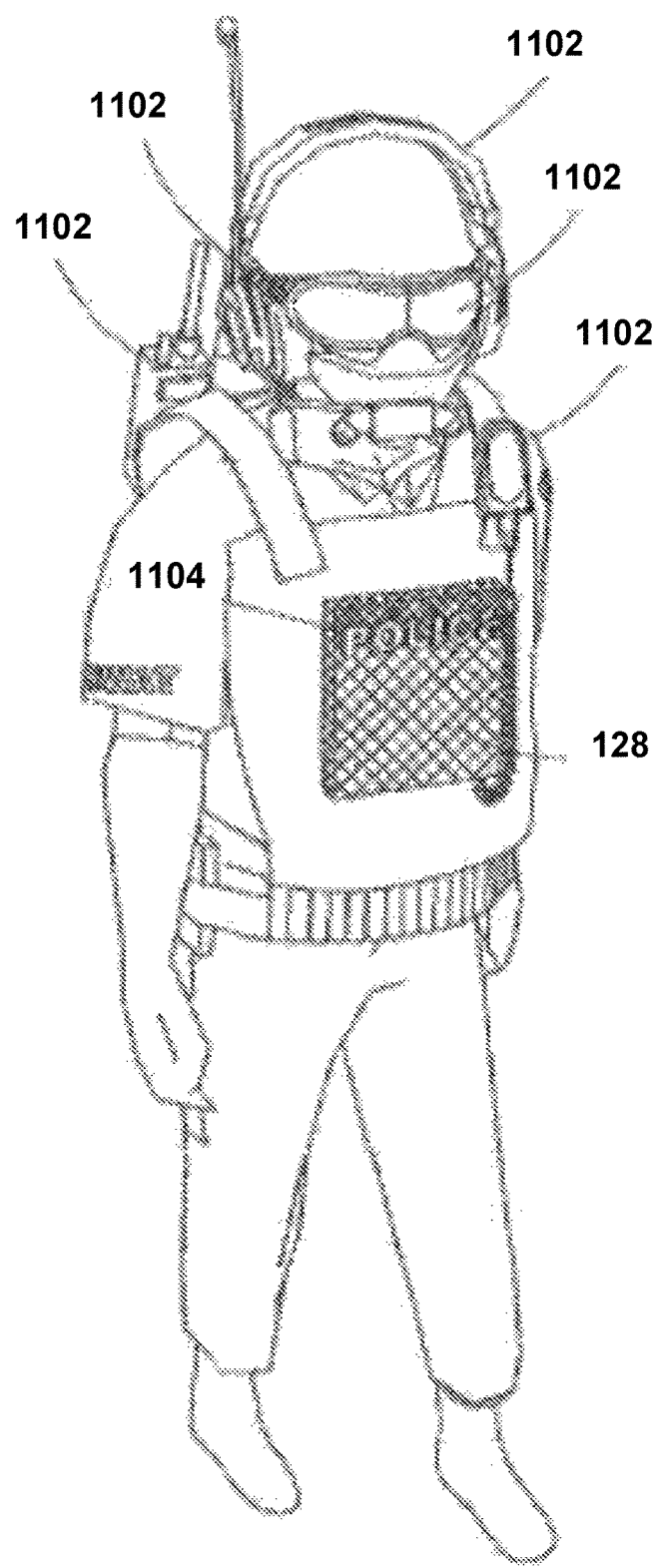
FIG. 11A illustrates a law enforcement officer wearing a uniform with an integrated wireless power receiver, in accordance with some embodiments.

FIG. 11A illustrates a law enforcement officer wearing a uniform with an integrated wireless power receiver, in accordance with some embodiments.

In FIG. 11A, a law enforcement officer is wearing a uniform with an integrated receiver 1104. Uniform with an integrated receiver 1104 may include electrical devices 1102 such as radios, night vision goggles, and wearable cameras among others. Electrical devices 1102 may be coupled to receiver 1104 through wires strategically distributed in the uniform. Receiver 1104 may then have an array of sensor elements 128 distributed thereon.

Figure 11B:
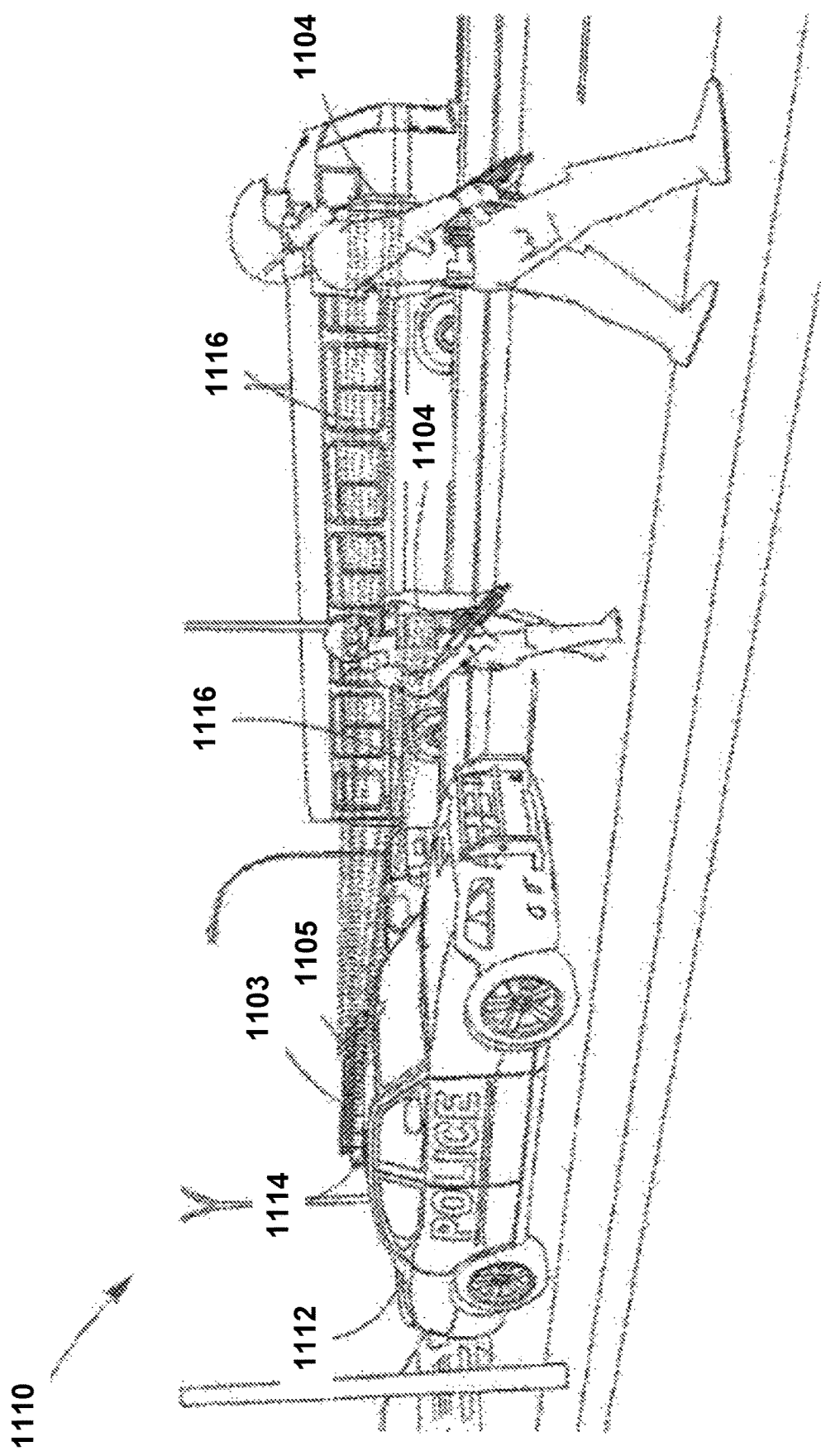
FIGS. 11B-11D illustrate wireless power transmitters integrated with various types of mobile law enforcement equipment (e.g., a police squad car and a SWAT team vehicle) for use in conjunction with law enforcement operations, in accordance with some embodiments.
Figure 11C:
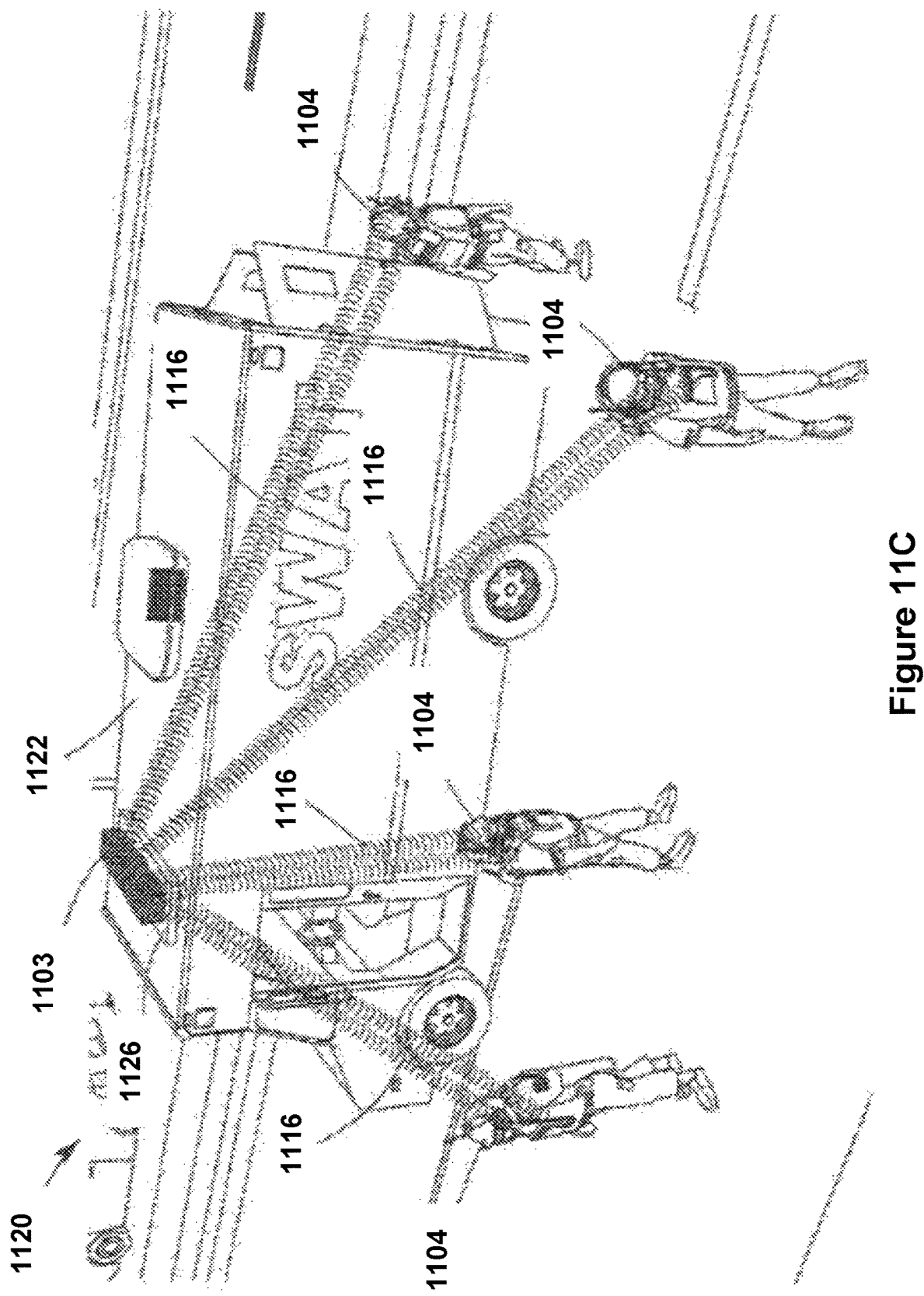
Figure 11D:
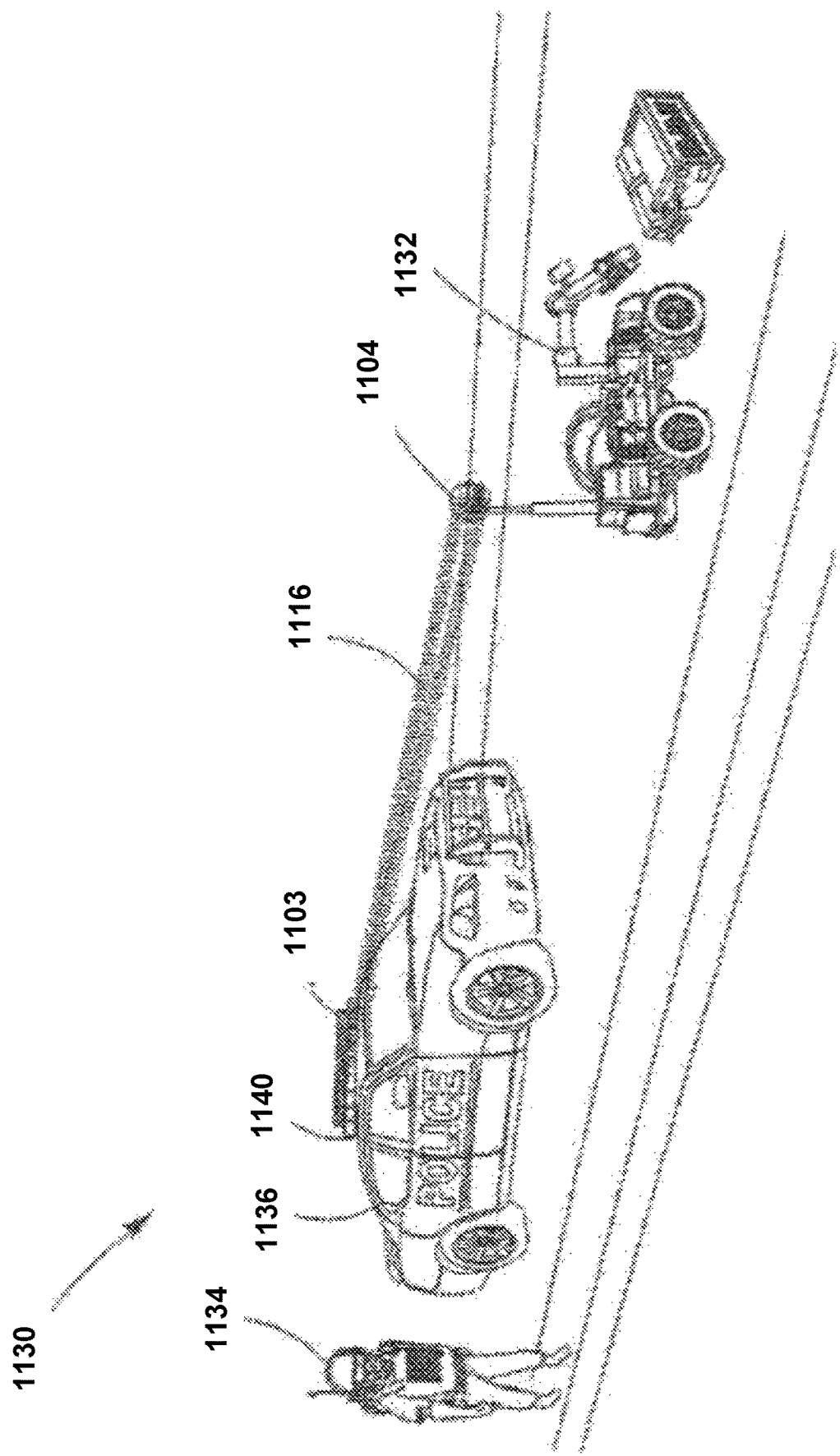

FIG. 11B-11D illustrates wireless power transmitters integrated with various types of mobile law enforcement equipment (e.g., a police squad car and a SWAT team vehicle) for use in conjunction with law enforcement operations, in accordance with some embodiments.

FIG. 11B illustrates a mobile power source 1110 for police officers wearing uniforms with an integrated receiver 1104. Mobile power source 1100 may also serve electrical devices 1102 coupled with receivers 1104 independently. In some embodiments, a police car 1112 may include a transmitter 1103 which may be placed on top of siren 1114. Transmitter 1103 may be coupled to any suitable battery management system in police car 1112 to get the power necessary to enable wireless power transmission. Transmitter 1103 may include an array of transducer elements 204 (e.g., 1105) which may be distributed along the edge of the structure located on top of siren 1114. Transmitter 1103 may then transmit controlled sound waves (SW) 1116 which may converge in 3-D space. These SW 1116 may be controlled through phase and/or relative amplitude adjustments to form constructive and destructive interference patterns (pocket-forming). Uniforms with an integrated receiver 1104 may then utilize pockets of energy produced by pocket-forming for charging or powering electrical devices 1102.

FIG. 11C illustrates a mobile power source 1120 for specialized police officers wearing uniforms with an integrated receiver 1104. Mobile power source 1120 may also serve electrical devices 1102 coupled with receivers 1104 independently. In FIG. 11C, a SWAT Mobile Command Truck 1122 may include a transmitter 1103 which may be placed on top of siren 1126. Transmitter 1103 may be coupled to any suitable battery management system in SWAT Mobile Command Truck 1122 to get the power necessary to enable wireless power transmission. Transmitter 1103 may include an array of transducer elements 204 which may be distributed along the edge of the structure located on top of siren 1126. Transmitter 1103 may then transmit controlled sound waves 1116 which may converge in 3-D space. These sound waves 1116 may be controlled through phase and/or relative amplitude adjustments to form constructive and destructive interference patterns (pocket-forming). Uniforms with an integrated receiver 1104 may then utilize pockets of energy produced by pocket-forming for charging or powering electrical devices 1102.

FIG. 11D illustrates a mobile power source 1130 for remote controlled vehicles 1132 designed for espionage, detecting mines or disabling bombs may be powered wirelessly. In this embodiment, remote control and power may be critical factors to prevent exposure or harm to police officers 1134. In some embodiments, a police car 1136 may include a transmitter 1103 which may be placed on top of siren 1140. Transmitter 1103 may be coupled to any suitable battery management system in police car 1136 to get the power necessary to enable wireless power transmission. Transmitter 1103 may include an array of transducer elements 204 which may be distributed along the edge of the structure located on top of siren 1140. Transmitter 1103 may then transmit controlled SW 1116 which may converge in 3-D space. These SW 1116 may be controlled through phase and/or relative amplitude adjustments to form constructive and destructive interference patterns (pocket-forming). Remote controlled vehicle 1132 may be coupled with the receiver 1104. The receiver 1104 may then utilize pockets of energy produced by pocket-forming for charging or powering remote controlled vehicle 1132.

FIGS. 12A-12D illustrate tracking systems that upload data to a cloud-based service for use in conjunction with wireless power transmission systems, in accordance with some embodiments.

FIG. 12A shows a wireless tracking system 1200 for determining the location of objects or living beings. In some embodiments, wireless tracking system 1200 may be applied in a wireless power transmission system using pocket-forming techniques. Transmitter 1202 may be in house 1204 placed on a suitable location, such on a wall, for an effective wireless power transmission to electronic device 1206. Objects or living beings may use an electronic device 1206 with embedded or adapted receiver 1208. Receiver 1208 may include components described in FIG. 1 and transmitter 1202 may also include components described in FIG. 1.

While transmitter 1202 may charge or power receiver 1208, micro-controller 208 (from transmitter 1202) may be able to process information provided by communications component from receiver 1208, as described above. This information may be repeatedly uploaded to a cloud-based service 1210 to be stored in a database in determined intervals of time. Through data stored in database, the information may be read through a suitable interface such as computer software from any suitable computing device and from any suitable location. Transmitter 1202 may use a unique identifier of receiver 1208 for identifying and tracking electronic device 1206 from other devices. The unique identifier of receiver 1208 may be according to the type of communications component that may be used in receiver 1208; for example, if a protocol is used, the MAC address may be the unique identifier. This unique identifier may allow the information of electronic device 1206 with receiver 1208 to be mapped and stored in the database stored in cloud-based service 1210. Other unique identifiers may include International Mobile Equipment Identity (IMEI) numbers, which usually comprise a 15-digit unique identifier associated with all GSM, UNITS and LTE network mobile users; Unique Device ID (UDID) from iPhones, iPads and Mods, comprising a combination of 40 numbers and letters set by Apple; Android ID, which is set by Google and created when a user first boots up the device; or International Mobile Subscriber Identity (IMSI), which is a unique identification associated with the subscriber identity module (SIM). Furthermore, user may be able to obtain user credentials to access the database stored in a private or public cloud-based service 1210 to obtain the information of receiver 1208. In some embodiments, cloud-based service 1210 may be public when the service, provided by the same transmitter 1202 or wireless manufacturer, is utilized in the public network by using only the user credentials for obtaining the desired information. And, cloud-based service 1210 may be private when transmitter 1202 may be adapted to a private network that has more restrictions besides user credentials.

In some embodiments, in order to track the location of a determined living being or object, a cloud-based service 1210 may be suitable for finding the location of receiver 1208. For example, when receiver 1208 may not be in house 1204, a user may be able to access with user credentials a suitable interface such as an Internet explorer, to visually depict the places where receiver 1208 was located, using information uploaded in database from the cloud-based service 1210. Also, if receiver 1208 may reach power or charge from another transmitter 1202 located in public establishments such as stores, coffee shops, and libraries, among others, the information may be uploaded to cloud-based service 1210, where user may also be able to depict the information stored in the cloud-based service 1210.

In some embodiments, wireless tracking system 1200 may be programmed to send notifications when living beings or objects are not in the place where it/she/he has to be. For example, if a cat is not at owner's home, a notification such as an interactive message may be sent to a cellphone notifying that the cat is not at home. This interactive message service may be adapted to cloud-based service 1210 as an extra service. The interactive message may be optionally sent to an e-mail or to computer software as it may be desired. Furthermore, additional information may be included in the interactive message such as current location, time, battery level of receiver 1208, among other types of data.

In some embodiments, wireless tracking system 1200, may operate when receiver 1208 includes at least one audio component, such as a speaker or microphone, which may enable location determination via sonic triangulation or other such methods.

In some embodiments, transmitter 1202 may be connected to an alarm system which may be activated when receiver 1208 is not located in the place where it has to be.

Figure 12B:
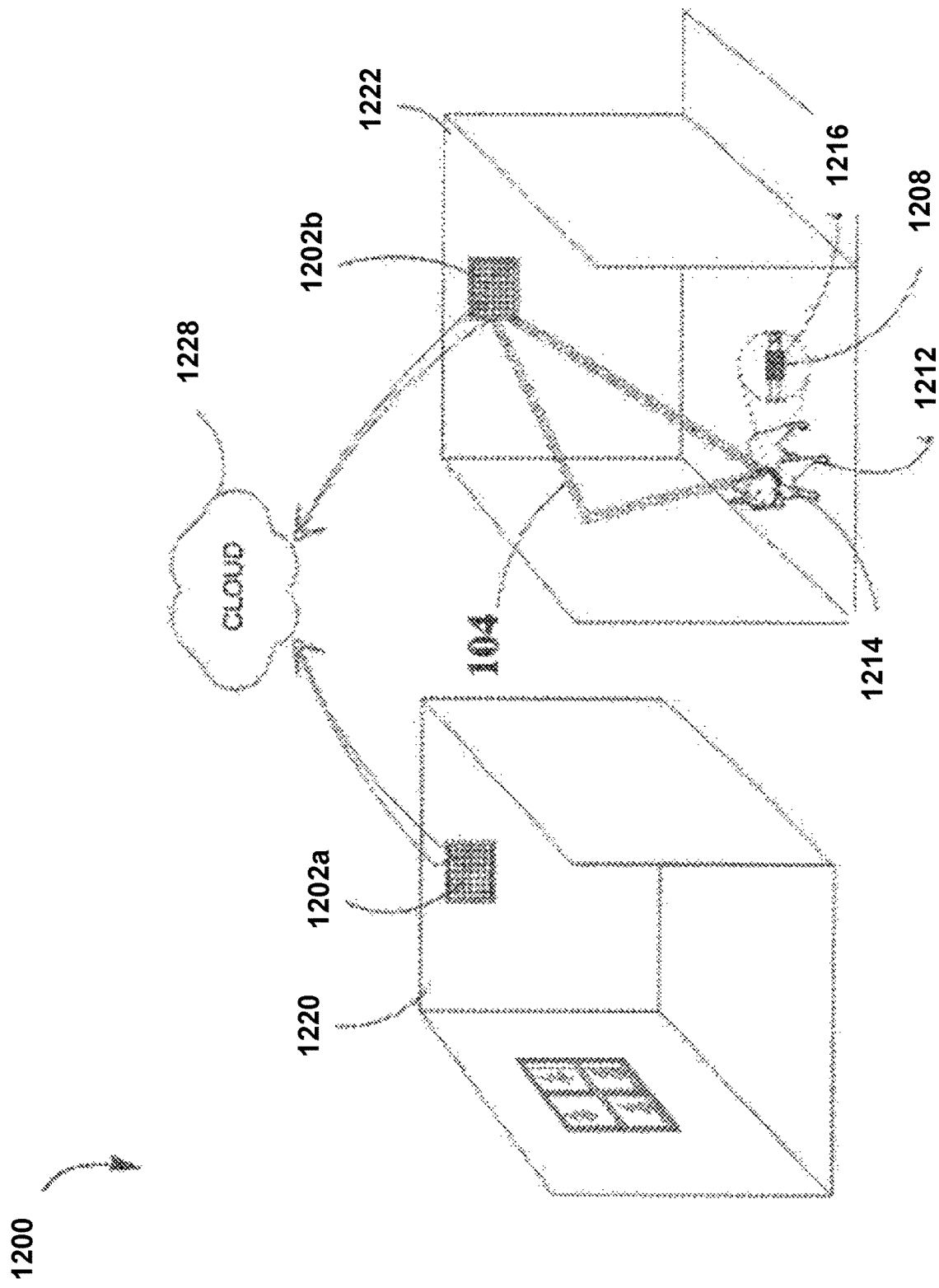

In one example, FIG. 12B shows a wireless tracking system 1200 for tracking the location of a dog 1212. In some embodiments, dog 1212 is wearing a necklace collar 1214 that may include an integrated chip 1216 with an embedded receiver 1208. Dog 1212 may be outside first room 1220 and inside second room 1222. First room 1220 may be the place where dog 1212 lives; however dog 1212 escaped and arrived at second room 1222 (e.g., a coffee shop). In first room 1220, a first transmitter 1202a is hanging on a wall, and in second room 1222, a second transmitter 1202b is hanging on a wall. First transmitter 1202a detects that dog 1212 is not at home, here the interruption of sound waves 104 transmission to receiver 1208 from necklace collar 1214 allows first transmitter 1202a to detect the absence of dog 1212 in first room 1220. In some embodiments, the type of communication component to communicate first transmitter 1202a or second transmitter 1202b with receiver 1208, is a Wi-Fi protocol.

Subsequently, the owner of dog 1212 receives a message notification informing that his/her dog 1212 is outside first room 1220. When dog 1212 arrived at second room 1222, receiver 1208 received sound waves 104 from second transmitter 1202b, while this second transmitter 1202b detects the presence of a new receiver 1208 and uploads the location and time to database stored in the public cloud-based service 1228. Afterwards, the owner of dog 1212 accesses public cloud-based service 1228 through a smartphone application for tracking the location of dog 1212. The owner may have his/her credentials to access cloud-based service 1228, where the user account is mapped with MAC address of first transmitter 1202a and receiver 1208. In the cloud-based service 1228, a display is provided with the locations with determined times where dog 1212 has been during its absence from first room 1220, using the MAC address of receiver 1208. Finally, the owner is now capable to rescue his/her dog 1212 by knowing the current location where dog 1212 is.

Figure 12C:
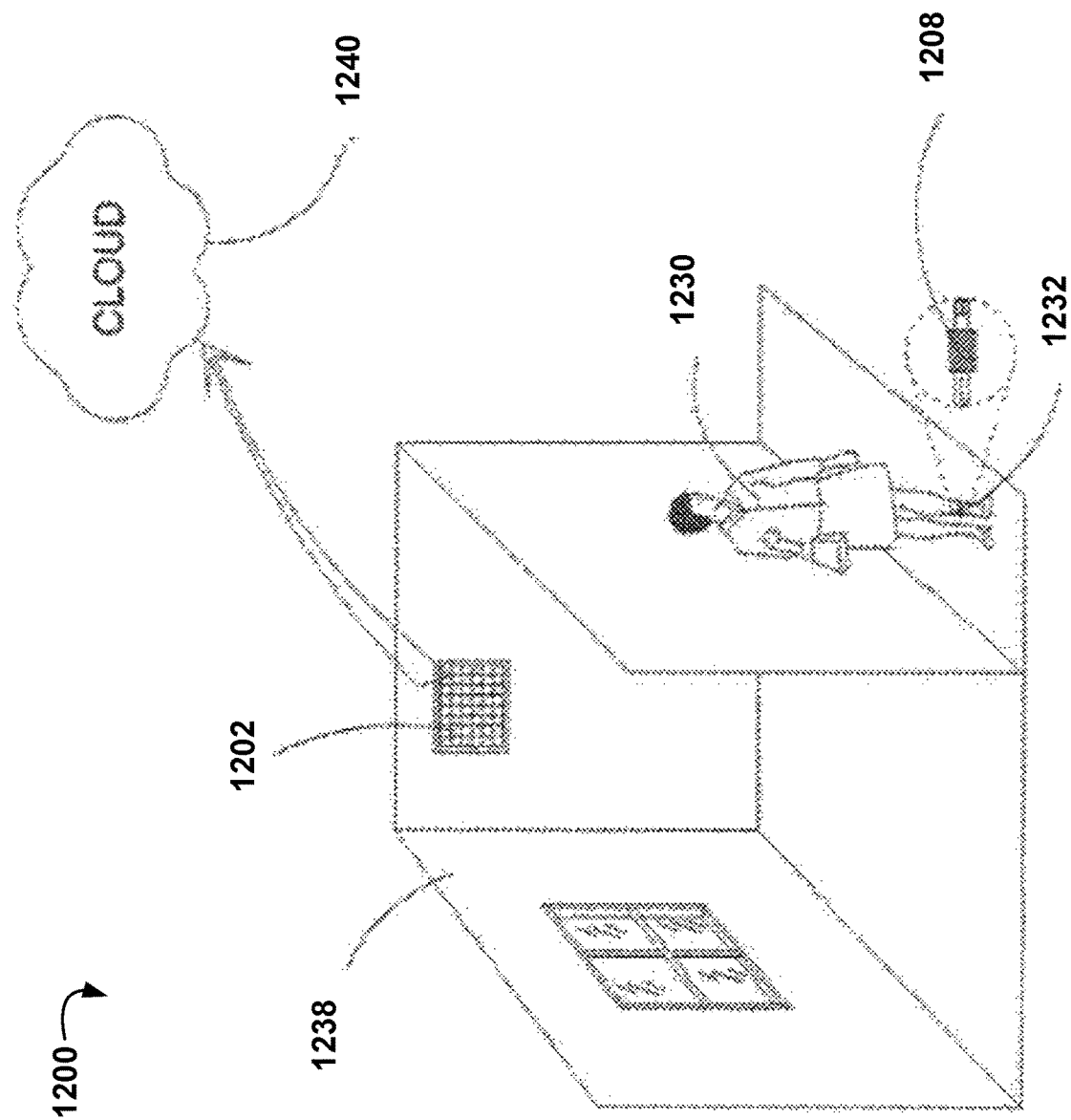

In another example, FIG. 12C shows a wireless tracking system 1200 for tracking and controlling the location of a woman 1230 that has conditional liberty in her house 1238, in this example, woman 1230 is wearing an ankle monitor 1232 that may include a GPS chip 1216 with an adapted receiver 1208 to charge its battery. Ankle monitor 1232 receives sound waves 104 from transmitter 1202 that is hanging on a wall from house 1238. Receiver 1208 communicates with transmitter 1202 through a ZigBee protocol. In this case, the unique identifier which is used to identify receiver 1208 is Personal Area Network Identifier (PAN ID). Receiver 1208 sends information to transmitter 1202 about the battery status, how many times battery has been charged, battery age indicator, and cycle efficiency. This information may be uploaded to a private cloud-based service 1240 which is monitored by a police station that supervises woman 1230. Further, transmitter 1202 may include an alarm system which may be activated when receiver 1208 is not receiving sound waves 104 or/and woman 1230 is not in house 1238. This alarm system provides an audio sound alert, while transmitter 1202 sends a notification to computer software of police office.

As shown in FIG. 12C, woman 1230 escaped house 1238; therefore the alarm system is activated providing audio sound alert and a police office receives a message notification informing that woman 1230 is outside house 1238. Then, police officer detects the location of woman 1230 in a map using the GPS chip 1216 from ankle monitor 1232. Further, police officer accesses private cloud-based network to monitor the battery life and the last time when receiver 1208 received sound waves 104. Police officer may also have his/her credentials to access private cloud-based service 1240, where the user account is mapped with PAN ID of transmitter 1202. In addition, if woman 1230 arrived to a public place such as coffee shop, receiver 1208 may upload information and location of woman 1230 to public cloud-based service 1240 which may be transferred to private cloud cloud-based service 1240; this operation is used as a back-up tracking system in case GPS does not work appropriately. Finally, the woman 1230 may be found and handcuffed by police officer due to location was provided by GPS and/or private-cloud based service.

Figure 12D:
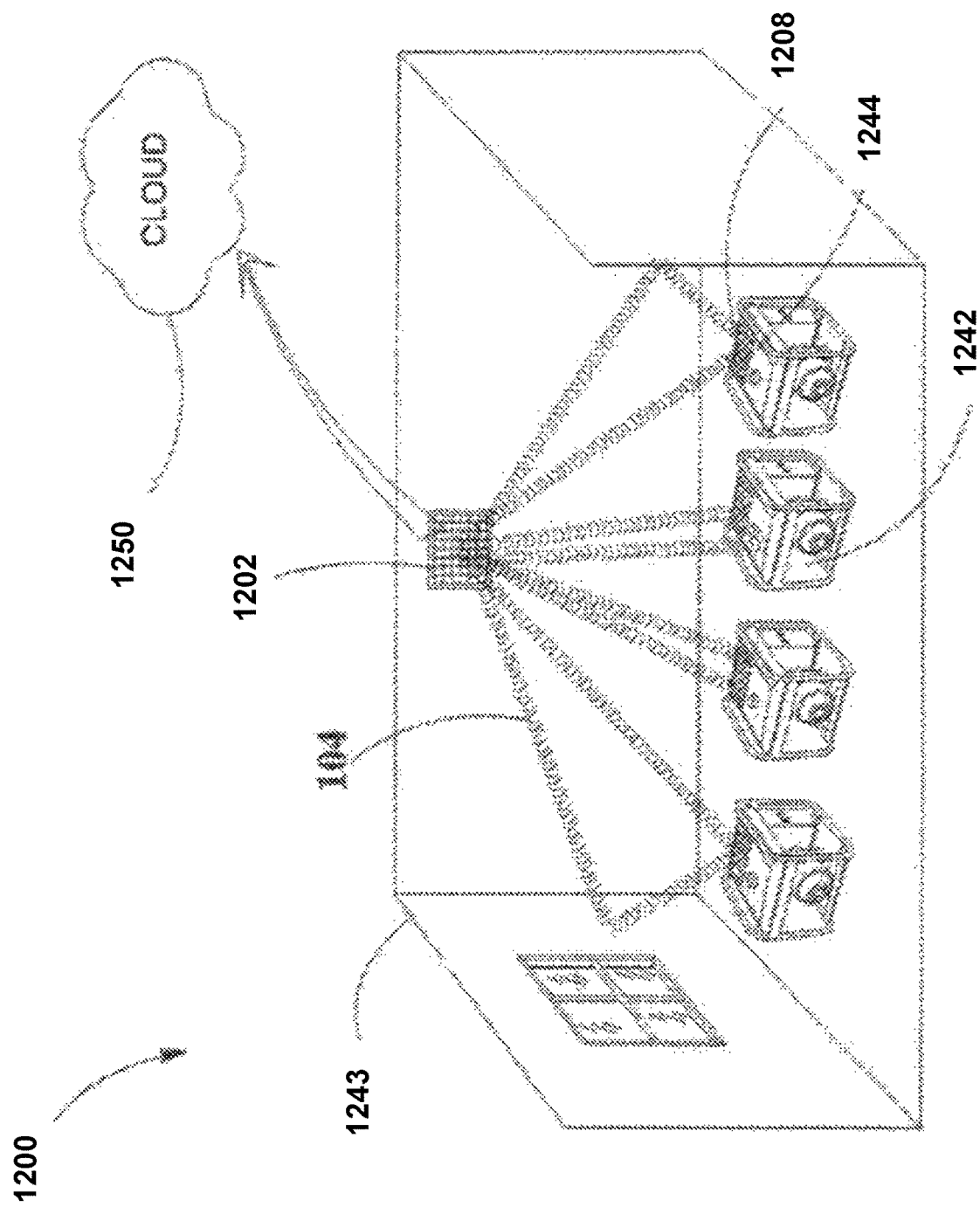

In one more example, FIG. 12D shows a wireless tracking system 1200 for tracking and controlling commodities of generators 1242 stored inside a warehouse 1243. Here, one transmitter 1202 is used, which is hanging on a wall of warehouse 1243. Each generator 1242 has an electronic tag 1244 with an adapted receiver 1208. Transmitter 1202 may transfer sound waves 104 to each receiver 1208 for powering and tracking each electronic tag 1244. The communication component used in these receivers 1208 is a Bluetooth protocol. In this embodiment, the unique identifier is U LIII for the Bluetooth protocol. If one or more generators are illegally removed from warehouse 1243, transmitter 1202 activates an alarm and notifies a security guard through an interactive message informing that one or more generators 1242 are being stolen. Security guard accesses a cloud-based service 1250 through an application and identifies generators 1242 that were stolen through UUID of each electronic tag 1244. Security guard receives another interactive message informing the current location of the stolen generators 1242, in which this information was obtained when receivers 1208 from electronic tags 1244 receive sound waves 104 from other transmitter 1202. This other transmitter 1202 may upload the information of the current location of the stolen generators, allowing the guard to find these generators 1242.

Example Systems and Methods with Embedded Receivers in Laptop Screens

As discussed above, some embodiments include a laptop with an embedded wireless power transmitter and/or receiver. In some embodiments, a transmitter may be embedded in the laptop computer screen for transmitting sound waves (SW) towards one or more peripheral devices, where these SW waves may generate pockets of energy that may allow the wireless charging of one or more peripheral devices. These peripheral devices may include a receiver for collecting and using the transmitted SW waves. Examples of peripheral devices may include headsets, computer keyboards and mice, smartphones, and the like. The disclosed systems and methods for wireless power transmission using a laptop computer may allow seamless operation and wireless charging between one or more peripheral devices and the laptop computer, without the need of using physical cables or connections. According to another embodiment, the laptop computer may include both, a transmitter and a receiver, for simultaneously transmitting and receiving SW. In this case, laptop computer may be wirelessly charged by a separate transmitter in proximity, while the laptop computer may also wirelessly charge one or more peripheral devices within range. Yet in another embodiment, the laptop computer may include a single transmitter that can also be used as a receiver. In this case, a software algorithm may be used to control the switching using same transducer elements for transmitting or receiving SW waves.

In some embodiments, a method for wireless power transmission to an electronic device from a computer system is provided. The method includes: embedding a pocket-forming transmitter in a screen display of the computer system; transmitting power SW waves from the pocket-forming transmitter having a radio frequency integrated circuit, transducer elements, a microprocessor and communication circuitry; generating pockets of energy from the transmitter to converge in 3-D space at predetermined locations; integrating a receiver having sensor elements and communication circuitry within the electronic device; converting the pockets of energy from the transmitter to the integrated receiver to power the electronic device. In some embodiments, the computer system is a laptop, notebook or nano-notebook. In some embodiments, the computer system is a desktop computer, a tablet, iPad, iPhone, smartphone or other peripheral portable electronic devices. In some embodiments, the computer system includes an embedded receiver whereby a separate transmitter in proximity to the computer system powers the computer system while the transmitter of the computer system wirelessly charges the electronic device. In some embodiments, the method includes switching between the transmitter and the receiver in the computer system. In some embodiments, the method includes controlling the switching by a software algorithm. In some embodiments, the method includes using the same transducer elements for transmitting and receiving the power SW waves. In some embodiments, the method includes synchronizing wirelessly with at least one peripheral electronic device used with the computer system and the step of powering the at least one peripheral electronic device. In some embodiments, the at least one peripheral electronic device includes computer mice, keyboards, smartphones, audio or visual headsets and other peripherals used with a computer system. In some embodiments, the transmitter is integrated between a LED/LCD back-light layer and a frame of the screen display. In some embodiments, the method includes selecting the separate transmitter within a predetermined charging range of the computer system; verifying a battery charge level of the computer system; charging the computer system; and identifying peripheral devices within a predetermined range of the computer system transmitter for wirelessly charging the peripheral devices. In some embodiments, the wireless power transmission from the computer system allows seamless operation and wireless charging between at least one peripheral device and the computer system. In some embodiments, the computer system transmitter includes adaptive pocket-forming for dynamically adjusting pocket-forming to regulate power on the receiver of at least one peripheral electronic device within predetermined range of the transmitter through communication signals between the transmitter and receiver communication circuitry. In some embodiments, the electronic device includes peripheral devices used in conjunction with the computer system that include a receiver with sensor elements for collecting the power SW waves for charging the peripheral devices. In some embodiments, the sensor elements of the transmitter and receiver operate in frequency bands of 10 kHz to 50 kHz. In some embodiments, peripheral devices operate wirelessly with the computer system through Bluetooth communication between the communication circuitry of the transmitter and receiver. In some embodiments, the transducer elements are facing out of the computer system screen display to allow suitable transmission of power SW waves to the electronic device. In some embodiments, the screen display includes both the transmitter and a receiver for providing charging to the computer system and charging to the electronic device by switching between the transmitter and receiver over the transducer elements of the computer system.

Example Control Protocols for Wireless Power Transmissions using Sound Waves

In some embodiments, a method of control protocols for a wireless sound power transmission system is provided. The method includes: generating two or more sound waves from a transmitter having a micro-controller for digital signal processing in response to receiving a signature signal from a receiver requesting a power delivery; forming controlled constructive patterns from the generated sound waves controlled by the micro-controller; accumulating energy or power in the form of constructive interference patterns from the sound waves to form pockets of energy; converging the pockets of energy in 3-D space to a targeted electronic device connected to the receiver sending the signature signal; evaluating the signature signal sent by the receiver to authenticate the identification of the targeted electronic device for reception of the pockets of energy to charge the electronic device; and determining the power delivery profile of the targeted and authenticated electronic device to meet the request for power delivery by the receiver for• charging or operating the electronic device.

In some embodiments, a control protocol for a wireless sound power transmission system is provided. The method includes: a transmitter for generating pockets of energy to a receiver electrically connected to at least one electronic device; and a micro-controller for receiving coded signature signals from the receiver and connected to a communication network between the transmitter and receiver for controlling an authentication and a power profile of each electronic device receiving the pockets of energy. In some embodiments, the transmitter generates two or more sound waves from at least two sound transmit transducers to create constructive interference patterns from the sound waves to form the pockets of energy. In some embodiments, the receiver generates the coded signature signals requesting power delivery from the transmitter to the receiver of the electronic device.

Example Systems and Methods for Use in Houses Configured with Wireless Transmission Systems Wireless sound power system is used in a house to provide power and charge to a plurality of mobile and non-mobile devices therein. The wireless powered house often includes a single base station that is connected to several transmitters. The base station manages operation of every transmitter in an independently manner or operates several transmitters as a single transmitter. Connection between base station and transmitters may be achieved through a plurality of techniques including wired connections and wireless connections. In some embodiments, transmitters include one or more transducers connected to at least one sound wave integrated circuit with a micro-controller and a power source. Wireless power system may include several transmitters located in different locations for enabling multiple room coverage, In order to improve this feature, a single base station may manage each transmitter in different location with different and independent operation modes. Furthermore, base stations may enable the use of all transmitters as a single transmitter.

Base stations may reduce the cost of a wireless power system, because specific circuitry may only be placed in base stations rather than on each transmitter. In. addition, the use of a base station for controlling several transmitters may improve the managing and charging of several receivers.

Base station may use a CPU, computer, micro-controller among others components for processing information. from receivers and transmitters. Furthermore, a variety of protocols may be executed by base station in order to charge and power a plurality of mobile and non-mobile devices, such protocols may include priorities, restricted locations, and authentication among others. Protocols may be customized by the user.

In some embodiments, a method for wireless power transmission for electronic devices is provided. The method includes: emitting SW waves from a plurality of pocket-forming transmitters each having a radio frequency integrated circuit, antenna elements, communication circuitry and a predetermined number of the plurality of pocket-forming transmitters connected to at least one base station having a digital processing unit and a power source connected to the digital processing unit and each of the predetermined number of transmitters; generating pockets of energy from each transmitter to converge in 3-D space at predetermined locations within a building or rooms within a predefined structure; incorporating receivers within the electronic devices; and converting the pockets of energy in 3-D space from each transmitter within the receivers located within range of each transmitter within the predefined structure to charge or power the electronic devices.

In some embodiments, a method for wireless power transmission for electronic devices is provided. The method includes: connecting a plurality of pocket-forming transmitters to at least one base station having a digital processor or a microcontroller or ASIC for controlling the transmitters; connecting a power source to the digital processor and to the transmitters; generating SW waves from a SW circuit embedded within each of the transmitters; controlling the generated SW waves with the digital signal processor in each transmitter; transmitting the SW waves through antenna elements connected to the transmitters within a predefined structure or building; incorporating receivers within the electronic devices; and capturing the SW waves forming pockets of energy converging in 3-D Space at receivers located at predetermined locations within the structure to convert the pockets of energy into a DC voltage for charging or powering the electronic.: devices. In some embodiments, the base station is connected to the transmitters through a coaxial cable, a phone cable, a LAN cable or a wireless connection. In some embodiments, the method includes: communicating information between the transmitter and receiver through communication circuitry and communication protocols in both the transmitter and receiver to identify the location of the electronic devices within the structure or rooms within the building. In some embodiments, transducer elements in the transmitter and receiver operate in the frequency hands of 10 KHz to 50 KHz. In some embodiments, the method includes: enhancing the range of wireless power transmission with a range enhancer, reflectors and repeaters located on the curtains, walls, floor, ceiling and furniture in predetermined positions around rooms of the structure. In some embodiments, the electronic devices are restricted to a specific area and to a specific user to ensure safety and security in wireless power transmission within a structure of electronic devices.

In some embodiments, a method for wireless power transmission for an electronic device is provided. The method includes: delivering a power request from the electronic device to a plurality of pocket-forming transmitters for emitting SW waves to form pockets of energy converging in 3-D space connected to a power source; determining the requesting electronic device location; identifying the electronic device to be charged; prioritizing the electronic device to receive a charge; checking the battery level of the electronic device to confirm the need for a charge; meeting delivery criteria by the electronic device to be charged; confirming the electronic device is within range of at least one transmitter for charging; and delivering power to the electronic device to be charged or using a range enhancer to deliver the power to the electronic device.

Example Systems and Methods for Harnessing Energy from Sound Waves to Improve Battery Life of Electronic Devices In some embodiments, a method for improving battery life of electronic devices running on small batteries, for example coin batteries, is provided. The method may include wireless sound power transmission through suitable techniques such as pocket-forming, while including receivers and capacitors in the aforementioned devices. The method may provide wireless power to electronic devices such as headsets, smart-watches and the like. As described in embodiments above, such devices may include a capacitor or other suitable charge-storing devices, which upon discharge may power fully and/or partially the aforementioned devices. The foregoing method may decrease fully and/or partially power loads on a device's battery. Thus, battery life in such devices may be enhanced.

In some embodiments, a method for wireless power transmission to improve battery life in a portable electronic device is provided. The method includes: transmitting pockets of energy consisting of SW waves from a transmitter with at least two transducers and a transmitter communication device; receiving the pockets of energy through a sensor in a receiver with a receiver communication device and a controller connected to the portable electronic device; and converting the pockets of energy for charging an auxiliary power supply of the electronic device responsive to communication signals between the transmitter and receiver communication devices related to the power requirements of the portable electronic device. In some embodiments, the method includes: rectifying the SW waves from the pockets of energy and converting the rectified SW waves into a constant DC voltage for charging the auxiliary power supply. In some embodiments, the auxiliary power supply is a capacitor. In some embodiments, the method includes: communicating between transmitter and receiver communication devices with short radio frequency (RF) waves or pilot signals through the respective RF antennas and utilizing communication protocols of Bluetooth, Wi-Fi or ZigBee to carry information related to the power requirements of the portable electronic device.

Example Systems and Methods for Using Sound Waves to Provide Wirelessly Delivered Power to Game Controllers In some embodiments, sound charging methods and systems for powering or charging game controllers are provided. A method for wireless charging of a game controller includes: connecting a pocket-forming transmitter to a power source; generating sound waves from a sound circuit embedded within the transmitter; controlling the generated sound waves with a digital signal processor in the transmitter; transmitting the sound waves through antenna elements connected to the transmitter; and capturing the sound waves forming pockets of energy in 3-D space at a receiver with antenna elements connected to the game controller to convert the pockets of energy into a DC voltage for charging or powering a battery of the garner controller. In some embodiments, the transmitter is mounted in a central location within a gaming room and the receiver is mounted on or connected to the game controller. In some embodiments, the method includes: communicating a power level of the battery and communicating a location of the game controller within a gaming room.

Example Systems and Methods for Employing a Selective Delivery Range Wirelessly Delivering Power to Electronic Devices Using Sound Waves In some embodiments, a method for wireless power transmission to an electronic device is provided. The method includes: connecting a pocket-forming transmitter to a power source; generating SW waves from a SW circuit embedded within the transmitter; controlling the generated SW waves with a digital signal processor in the transmitter; transmitting the SW waves through transducer elements connected to the transmitter within a predefined range; and capturing the SW waves forming pockets of energy converging in 3-D space at a receiver with sensor elements connected to the electronic device within the predefined range to convert the pockets of energy into a DC voltage for charging or powering the electronic device. In some embodiments, the transmitter and receiver include communication circuitry for transferring information between the transmitter and receiver. In some embodiments, the method includes: communicating information between the transmitter and receiver through the communication circuitry to identify the device, a user, a battery level, a location or other such information of each electronic device within the predefined range. In some embodiments, the receiver or the electronic device includes a capacitor having a storage capacity for powering the electronic device whenever the electronic device is within the predefined range of the transmitter and for powering the electronic device only for a limited predetermined period of time whenever the electronic device is out of the predefined range of the transmitter. In some embodiments, the transmitter identifies each electronic device within the predefined range and delivers power to each approved electronic device through pocket-forming but disables, locks out and removes power from each electronic device when the approved electronic device is moved out of the range of the transmitter for security reasons. In some embodiments, the transmitter identifies each receiver requesting power and then only powers approved electronic devices within the predefined range of the transmitter. In some embodiments, the receiver and the capacitor providing an operating voltage to the electronic device eliminates the need for a battery to power the electronic device within the predefined range of the transmitter.

Example Systems and Methods for Using Sound Waves to Wirelessly Deliver Power to Articles of Clothing with Embedded Wireless Power Receivers In some embodiments, various electric receiver arrangements included in clothing pieces that require electric current perform tasks, such as warming, cooling and displaying. In some embodiments, a method for wireless sound power transmission to a temperature regulation circuit embedded in clothing or smart fabrics is provided. The method includes: emitting power SW waves from a pocket-forming transmitter having a SW integrated circuit, transducer elements, a microprocessor and communication circuitry; generating pockets of energy from the transmitter to converge in 3-D space at predetermined locations within a predefined range; integrating a receiver having sensor elements and communication circuitry within the clothing or smart fabric; attaching the temperature regulation circuit to the receiver; converting the pockets of energy in 3-D space from the transmitter to the receiver integrated with the clothing or smart fabric to power and to regulate the temperature within the temperature regulation circuit.

Example Systems and Methods for Using Sound Waves to Wirelessly Deliver Power to Healthcare Gadgets and Sensors The often large and cumbersome medical devices such as the ones used for measurement (e.g., infrared electronic thermometer, blood pressure monitor, blood glucose meter, pulse oximeter and ECG monitor) and others such as ultrasound machines have become smaller in terms of dimensions, remain durable for a longer period of time, and are less expensive as the electronic technology evolves to maturity. However, in order for these devices to become portable they need to use batteries to get the power they need to work. The constant use of these devices demands charging their batteries more often. In hospitals or healthcare centers this may be troublesome and inconvenient for the staff since they may not have enough time to fully charge their healthcare gadgets.

In some embodiments, a method for wireless transmission of power to an electronic medical device or a sensor is provided. The method includes: connecting a transmitter to a power source within a medical facility or patient room; generating pocket forming power SW signals from a SW circuit embedded within the transmitter; generating communication signals from a communication circuit embedded within the transmitter; controlling the generated power SW signals and the communication signals with a digital signal processor; transmitting the power SW and communication signals through at least two transducers and one antenna, respectively, electrically connected to the SW circuitry and communication circuits within the transmitter; capturing pockets of energy produced by the pocket-forming power SW signals in converging in 3-D space at a receiver with an antenna connected to the medical device or sensor for converting the pockets of energy into a DC voltage for charging or powering the medical device or sensor; and receiving the communication signals at the receiver to generate location, power requirements or other information between the transmitter and receiver of the electronic medical device or sensor.

In some embodiments, a method for wireless power transmission in an electronic medical device or a sensor is provided. The method includes: emitting power sound waves from a transmitter generating pockets of energy in 3D space through pocket-forming in a medical facility or a patient room; coupling receivers to the electronic medical device or sensor; capturing the pockets of energy in 3-D space at the receivers; and powering or charging the electronic medical device or sensor from the captured pockets of energy. In some embodiments, the pocket-forming transmitter is centrally located in a recovery room, operating room, patient room, emergency room or common area of a hospital for charging the electronic medical device or the sensor. In some embodiments, the electronic medical device or sensor is a portable blood glucose meter, portable ultrasound machine, infrared electronic thermometer, electronic pads with electronic medical records, blood pressure monitor, pulse oximeter, portable EKG or any other electronic device used by a medical professional or a hospital administrator.

Example Systems and Methods for Using Sound Waves to Wirelessly Deliver Power to Electronic Devices Used by Law Enforcement Personnel Law Enforcement officers may be required to carry a great deal of equipment which in most cases are electrical devices, the wireless power distribution system disclosed here may charge or power the electrical devices wirelessly. In some embodiments, the wireless power distribution system may include at least one transmitter coupled with any suitable battery management system in a Law Enforcement vehicle, in other embodiments, a Law Enforcement uniform may be coupled with wireless receiver components that may use the pockets of energy to charge or power the electrical devices.

In some embodiments, a method for wireless power transmission for electrical devices used by law enforcement equipment is provided. The method includes: emitting SW waves from a pocket-forming transmitter each having a sound wave; integrated circuit, transducer elements, and communication circuitry; generating pockets of energy from the transmitter to converge in 3-D space at predetermined locations within a predefined range; incorporating a receiver within a law enforcement uniform; attaching the electrical devices to the receiver; and convening the pockets of energy in 3-D space from the transmitter to the receiver located within the law enforcement uniform to charge or power the electrical devices. In some embodiments, the electrical devices are radios, night vision goggles, wearable cameras, flashlights, sensors and other portable law enforcement electrical devices for use in law enforcement. In some embodiments, the electrical devices are coupled to the receiver through wires strategically distributed in the uniform. In some embodiments, the transmitter and receiver include transducer and sensor elements, respectively.

Example Systems and Methods for Configuring Tracing Systems for Use in Conjunction with Wireless Power Transmission Systems In some embodiments, a method for wireless power transmission to a portable electronic device is provided. The method includes: connecting a receiver to the electronic device; receiving sound wave pockets of energy at the receiver from a pocket-forming transmitter; charging and powering the portable electronic device from the wirelessly transmitted sound wave pockets of energy accumulated at the receiver for charging and powering the electronic device; and tracking a living being or an object from signals communicated between the receiver and the transmitter.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 106 optionally includes one or more storage devices remotely located from the CPU(s) 104. Memory 106, or alternatively the non-volatile memory device(s) within memory 106, comprises a non-transitory computer readable storage medium.

Stored on any one of the machine readable medium (media), features of the present invention can be incorporated in software and/or firmware for controlling the hardware of a processing system (such as the components associated with the transmitters 102 and/or receivers 120), and for enabling a processing system to interact with other mechanisms utilizing the results of the present invention. Such software or firmware may include, but is not limited to, application code, device drivers, operating systems, and execution environments/containers.

Communication systems as referred to herein (e.g., communications component 112, FIG. 1) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to radio-frequency (RF), radio-frequency identification (RFID), infrared, radar, sound, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), ZigBee, wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of wirelessly transmitting power using sound waves, comprising:
    receiving, by a base station that is in communication with a plurality of wireless-power transmitters, data that is used to determine a location of and a power requirement for an electronic device coupled to a wireless-power receiver, wherein each of the plurality of wireless-power transmitters includes respective transducers for transmitting sound waves;
    selecting, by the base station and based on the location of the electronic device, one or more of the plurality of wireless-power transmitters to transmit sound waves to the wireless-power receiver; and
    sending, by the base station, an instruction to the one or more of the plurality of wireless-power transmitters to transmit a plurality of sound waves using respective transducers, the plurality of sound waves forming a pocket of energy proximate to the electronic device, wherein the wireless-power receiver converts energy from the plurality of sounds waves that form the pocket of energy into usable power to provide power or charge to the electronic device.

2. The method of claim 1, further comprising:
    controlling, by the base station, each of the plurality of transmitters to deliver a pocket of energy at a determined time and location to charge the electronic device through the wireless-power receiver.

3. The method of claim 1, further comprising:
    determining, by the base station, if the electronic device is located beyond a first predetermined threshold range of distance; and
    in accordance with a determination that the electronic device is located beyond the first predetermined threshold, controlling, by the base station, one or more range enhancer devices, to deliver a pocket of energy to the wireless-power receiver coupled to the electronic device.

4. The method of claim 3, wherein the one or more range enhancer devices includes at least one of a reflector device, or a wireless repeater device.

5. The method of claim 4, wherein at least one range enhancer device is configured to receive and amplify a sound wave before retransmitting the sound wave.

6. The method of claim 3, further comprising:
    tracing, by the base station, a trajectory for sound waves using a subset of the one or more range enhancer devices in addition to determining the subset of the one or more range enhancer devices to optimally deliver power to the electronic device.

7. The method of claim 1, further comprising:
    updating, by the base station, locations of one or more electronic devices after the one or more electronic devices communicated a power requirement.

8. The method of claim 1, further comprising:
    determining, by the base station, priority among a plurality of electronic devices to receive, through the at least one receiver, the pocket of energy from at least one of the plurality of transmitters.

9. The method of claim 1, further comprising:
    communicating, by the base station, with the wireless-power receiver and the plurality of transmitters through a communication signal using a protocol selected from the group consisting of Bluetooth®, Wi-Fi®, ZigBee®, or FM radio.

10. The method of claim 1, wherein the plurality of transmitters and the wireless-power receiver are situated in various rooms or locations within a physical building.

11. The method of claim 1, wherein each transmitter is configured to transmit sound waves at a corresponding frequency, power intensity, and amplitude, and the method further comprises, controlling, by the base station, each transmitter of the plurality of transmitters to transmit sound waves at its corresponding frequency, power intensity, and amplitude.

12. A wireless charging apparatus comprising:
    a base station coupled to a power source; and
    a first communication component coupled to the base station and configured to transmit information to a plurality of transmitters and a plurality of receivers, each of the plurality of transmitters comprising:
        an antenna configured to transmit sound waves that converge to become a pocket of energy; and
        a second communication component configured to communicate with the base station and at least one of the plurality of receivers.

13. The apparatus of claim 12, wherein the plurality of transmitters are situated in a plurality of locations inside a defined structure and are connected to the base station through one or more of a coaxial cable, a phone cable, a LAN cable, a wireless connection, and combinations thereof.

14. The apparatus of claim 12, wherein the base station is coupled to a digital signal processor configured to control a plurality of functionalities associated with the plurality of transmitters, the plurality of functionalities including one or more of timing of transmission of the sound waves, a direction of transmission of the sound waves, and an intensity of the pocket of energy.

15. The apparatus of claim 12, wherein the base station is configured to receive information from at least one of the plurality of receivers, the information including an identification, a location, and an indication of the power level of at least one of the plurality of electronic devices associated with the at least one of the plurality of receivers.

16. The apparatus of claim 12, wherein the base station, the plurality of transmitters, and the plurality of receivers are configured to communicate using a protocol selected from the group consisting of Bluetooth®, Wi-Fi®, ZigBee®, or FM radio.

17. The apparatus of claim 12, further comprising one or more range enhancer devices, each range enhancer device configured to either reflect or repeat sound waves received from the plurality of transmitters.

18. The apparatus of claim 17, wherein each range enhancer device is located beyond a second predetermined threshold range of distance from the base station.

19. The apparatus of claim 17, wherein the one or more range enhancer devices includes at least one of a reflector device, or a wireless repeater device.

20. The apparatus of claim 17, wherein the base station is configured to trace a trajectory for sound waves using a subset of the one or more range enhancer devices to deliver power to the at least one of the plurality of receivers.

* * * * *

UNITED STATES PATENT AND TRADEMARK OFFICE
CERTIFICATE OF CORRECTION

PATENT NO. : 10,516,301 B2  
APPLICATION NO. : 16/224682  
DATED : December 24, 2019  
INVENTOR(S) : Leabman Page 1 of 1

It is certified that error appears in the above-identified patent and that said Letters Patent is hereby corrected as shown below:

In the Claims

Claim 1, Column 41, Line 27, please delete "of sounds waves" and insert --of sound waves--.

Signed and Sealed this  
Nineteenth Day of May, 2020

Andrei Iancu  
*Director of the United States Patent and Trademark Office*